US008876212B2

(12) United States Patent
Yamada et al.

(10) Patent No.: US 8,876,212 B2
(45) Date of Patent: Nov. 4, 2014

(54) SEAT ADJUSTMENT APPARATUS FOR VEHICLE

(71) Applicant: Aisin Seiki Kabushiki Kaisha, Kariya (JP)

(72) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 90 days.

(21) Appl. No.: 13/670,986

(22) Filed: Nov. 7, 2012

(65) Prior Publication Data

US 2013/0113263 A1      May 9, 2013

(30) Foreign Application Priority Data

Nov. 7, 2011   (JP) .................................. 2011-243701
Nov. 9, 2011   (JP) .................................. 2011-245669

(51) Int. Cl.
*B60N 2/46*  (2006.01)
*B60N 2/02*  (2006.01)
*B60N 2/44*  (2006.01)
*F16D 41/12* (2006.01)
*F16D 41/16* (2006.01)

(52) U.S. Cl.
CPC ............... *B60N 2/4495* (2013.01); *B60N 2/02* (2013.01); *B60N 2/4633* (2013.01); *F16D 41/12* (2013.01); *F16D 41/16* (2013.01)
USPC ............... 297/411.32; 297/367 P; 297/411.3; 297/411.38; 297/423.26; 297/423.28; 297/423.3

(58) Field of Classification Search
CPC .................................................... A47C 1/0342
USPC ................ 297/367 P, 411.3, 411.32, 411.38, 297/423.26, 423.28, 423.3
See application file for complete search history.

(56) References Cited

U.S. PATENT DOCUMENTS

| 4,230,414 | A | * | 10/1980 | Cheshire ............... 297/411.32 X |
| 4,491,365 | A | * | 1/1985 | Murakami ............. 297/423.3 X |
| 4,655,501 | A | * | 4/1987 | Ishigami et al. ...... 297/411.32 X |
| 5,076,645 | A | * | 12/1991 | Yokota ..................... 297/411.32 |

(Continued)

FOREIGN PATENT DOCUMENTS

| JP | 7-30427 | 7/1995 |
| JP | 2009-240350 | 10/2009 |
| JP | 2010-35862 | 2/2010 |
| WO | WO 2008/004696 A1 | 1/2008 |

*Primary Examiner* — Rodney B White
(74) *Attorney, Agent, or Firm* — Oblon, Spivak, McClelland, Maier & Neustadt, L.L.P.

(57) ABSTRACT

A seat adjustment apparatus for a vehicle includes a first bracket, a second bracket defining an accommodating void with the first bracket, a pawl, and a pawl reverse spring, The pawl includes a ratchet portion, a pawl side reverse wall portion, and a pawl side return wall portion, the ratchet portion allowing a relative rotation of the first and second brackets in a first direction and prohibiting a relative rotation of the first and second brackets in a second direction in a case where the pawl is biased to rotate in a normal direction, the pawl side reverse wall portion allowing the relative rotation in the second direction so that the pawl is reversed by being biased to rotate in a reverse direction, the pawl side return wall portion bringing the pawl to be returned by being biased to rotate in the normal direction.

14 Claims, 32 Drawing Sheets

(56) References Cited

U.S. PATENT DOCUMENTS

| | | | |
|---|---|---|---|
| 5,328,247 A * | 7/1994 | Lovins | 297/423.3 |
| 5,489,143 A * | 2/1996 | Adachi et al. | 297/411.38 |
| 5,597,209 A * | 1/1997 | Bart et al. | 297/411.38 |
| 5,702,157 A * | 12/1997 | Hurite | 297/411.38 |
| 6,467,847 B2 * | 10/2002 | Bidare | 297/411.32 |
| 6,609,758 B1 * | 8/2003 | Lefevere | 297/411.38 |
| 7,828,385 B2 * | 11/2010 | Reubeuze | 297/367 P X |
| 8,128,170 B2 * | 3/2012 | Cha et al. | 297/367 P |
| 8,256,843 B2 * | 9/2012 | Iguchi | 297/367 P |
| 8,414,077 B2 * | 4/2013 | Reubeuze et al. | 297/367 P |
| 8,641,146 B2 * | 2/2014 | Suzuki et al. | 297/367 P X |
| 2010/0033004 A1 * | 2/2010 | Reubeuze | 297/367 P |
| 2010/0194165 A1 * | 8/2010 | Iguchi | 297/367 P |
| 2010/0194169 A1 | 8/2010 | Shinozuka | |
| 2011/0181088 A1 * | 7/2011 | Zhang et al. | 297/367 P |
| 2013/0076096 A1 * | 3/2013 | Pacolt | 297/411.38 |

\* cited by examiner

F I G. 9
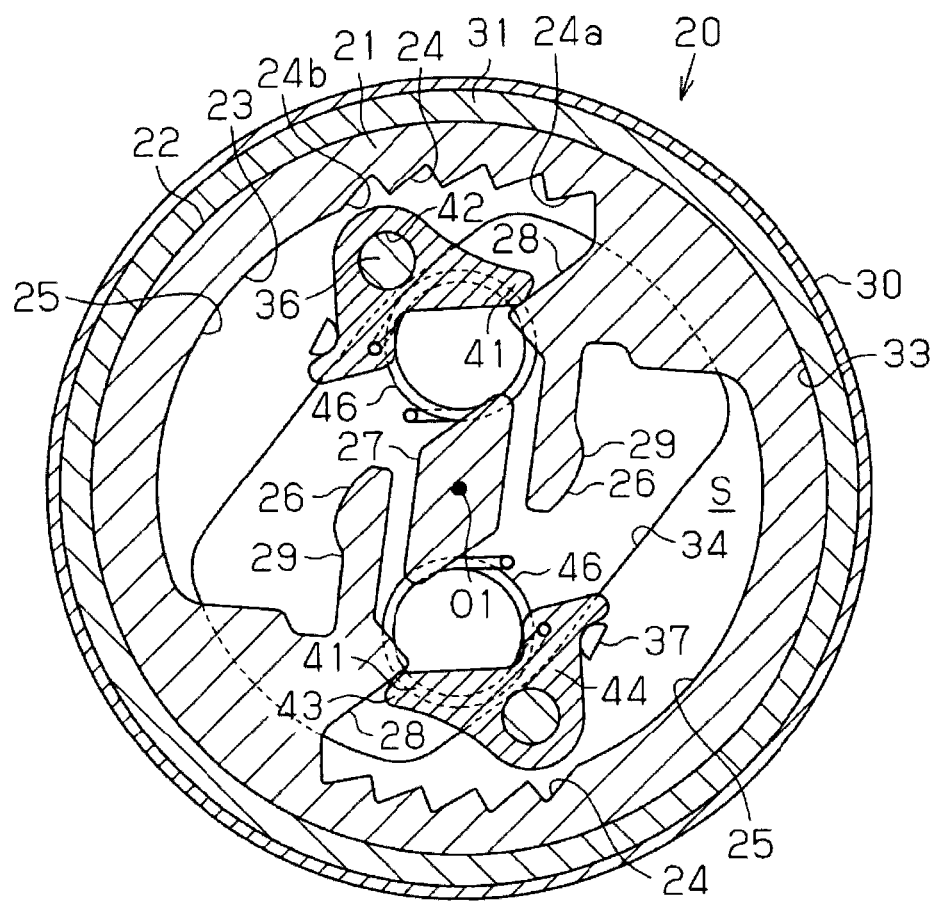

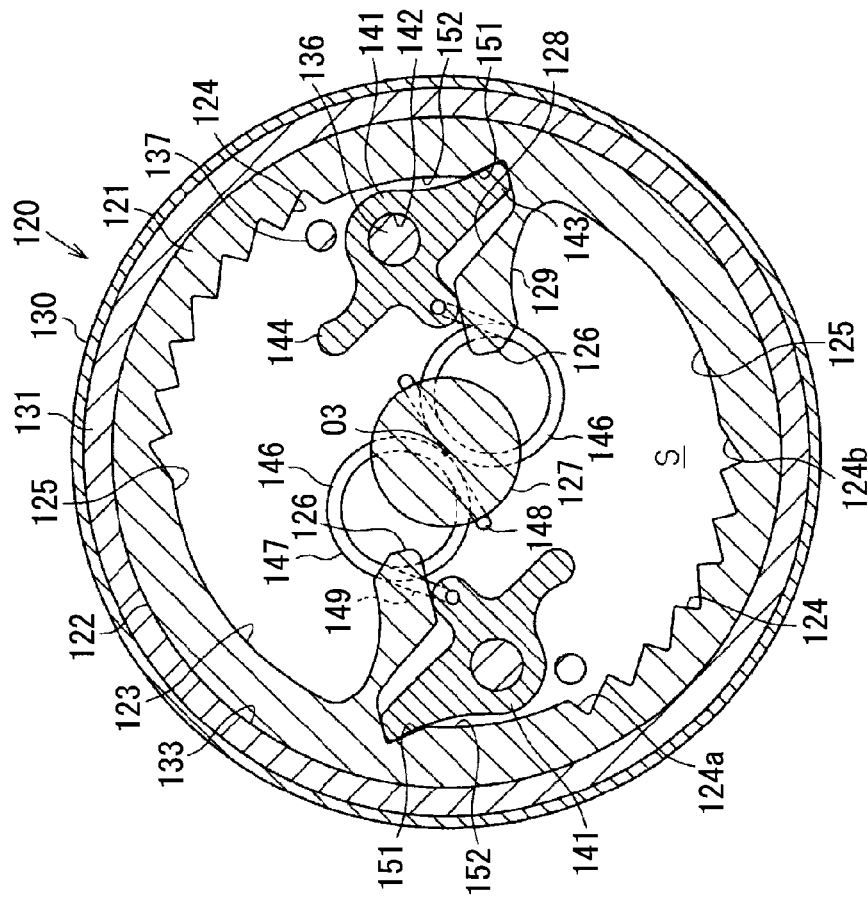
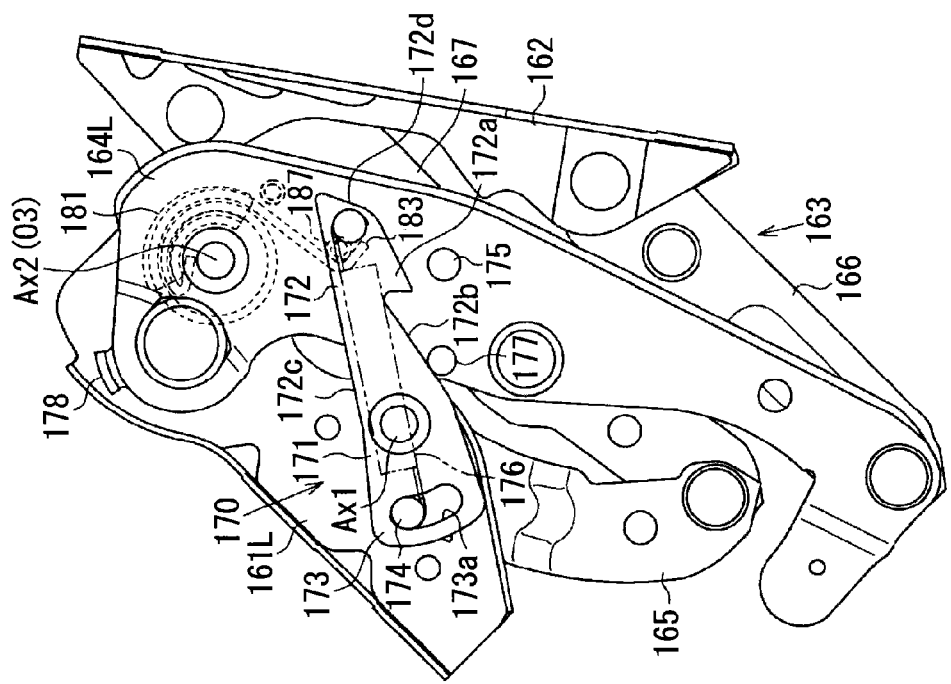
FIG. 26B
FIG. 26A

SEAT ADJUSTMENT APPARATUS FOR VEHICLE

CROSS REFERENCE TO RELATED APPLICATIONS

This application is based on and claims priority under 35 U.S.C. §119 to Japanese Patent Application 2011-243701, filed on Nov. 7, 2011 and Japanese Patent Application 2011-245669, filed on Nov. 9, 2011, the entire contents of which are incorporated herein by reference.

TECHNICAL FIELD

This disclosure generally relates to a seat adjustment apparatus for a vehicle.

BACKGROUND DISCUSSION

A known seat adjustment apparatus for adjusting a position of a seat cushion in an up-and-down direction (a vertical direction) is disclosed in JP2109194Y, which will be hereinafter referred to as Reference 1. As illustrated in FIG. 17, the seat adjustment apparatus disclosed in Reference 1 includes a ratchet 201 and a pawl 206 each of which is rotatably connected to a bracket holding the seat cushion. The ratchet 201 and the pawl 206 engage with each other at a position away from respective rotational axes of the ratchet 201 and the pawl 206. The pawl 206 is normally biased by a turnover spring 209 in a direction to engage with the ratchet 201, i.e., in an engagement direction.

Accordingly, the ratchet 201 is allowed to rotate in a counterclockwise direction in FIG. 17 where an engagement position between the ratchet 201 and the pawl 206 is separated from the rotational axes thereof. In addition, the rotation of the ratchet 201 in a reverse direction, i.e., a clockwise direction in FIG. 17, is restricted. The engagement position between the ratchet 201 and the pawl 206 moves to thereby adjust and maintain the position of a front portion of the seat cushion in the up-and-down direction.

In a case where the rotation of the ratchet 201 in the counterclockwise direction in FIG. 17 is proceeded and thus a first protruding portion 202 of the ratchet 201 engages with a projection 207 of the pawl 206, the turnover spring 209 is turned over in association with the rotation of the pawl 206. As a result, the ratchet 201 and the pawl 206 are inhibited from engaging with each other. On the other hand, in a case where a second protruding portion 203 presses an engagement surface 208 of the pawl 206 in association with the rotation of the ratchet 201 in the clockwise direction in FIG. 17 from the aforementioned state where the ratchet 201 and the pawl 206 are inhibited from engaging with each other, the turnover spring 209 is turned over in association with the rotation of the pawl 206 so that the pawl 206 returns to an initial position or an initial state. Accordingly, the position of the front portion of the seat cushion may be again adjusted and held.

In addition, JP2010-35862A, which will be hereinafter referred to as Reference 2 discloses an armrest apparatus serving as the seat adjustment apparatus. As illustrated in FIG. 18, the armrest apparatus disclosed in Reference 2 adjusts and holds an angle of an armrest body relative to a seat frame by means of operations of a cam member 211 fixed to a shaft and a release block 216, and a contraction of a lock spring 219 wound on the shaft. In a case where the armrest body is rotated in a retracting direction from a usage state, the lock spring 219 is enlarged so that the armrest body is rotatable. In a retracted state of the armrest body, the enlarged state of the lock spring 219 is maintained. On the other hand, in a case where the armrest body is rotated in a deploying direction from the retracted state, the lock spring 219 is compressed so as to inhibit the armrest body from rotating. Accordingly, the angle of the armrest body relative to the seat frame may be adjusted and held in a non-step manner.

Further, WO2008/004696A1, which will be hereinafter referred to as Reference 3, discloses an ottoman device serving as the seat adjustment apparatus. The ottoman device disclosed in Reference 3 adjusts and holds or maintains the position of an ottoman in the up-and-down direction.

According to Reference 1, an axial misalignment of the ratchet 201 and the pawl 206, each formed by a plate member, at the engagement position may not be restricted and therefore the seat may not be stably held. At this time, it may be restricted to provide an appropriate member, for example, a stopper for a restriction of the axial misalignment of the ratchet 201 and the pawl 206 because of the arrangement of the turnover spring 209 adjacent to the pawl 206 in the axial direction.

In addition, according to Reference 2, a structure for the contraction of the lock spring 219, i.e., the cam member 211 and the release block 216, is necessary so as to adjust and maintain the angle of the armrest body relative to the seat frame, which may lead to an increase of components and a complex configuration. According to Reference 3, the same issue as Reference 2 may be raised.

A need thus exists for a seat adjustment apparatus for a vehicle which is not susceptible to the drawback mentioned above.

SUMMARY

According to an aspect of this disclosure, a seat adjustment apparatus for a vehicle includes a first bracket integrally including a ratchet inner teeth portion, a bracket side reverse wall portion, and a bracket side return wall portion, a second bracket pivotally supported by the first bracket to define an accommodating void with the first bracket, the second bracket adjusting a posture of a seat for a vehicle by rotating relative to the first bracket, a holding member inhibiting the first bracket and the second bracket from moving in a rotational axial direction of the second bracket, a pawl supported by the second bracket within the accommodating void and being pivotable about an axis in parallel with the rotational axial direction of the second bracket, and a pawl reverse spring including a first end portion engaging with the second bracket and a second end portion engaging with the pawl within the accommodating void. The pawl integrally includes a ratchet portion, a pawl side reverse wall portion, and a pawl side return wall portion, the ratchet portion allowing a relative rotation of the first bracket and the second bracket in a first direction and prohibiting a relative rotation of the first bracket and the second bracket in a second direction opposite from the first direction by engaging with the ratchet inner teeth portion in a case where the pawl is biased to rotate in a normal direction by the pawl reverse spring, the pawl side reverse wall portion allowing the relative rotation of the first bracket and the second bracket in the second direction by making contact with the bracket side reverse wall portion in a case of the relative rotation of the first bracket and the second bracket in the first direction so that the pawl is reversed by being biased to rotate in a reverse direction by the pawl reverse spring, the pawl side return wall portion bringing the pawl to be returned by being biased to rotate in the normal direction by the pawl reverse spring by making contact with the bracket side return wall portion in a case of the relative rotation of the first bracket and the second bracket in the second direction.

BRIEF DESCRIPTION OF THE DRAWINGS

The foregoing and additional features and characteristics of this disclosure will become more apparent from the following detailed description considered with the reference to the accompanying drawings, wherein:

FIG. 9 is an explanatory view illustrating an operation of the adjusting mechanism in a case where the pawl starts returning;

FIG. 26A is an explanatory lateral view of an operation of the lock mechanism when an ottoman operates further in a retracting direction from a retracted state;

FIG. 26B is an explanatory sectional view of an operation of the adjusting mechanism when the ottoman operates further in the retracting direction from the retracted state;

DETAILED DESCRIPTION

Figure 1:
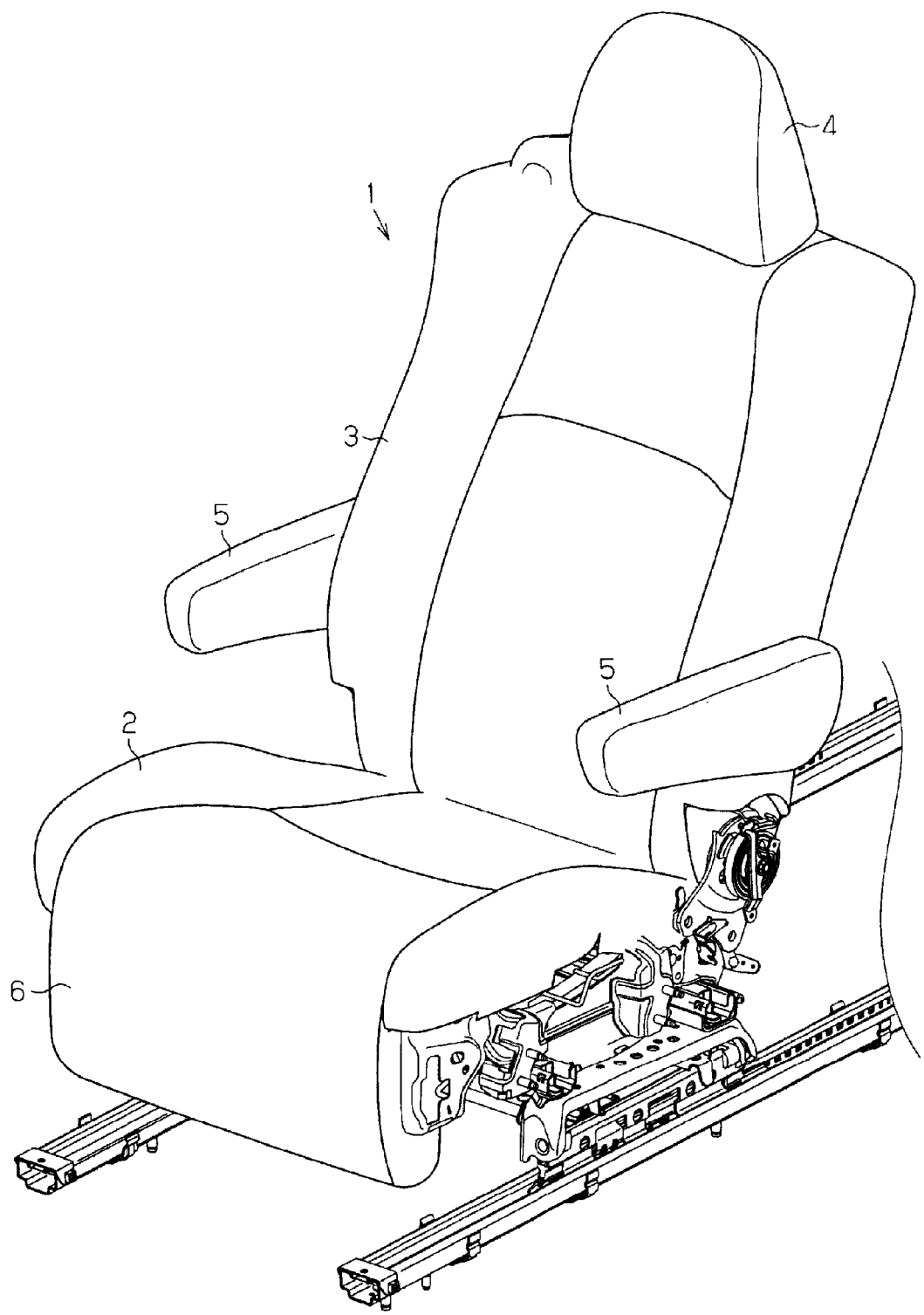
FIG. 1 is a perspective view of a seat to which a seat adjustment apparatus for a vehicle according to embodiments disclosed here is applied.

Embodiments will be explained with reference to the attached drawings. In the embodiments, directions and orientations such as left, right, front, rear, top, and bottom correspond to those when viewed from a passenger or an occupant seated on a seat. A first embodiment will be explained with reference to FIGS. 1 to 9. As illustrated in FIG. 1, a seat 1 forming a seat portion for an occupant is provided at a vehicle floor. The seat 1 includes a seat cushion 2 forming a seat surface, a seatback 3 supported at a rear end portion of the seat cushion 2 so as to be rotatable (i.e., reclining), a headrest 4 supported at a top end portion of the seatback 3, a pair of armrests 5, 5 each provided at opposite ends of the seatback 3 in a vehicle width direction at an intermediate portion in a height direction, and an ottoman 6 supported at a front end portion of the seat cushion 2 so as to be rotatable (i.e., tilting). According to the seat 1, a reclining angle of the seatback 3 relative to the seat cushion 2 is adjustable, and a reclining angle or a tilt angle of the armrests 5, 5 relative to the seatback 3 is adjustable. Further, according to the seat 1, a reclining angle or a tilt angle of the ottoman 6 relative to the seat cushion 2 is adjustable. Thus, an occupant seated in the seat 1 enables to adjust a height of line of sight in accordance with, for example, a physique of the occupant. In addition, an occupant seated in the seat 1 enables to adjust seating attitude or seating posture in accordance with, for example, a desired comfortableness.

Figure 2:
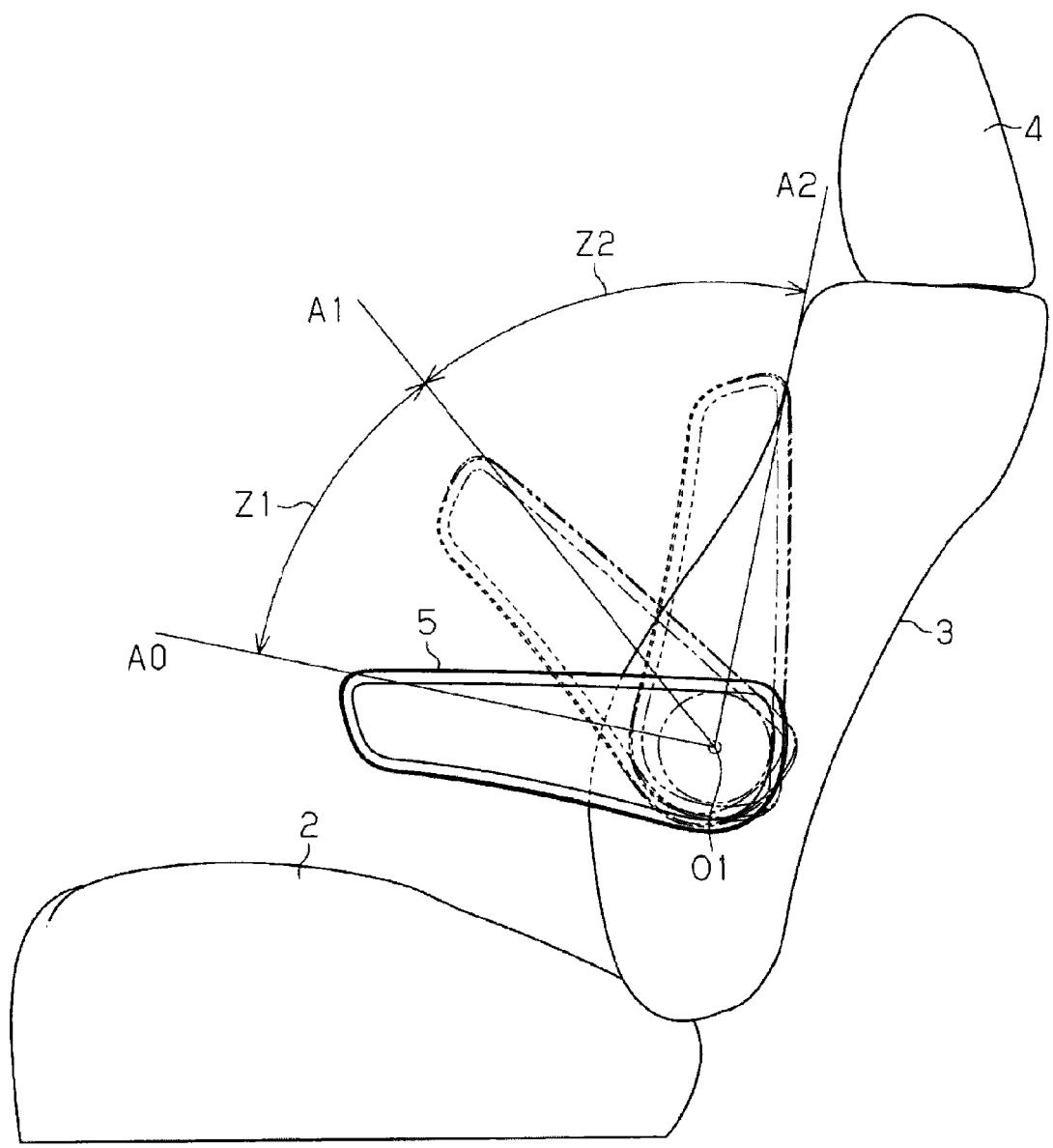
FIG. 2 is a side view explaining an operation of the seat adjustment apparatus according to a first embodiment disclosed here.

The tilt angle of each of the armrests 5, 5 relative to the seatback 3 will be explained. As illustrated in FIG. 2, an adjusting range Z1 from a predetermined initial position A0 where the armrest 5 substantially extends in a forward direction to a predetermined boundary position A1 where the armrest 5 substantially extends in an obliquely upward, and an idle range Z2 from the boundary position A1 to a predetermined reversing position A2 where the armrest 5 substantially extends upwardly are specified for a tilt angle θ of the armrest 5 relative to the seatback 3. The reversing position A2 where the armrest 5 is arranged along the seatback 3 is a retracted position of the armrest 5.

In the adjusting range Z1, the rotation of the armrest 5 in a clockwise direction in FIG. 2 from the initial position A0 to the boundary position A1, i.e., an upward movement of the armrest 5, is allowed. On the other hand, the rotation of the armrest 5 in a counterclockwise direction in FIG. 2 corresponding to a reverse direction, i.e., in a downward movement of the armrest 5, is restricted or prohibited. The tilt angle θ of the armrest 5 is adjustable in multiple steps, or maintainable at the multiple steps (e.g., five steps according to the present embodiment) by every predetermined angle.

In the idle range Z2, the rotation of the armrest 5 in the both directions is allowed. That is, the upward movement and the downward movement of the armrest 5 are allowed. Specifically, after the armrest 5 reaches the reversing position A2, the operation of the armrest 5 is changed or switched so that the downward movement of the armrest 5 in the adjusting range Z1 is also allowed.

Figure 3:
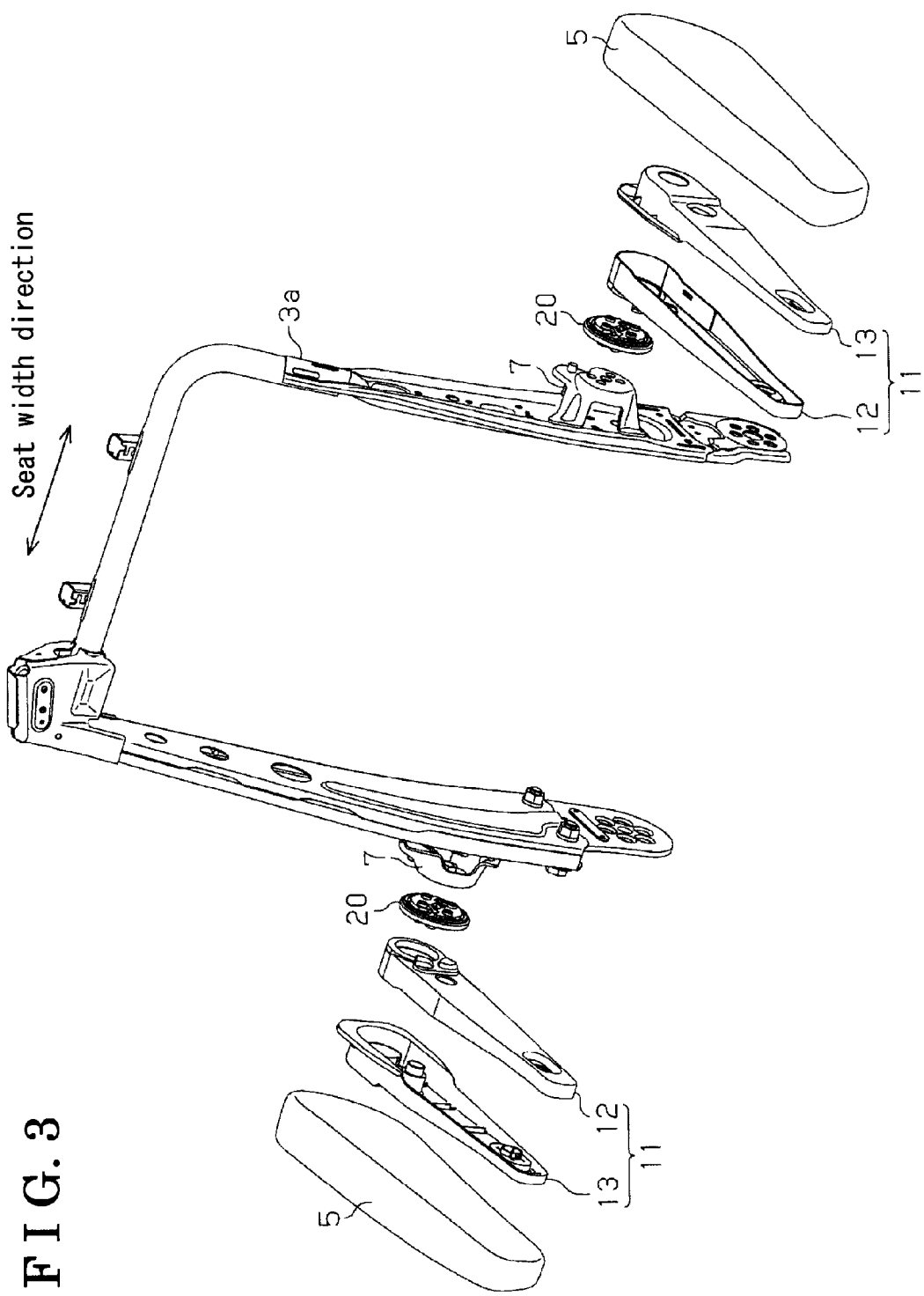
FIG. 3 is an exploded perspective view of a portion of the seat.

Next, each of the armrests 5, 5 and a peripheral configuration thereof will be explained. As illustrated in FIG. 3, a seatback frame 3a constituting the seatback 3 is substantially formed in a U-shape opening downwardly. A pair of brackets 7 is fixed to middle portions of the seatback frame 3a in a height direction so as to face and extend outwardly in a width direction of the seat 1 (in a seat width direction). Each of the brackets 7 is substantially formed in a round table form. An armrest body 11 constituting the armrest 5 includes a pair of armrest frames 12 and 13 each formed in an elongated box. The armrest frames 12 and 13 are joined in a state where openings of the armrest frames 12 and 13 face each other. The armrest body 11 is connected to the bracket 7 via an adjusting mechanism 20 substantially formed in a disc shape so as to be rotatable at an axial line extending in the seat width direction. That is, the armrest 5 incorporating the armrest body 11 is supported by the seatback 3 so as to be rotatable or tiltable relative to the seatback 3 via the adjusting mechanism 20.

Figure 4B:
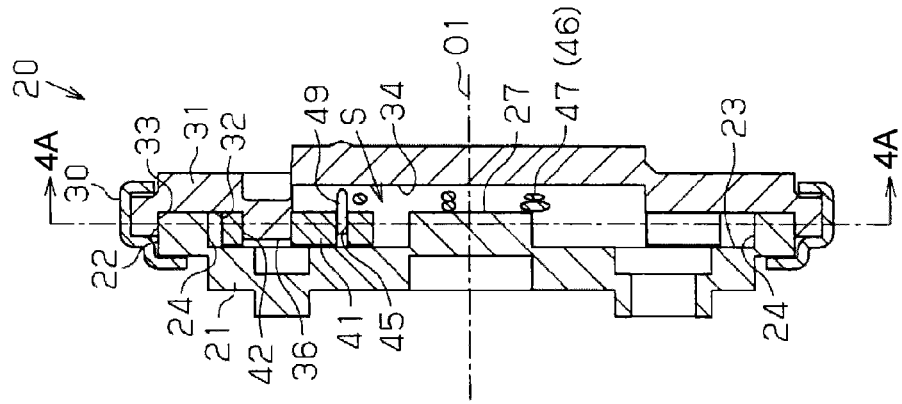
FIG. 4B is a cross-sectional view of the adjusting mechanism according to the first embodiment taken along line 4B-4B in FIG. 4A.
Figure 4A:
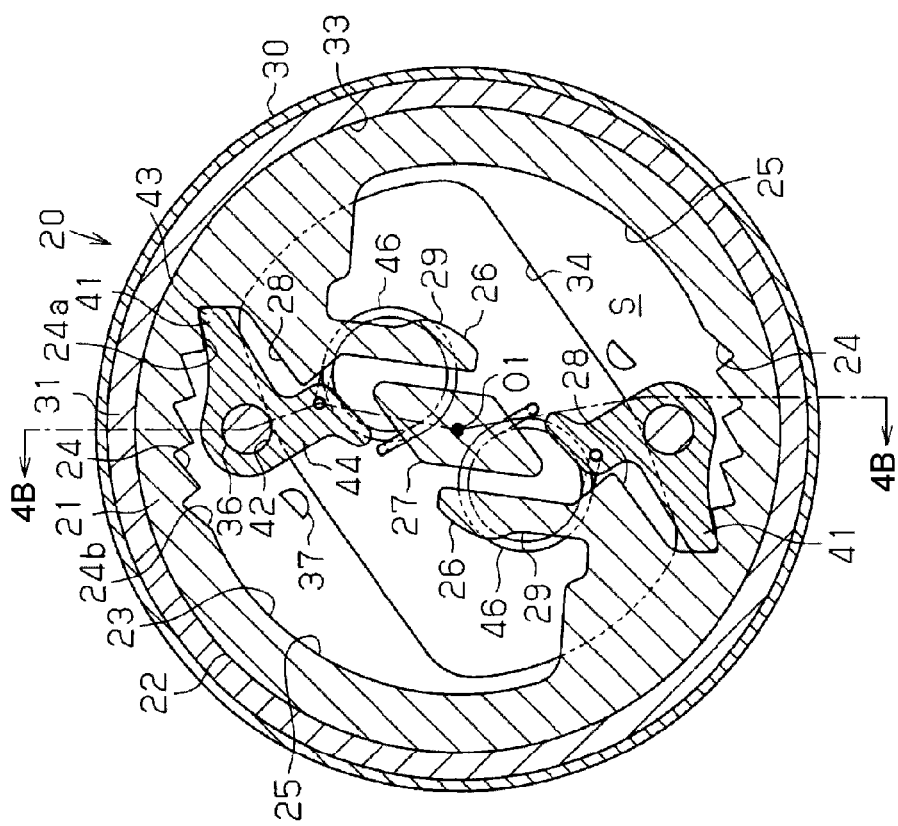
FIG. 4A is a cross-sectional view of an adjusting mechanism according to the first embodiment taken along line 4A-4A in FIG. 4B.

The adjusting mechanism 20 will be explained below. As illustrated in FIGS. 4A and 4B, the adjusting mechanism 20 includes a first bracket 21 and a second bracket 31 each formed in a disc shape and each of which a center line (an axis) O1 extends in the seat width direction. The first bracket 21 is fixed to the bracket 7, i.e., fixed to the seatback 3, and the second bracket 31 is fixed to the armrest frame 12, i.e., fixed to the armrest 5, for example.

The first bracket 21 is formed by half-blanking a metal plate, for example. The first bracket 21 includes an outer peripheral surface 22 formed in a circle with the center of the axis O1. The first bracket 21 also includes a recess portion 23 opening towards the second bracket 31 and substantially formed in a circle. The recess portion 23 is point symmetrical or rotationally symmetrical about the axis O1. The recess portion 23 integrally includes a pair of ratchet inner teeth portions 24, a pair of wall portions for idle running, i.e., hereinafter referred to as idle wall portions 25, a pair of wall portions for switching, i.e., hereinafter referred to as switch wall portions 26, and a wall portion for holding spring, i.e., hereinafter referred to as a spring holding wall portion 27. The pair of ratchet inner teeth portions 24 is formed at portions of an inner wall surface of the recess portion 23, the portions facing each other relative to the axis O1. The pair of idle wall portions 25, each formed in an arc surface shape, is formed so as to be connected to the pair of ratchet inner teeth portions 24. Specifically, first ends of the idle wall portions 25 are connected to second ends of the ratchet inner teeth portions 24. The pair of switch wall portions 26, each extending towards the axis O1, is formed between the pair of ratchet inner teeth portions 24 and the pair of idle wall portions 25 so as to extend towards the axis O1. Specifically, first ends of the switch wall portions 26 are connected to second ends of the idle wall portions 25 while second ends of the switch wall portions 26 are connected to first ends of the ratchet inner teeth portions 24. That is, the ratchet inner teeth portion 24, the idle wall portion 25, and the switch wall portion 26 are provided at each of opposite sides on the inner wall surface of the recess portion 23 symmetrically with respect to the axis O1 to serve as a pair. The spring holding wall portion 27 that is provided at a portion including the axis O1 extends towards the second bracket 31 so as to be formed into a column substantially having a parallelogram shape.

Respective wall surfaces of the switch wall portions 26 adjacent to the ratchet inner teeth portions 24 form bracket side wall portions for returning, i.e., hereinafter referred to as bracket side return wall portions 28 respectively. Each of the bracket side return wall portions 28 is formed in such a manner that a base portion linearly extends towards the adjacent ratchet inner teeth portion 24 relative to a direction towards the axis O1. In addition, respective wall surfaces of the switch wall portions 26 adjacent to the idle wall portions 25 form bracket side wall portions for reversing, i.e., hereinafter referred to as bracket side reverse wall portions 29 respectively. Each of the bracket side reverse wall portions 29 is formed in such a manner that a base portion linearly extends towards the adjacent idle wall portion 25 relative to a direction towards the axis O1.

Figure 5:
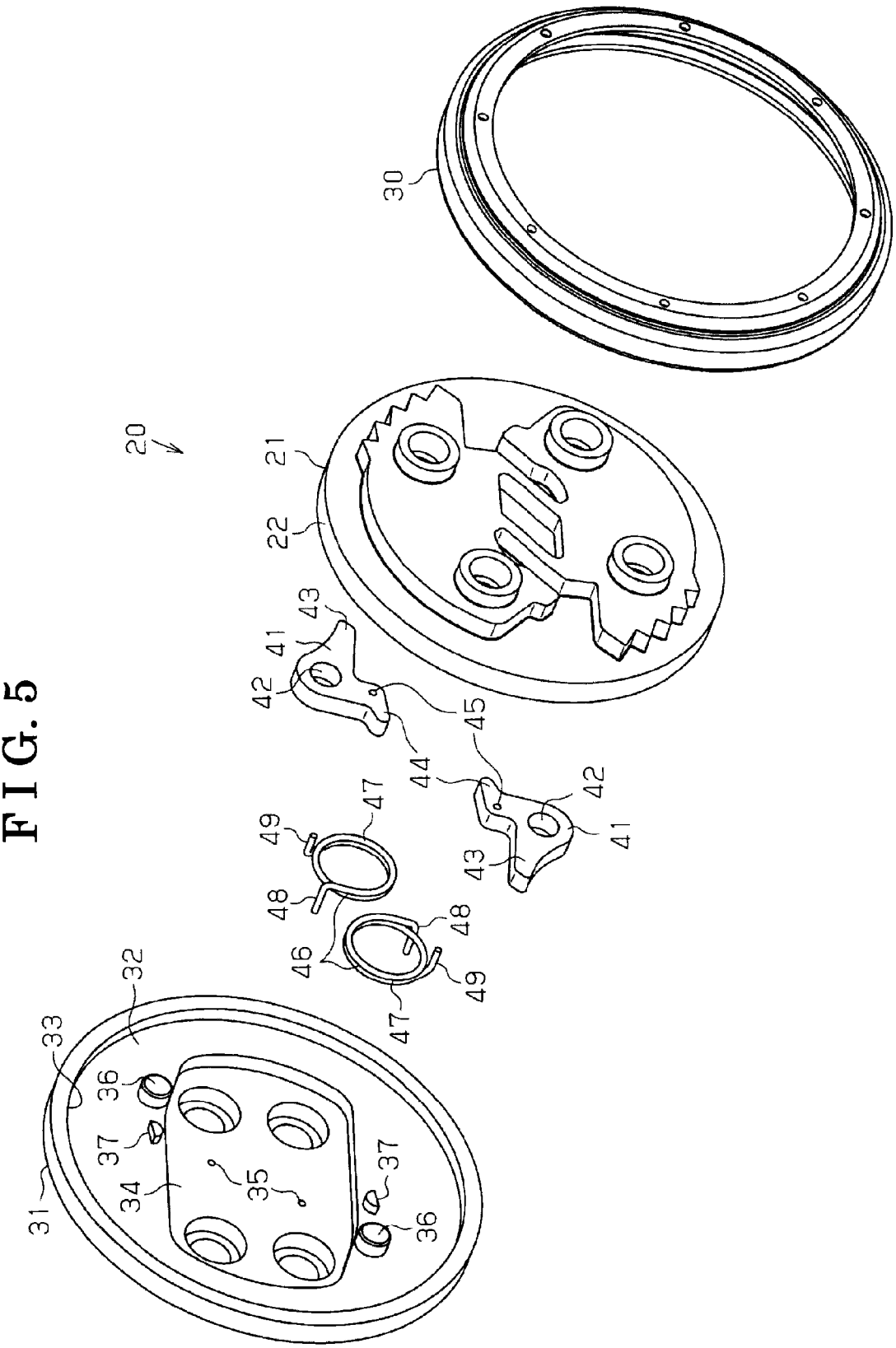
FIG. 5 is an exploded perspective view of the adjusting mechanism according to the first embodiment disclosed here.

The second bracket 31 is formed by half-blanking a metal plate, for example. As illustrated in FIG. 5, the second bracket 31 includes a recess portion 32 opening towards the first bracket 21 and substantially formed in a circle. The recess portion 32 includes an inner peripheral surface 33 having an inner diameter substantially equal to an outer diameter of the outer peripheral surface 22 of the first bracket 21. The recess portion 32 is point symmetrical or rotationally symmetrical about the axis O1. The second bracket 31 includes a spring accommodating portion 34 formed at a center of the recess portion 32 so as to be dented in a direction opposite from the first bracket 21 and to be formed in a substantially ellipse form, or a track like form including linear sides facing each other and arced portions. A pair of bracket side spring retaining holes 35 is formed at the spring accommodating portion 34. Each of the bracket side spring retaining holes 35 extends substantially in parallel with the axis O1. A pair of pawl shaft portions 36 substantially having a column shape is formed to protrude at a radially outer side of the spring accommodating portion 34. Further, a pair of pawl support portions 37 substantially having a column shape is formed to protrude at respective portions adjacent to the pawl shaft portions 36. The protruding direction of each of the pawl shaft portions 36 and the pawl support portions 37 is arranged substantially in parallel with the axis O1.

As illustrated in FIG. 4B, the first bracket 21 is fitted to the second bracket 31 in a state where the outer peripheral surface 22 of the first bracket 21 is slidably in contact with the inner peripheral surface 33 of the second bracket 31. A holding member 30 made of a metal plate and formed in a ring shape is attached to outer peripheral portions of the first bracket 21 and the second bracket 31 in a state where the first bracket 21 is fitted to the second bracket 31 via the outer peripheral surface 22 and the inner peripheral surface 33. The first bracket 21 and the second bracket 31 are inhibited from disengaging in a direction of the axis O1, i.e., in an axial direction, by the holding member 30 in a state where a relative rotation between the first bracket 21 and the second bracket 31 is allowed. An accommodating void S is formed between the first bracket 21 and the second bracket 31. The pair of pawl shaft portions 36 and the pair of pawl support portions 37 of the second bracket 31 are configured to be arranged within the recess portion 23 of the first bracket 21 within a relative rotation range of the first bracket 21 and the second bracket 31, i.e., a range from the initial position A0 to the reversing position A2 of the tilt angle θ of the armrest 5.

A pair of pawls 41 made of steel, for example, is accommodated in the accommodating void S. Each of the pawls 41 includes a bearing hole 42, a ratchet portion 43, and a pawl side wall portion for reversing, i.e., hereinafter referred to as a pawl side reverse wall portion 44. The bearing hole 42 is formed in a circular shape and pivotally supported by the pawl shaft portion 36. The ratchet portion 43 having a hook shape and serving as a pawl side return wall portion radially extends relative to the bearing hole 42 in a direction different from a direction where the pawl side reverse wall portion 44 extends. A pawl side spring retaining hole 45 is formed at an end portion of the pawl side reverse wall portion 44 so as to extend substantially in parallel with the axis O1.

A pair of springs for reversing pawl, i.e., hereinafter referred to as a pawl reverse spring 46 each formed by a torsion spring, for example, is accommodated within the accommodating void S. Each of the pawl reverse springs 46 includes a coil portion 47 of which an axis extends substantially in parallel with the axis O1. In addition, the pawl reverse spring 46 includes a first end portion 48 and a second end portion 49. The first end portion 48 is bent from a first end of the coil portion 47 positioned away from the second bracket 31 so as to extend substantially in parallel with the axis O1. The first end portion 48 is fitted to the bracket side spring retaining hole 35. The second end portion 49 is bent from a second end of the coil portion 47 positioned away from the pawl 41 so as to extend substantially in parallel with the axis O1. The second end portion 49 is fitted to the pawl side spring retaining hole 45. The first end portion 48 and the second end portion 49 are arranged at an outer peripheral portion of the coil portion 47 so as to overlap the outer peripheral portion. The first end portion 48 and the second end portion 49 are fixed to the bracket side spring retaining hole 35 and the pawl side spring retaining hole 45 respectively.

Accordingly, plural pairs, specifically, two pairs according to the present embodiment, in which one pair is constituted by the pawl 41 and the pawl reverse spring 46, are arranged within the accommodating void S so as to be rotationally symmetric to each other. Each of the coil portions 47 arranged within the spring accommodating portion 34 is restricted to move in the axial direction by the spring holding wall portion 27 of the first bracket 21 that makes contact with the coil portion 47 or that is positioned close to the coil portion 47.

According to the aforementioned configuration, in a case where the armrest 5 is in the initial position A0, a relative rotational position between the first bracket 21 and the second bracket 31 is obtained as illustrated in FIG. 4A. At this time, each of the pawls 41 is biased by the pawl reverse spring 46 to rotate in a counterclockwise direction in FIG. 4A serving as a normal direction relative to the pawl shaft portion 36 or the bearing hole 42. The ratchet portion 43 of the pawl 41 engages with an initial tooth portion 24a of the ratchet inner teeth portion 24. In a case where the second bracket 31 rotates relative to the first bracket 21 in the counterclockwise direction in FIG. 4A in the aforementioned state, for example, each of the pawls 41 rotates against the biasing force of the pawl reverse spring 46 so as to sequentially or consecutively override or climbs over each of teeth of the ratchet inner teeth portion 24 while the ratchet portion 43 is being guided by the ratchet inner teeth portion 24. Therefore, the second bracket 31 is rotatable relative to the first bracket 21 in the counterclockwise direction in FIG. 4A serving as a first direction and is inhibited from rotating relative to the first bracket 21 in a clockwise direction in FIG. 4A serving as a second direction in a range from a relative rotational position where the ratchet portion 43 of the pawl 41 engages with the initial tooth portion 24a of the ratchet inner teeth portion 24 to a relative rotational position where the ratchet portion 43 engages with a final tooth portion 24b of the ratchet inner teeth portion 24. The relative rotational position between the first bracket 21 and the second bracket 31 in a case where the ratchet portion 43 of the pawl 41 engages with the final tooth portion 24b of the ratchet inner teeth portion 24 corresponds to the boundary position A1 of the armrest 5.

Figure 6:
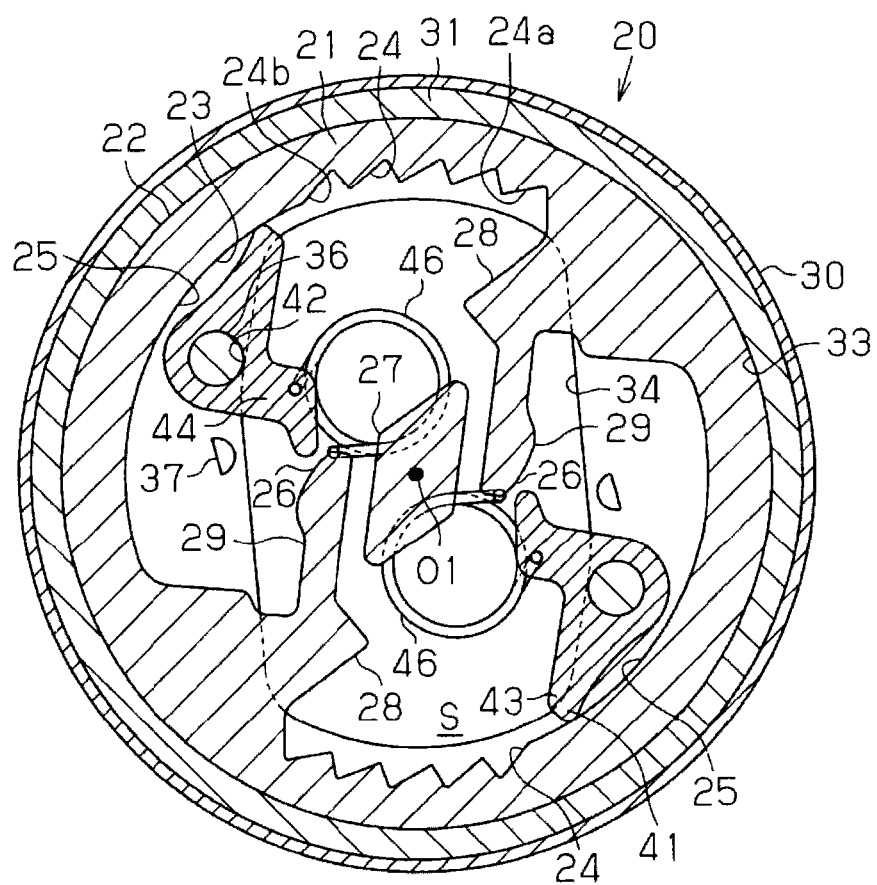
FIG. 6 is an explanatory view illustrating an operation of the adjusting mechanism in a case where a pawl slides on an idle wall portion.
Figure 7:
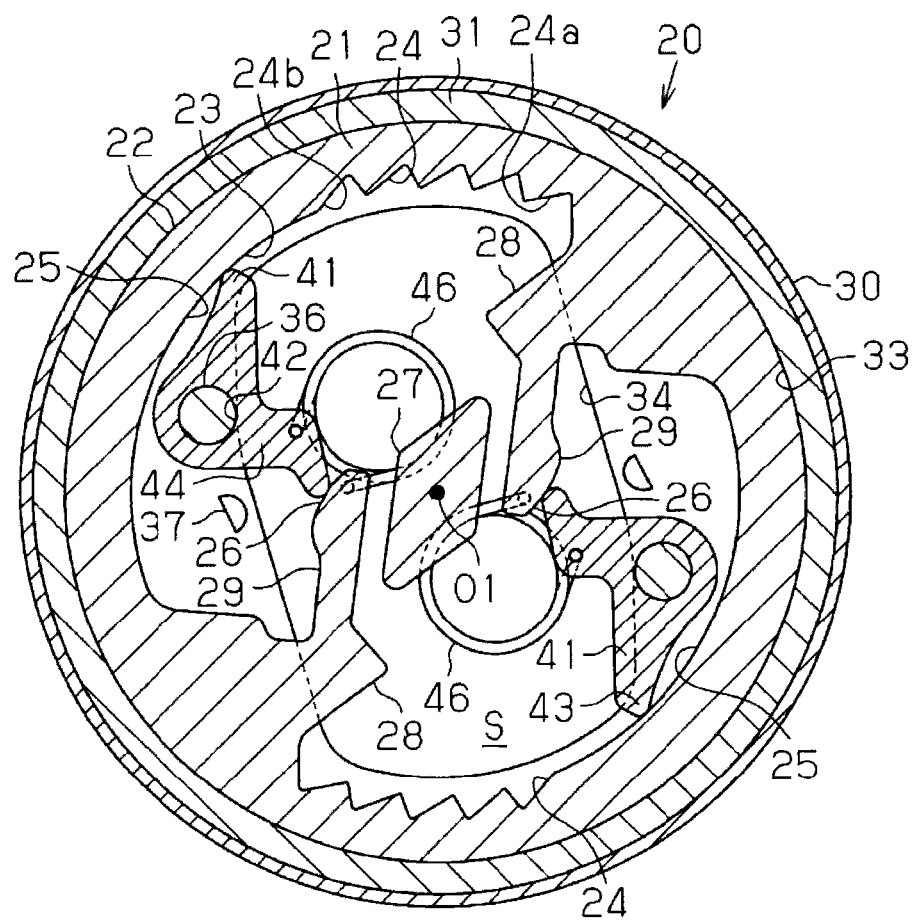
FIG. 7 is an explanatory view illustrating an operation of the adjusting mechanism in a case where the pawl starts rotating in a reverse direction.
Figure 8:
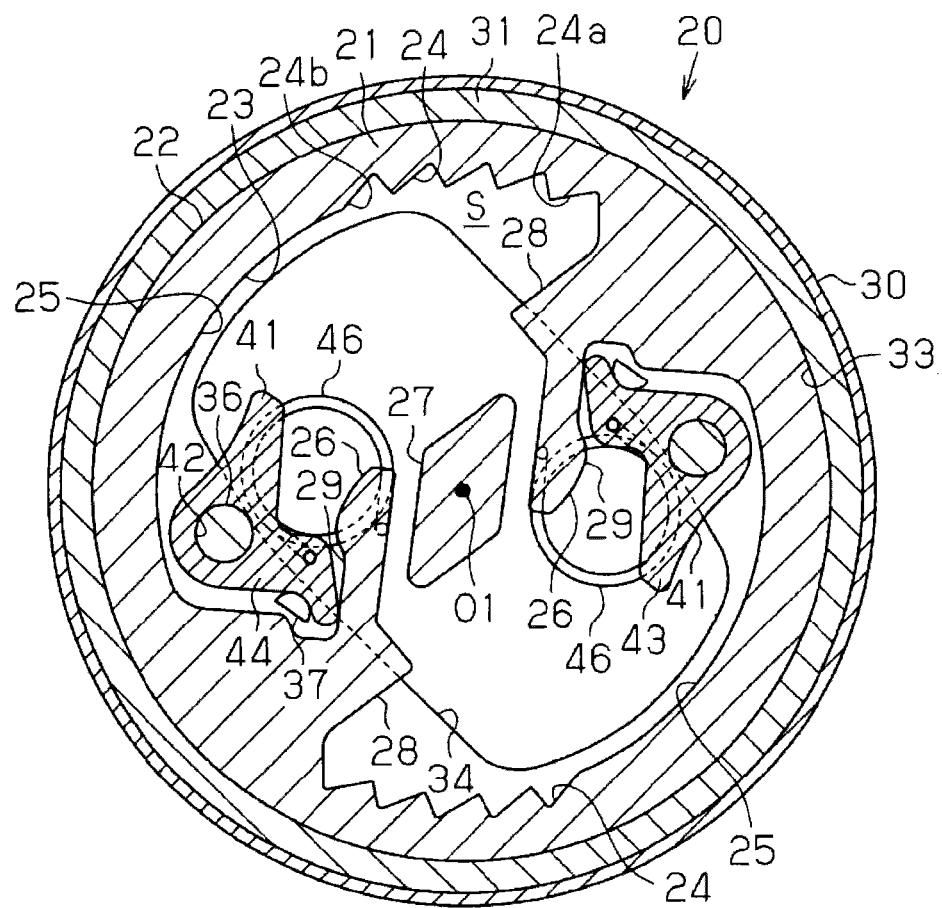
FIG. 8 is an explanatory view illustrating an operation of the adjusting mechanism in a case where the rotation of the pawl in the reverse direction is completed.

In a case where the second bracket 31 further rotates in the counterclockwise direction relative to the first bracket 21, the ratchet portion 43 of the pawl 41 that overrides or climbs over the final tooth portion 24b slides on the idle wall portion 25 as illustrated in FIG. 6. Then, when the second bracket 31 further rotates in the counterclockwise direction relative to the first bracket 21, the pawl side reverse wall portion 44 of the pawl 41 is started to be pressed against the bracket side reverse wall portion 29 of the switch wall portion 26 as illustrated in FIG. 7. Thus, the pawl 41 is started to rotate in the clockwise direction in FIG. 7 against the biasing force of the pawl reverse spring 46. In a case where the second bracket 31 further rotates in the counterclockwise direction relative to the first bracket 21, the pawl reverse spring 46 is turned over in association with the further rotation of the pawl 41 in the clockwise direction as illustrated in FIG. 8. Accordingly, the pawl 41 is biased by the pawl reverse spring 46 to rotate in the clockwise direction in FIG. 8, i.e., in a reverse direction, relative to the pawl shaft portion 36 or the bearing hole 42. That is, each of the pawls 41 is biased to rotate in the aforementioned reverse direction by the pawl reverse spring 46.

In a case where each of the pawls 41 is biased to rotate in the reverse direction, i.e., is reversed, the pawl side reverse wall portion 44 is held by the pawl support portion 37 so that the pawl 41 is inhibited from rotating. In a state where the pawl 41 is reversed, the pawl 41 is away from the recess portion 23 of the first bracket 21 and thus the rotation of the second bracket 31 relative to the first bracket 21 in the clockwise direction, i.e., a return rotation of the second bracket 31, is not restricted by the pawl 41. The relative rotational position between the first bracket 21 and the second bracket 31 in the case where the pawl 41 is reversed corresponds to the reversing position A2 of the armrest 5.

In a case where the second bracket 31 rotates in the clockwise direction relative to the first bracket 21, i.e., in a case where the second bracket 31 performs the return rotation in a state where the pawl 41 is reversed, the ratchet portion 43 is started to be pressed against the bracket side return wall portion 28 of the switch wall portion 26 as illustrated in FIG. 9 so that the pawl 41 is started to rotate in the counterclockwise direction in FIG. 9 against the biasing force of the pawl reverse spring 46. Then, in a case where the second bracket 31 further rotates in the clockwise direction relative to the first bracket 21, the pawl reverse spring 46 is turned over in association with the further rotation of the pawl 41 in the counterclockwise direction as illustrated in FIG. 4A so that the pawl 41 is biased to rotate in the normal direction by the pawl reverse spring 46. That is, each of the pawls 41 is reversed to return so as to be biased to rotate in the normal direction by the pawl reverse spring 46.

When the pawl 41 is reversed to return, the ratchet portion 43 of the pawl 41 engages with the initial tooth portion 24a of the ratchet inner teeth portion 24 to thereby restrict the pawl 41 from rotating, At this time, the relative rotational position between the first bracket 21 and the second bracket 31 corresponds to the initial position A0.

An operation of each of the armrests 5, 5 in an initial state by being arranged in the initial position A0, i.e., in the lowermost position or state, will be explained below. As mentioned above, in a case where the armrest 5 is arranged at the initial position A0, the ratchet portion 43 of the pawl 41 engages with the initial tooth portion 24a of the ratchet inner teeth portion 24 in a state where the pawl 41 is biased to rotate in the normal direction by the pawl reverse spring 46. Then, in a case where the armrest 5 moves upward in a state where the tilt angle θ of the armrest 5 falls within the adjusting range Z1, the ratchet portion 43 of the pawl 41 sequentially engages with the teeth of the ratchet inner teeth portion 24, thereby adjusting and holding the tilt angle θ of the armrest 5 in multiple step, i.e., in a stepwise manner, from the lowermost state.

In a case where the armrest 5 moves upward beyond the adjusting range Z1 into the idle range Z2, the ratchet portion 43 of the pawl 41 slides on the idle wall portion 25 to thereby promptly or swiftly move the armrest 5 upwards (i.e., the armrest 5 flips up) to the reversing position A2.

In a case where the armrest 5 reaches the reversing position A2, the pawl 41 is reversed so as to be biased to rotate in the reverse direction by the pawl reverse spring 46. The pawl 41 is then separated from the first bracket 21. Accordingly, the armrest 5 may promptly move downward to the initial position A0, for example. The armrest 5 is held at the reversing position A2 by a friction force between the first bracket 21 and the second bracket 31.

In a case where the armrest 5 reaches the initial position A0, the pawl 41 is reversed to return so as to be biased to rotate in the normal direction by the pawl reverse spring 46. Then, the ratchet portion 43 of the pawl 41 engages with the initial tooth portion 24a of the ratchet inner teeth portion 24 so that the armrest 5 returns to the initial state. Accordingly, the tilt angle θ of the armrest 5 may be adjusted and held again in a stepwise manner.

According to the aforementioned first embodiment, following effects are obtained. (1) The pawls 41 each of which the ratchet portion 43 engages with the ratchet inner teeth portion 24 of the first bracket 21 are arranged within the accommodating void S formed between the first bracket 21 and the second bracket 31 which are inhibited from moving or disengaging in the axial direction by the holding member 30. Therefore, the ratchet inner teeth portion 24 and the ratchet portion 43 are inhibited from being misaligned in the axial direction. The tilt angle θ of the armrest 5 may be further stably maintained. In addition, the tilt angle θ of the armrest 5 is adjusted and held by a simple structure including the pawls 41 and the pawl reverse springs 46, for example, arranged within the accommodating void S.

(2) According to the aforementioned first embodiment, the axial direction of the coil portion 47 of the pawl reverse spring 46 is parallel to the axial direction (i.e., the axis O1) of the first bracket 21 and the second bracket 31. Thus, compared to a case where the radial direction of the coil portion 47 is parallel to the axial direction of the first bracket 21 and the second bracket 31, space for arranging the pawl reverse spring 46 may be reduced in the axial direction of the first bracket 21 and the second bracket 31.

(3) According to the aforementioned first embodiment, the plural pairs, i.e., two pairs according to the first embodiment, for example, in which one pair is constituted by the pawl 41 and the pawl reverse spring 46 are arranged within the accommodating void S so as to be rotationally symmetric or point symmetric to one another. Accordingly, the tilt angle θ of the armrest 5 may be securely adjusted and held by the plural pairs of the pawl 41 and the pawl reverse spring 46, for example. In addition, the plural pairs of the pawl 41 and the pawl reverse spring 46 are arranged within the accommodating void S so as to be rotationally symmetric. Thus, a load generated in a state where the tilt angle θ of the armrest 5 is adjusted and held is uniformly distributed or dispersed in the rotation direction of the first bracket 21 and the second bracket 31.

(4) According to the aforementioned first embodiment, the spring holding wall portion 27 of the first bracket 21 presses or holds the coil portions 47 of the pawl reverse springs 46 relative to the spring accommodating portion 34 of the second bracket 31 in the axial direction. Thus, a lift-up of each of the coil portions 47 may be restrained.

(5) According to the aforementioned first embodiment, the first end portion 48 and the second end portion 49 of each of the pawl reverse springs 46 are bent so as to overlap the outer peripheral portion of the coil portion 47. Thus, a fall-over of the coil portion 47 may be restrained.

(6) According to the aforementioned first embodiment, the idle range Z2 (the idle wall portion 25) is specified for the tilt angle θ of the armrest 5. Thus, the armrest 5 may promptly move upward to the retracted position, i.e., to the reversing position A2. Specifically, in a case where the armrest 5 is operatively connected to the seatback 3 so that the armrest 5 moves towards the retracted position (the reversing position A2) in association with the forward folding of the seatback 3, the seatback 3 may be smoothly folded forward while the armrest 5 is being retracted.

[Second Embodiment]

A second embodiment will be explained with reference to FIGS. 10 and 11. The second embodiment is modified from the first embodiment so that a start of a return operation (a restoring operation) of the armrest 5 is moderately performed. An explanation of similar portions of the second embodiment to the first embodiment will be omitted.

Figure 10:
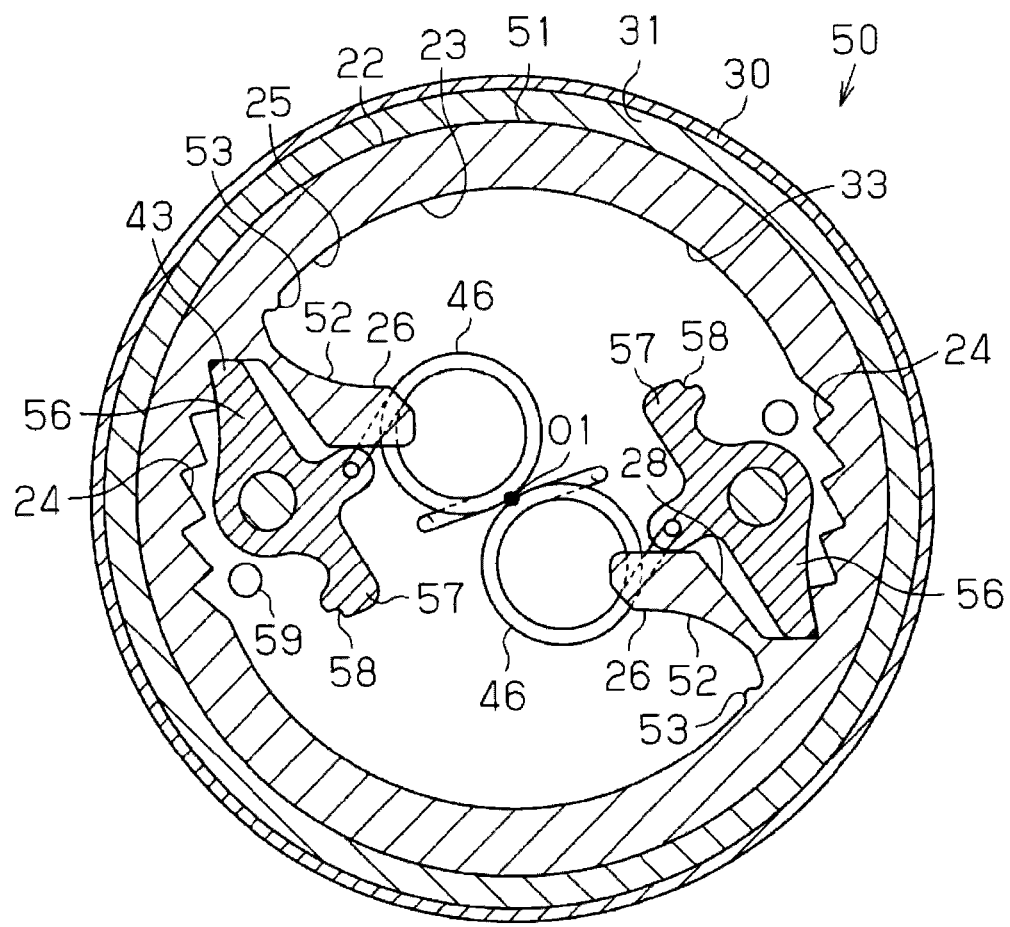
FIG. 10 is a cross-sectional view of the adjusting mechanism explaining an initial state (a return state) of an adjusting mechanism according to a second embodiment disclosed here.

As illustrated in FIG. 10, each bracket side wall portion for reversing, i.e., hereinafter referred to as a bracket side reverse wall portion 52, of a first bracket 51 of an adjusting mechanism 50 extends and curves towards the adjacent idle wall portion 25 relative to a direction towards the axis O1. An engagement projection for reversing, i.e., hereinafter referred to as a reverse engagement projection 53, is formed at the idle wall portion 25 so as to extend towards the axis O1. The reverse engagement projection 53 is positioned in the vicinity of the bracket side reverse wall portion 52.

An engagement recess portion for reversing, i.e., hereinafter referred to as a reverse engagement recess portion 58, is formed to be dented at an end of a pawl side wall portion for reversing, i.e., hereinafter referred to as a pawl side reverse wall portion 57, of each pawl 56 facing an inner wall surface of the recess portion 23. As illustrated in FIG. 11, the reverse engagement projection 53 is fitted to the reverse engagement recess portion 58 in a case where the pawl 56 is reversed. Each pawl support portion 59 inhibiting the pawl 56 from rotating when the pawl 56 is reversed is substantially formed in a column.

An operation of the second embodiment will be explained. According to the second embodiment, an operation immediately before the armrest 5 moves upward (I.e., the flips up) towards the reversing position A2 from the initial position A0 is the same as the first embodiment and thus an explanation thereof will be omitted.

Figure 11:
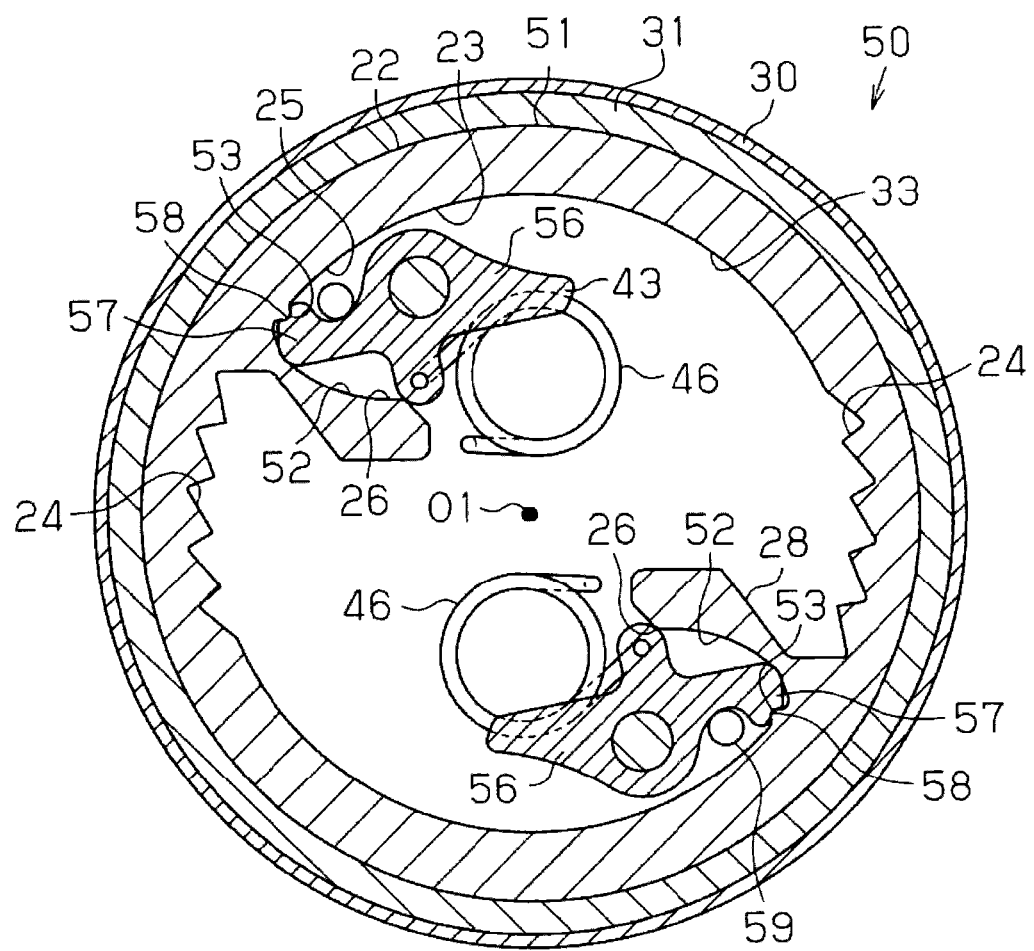
FIG. 11 is a cross-sectional view of the adjusting mechanism explaining a case where a pawl is in a reversed state according to the second embodiment disclosed here.

As mentioned above, in a case where the pawl 56 is reversed, i.e., the armrest 5 reaches the reversing position A2, the reverse engagement projection 53 is fitted to the reverse engagement recess portion 58 as illustrated in FIG. 11. At this time, the pawl 56 is substantially separated from the first bracket 51, i.e., the pawl 56 is simply connected to the first bracket 51 via the engagement between the reverse engagement recess portion 58 and the reverse engagement projection 53. The armrest 5 is held or maintained at the reversing position A2 by the engagement force between the reverse engagement recess portion 58 and the reverse engagement projection 53 in addition to the friction force between the first bracket 51 and the second bracket 31.

In a case where the armrest 5 moves downward towards the initial position A0 in the aforementioned state, the second bracket 31 rotates in the clockwise direction relative to the first bracket 51, i.e., the second bracket 31 performs the return rotation, so that the pawl 56 rotates against the biasing force of the pawl reverse spring 46 and the reverse engagement recess portion 58 disengages from, i.e., overrides, the reverse engagement projection 53. Accordingly, the start of the return operation of the armrest 5 is moderately performed.

Once the reverse engagement recess portion 58 disengages from the reverse engagement projection 53, the armrest 5 may promptly move downward, for example.

According to the aforementioned second embodiment, a following effect is obtained in addition to the effects of the first embodiment. (1) According to the second embodiment, the reverse engagement projection 53 is fitted to the reverse engagement recess portion 58 when the pawl 56 is reversed. Thus, when the second bracket 31 starts rotating in the clockwise direction in FIG. 11 relative to the first bracket 51 (i.e., performs the return rotation), the reverse engagement recess portion 58 disengages from the reverse engagement projection 53, which leads to the moderate start of the return operation of the armrest 5.

[Third Embodiment]

A third embodiment will be explained with reference to FIGS. 12 to 14. The third embodiment includes a configuration where the adjusting mechanism is applied to adjust a tilt angle of the ottoman 6 relative to the seat cushion 2. An explanation of similar portions of the third embodiment to the first and second embodiments will be omitted.

Figure 12:
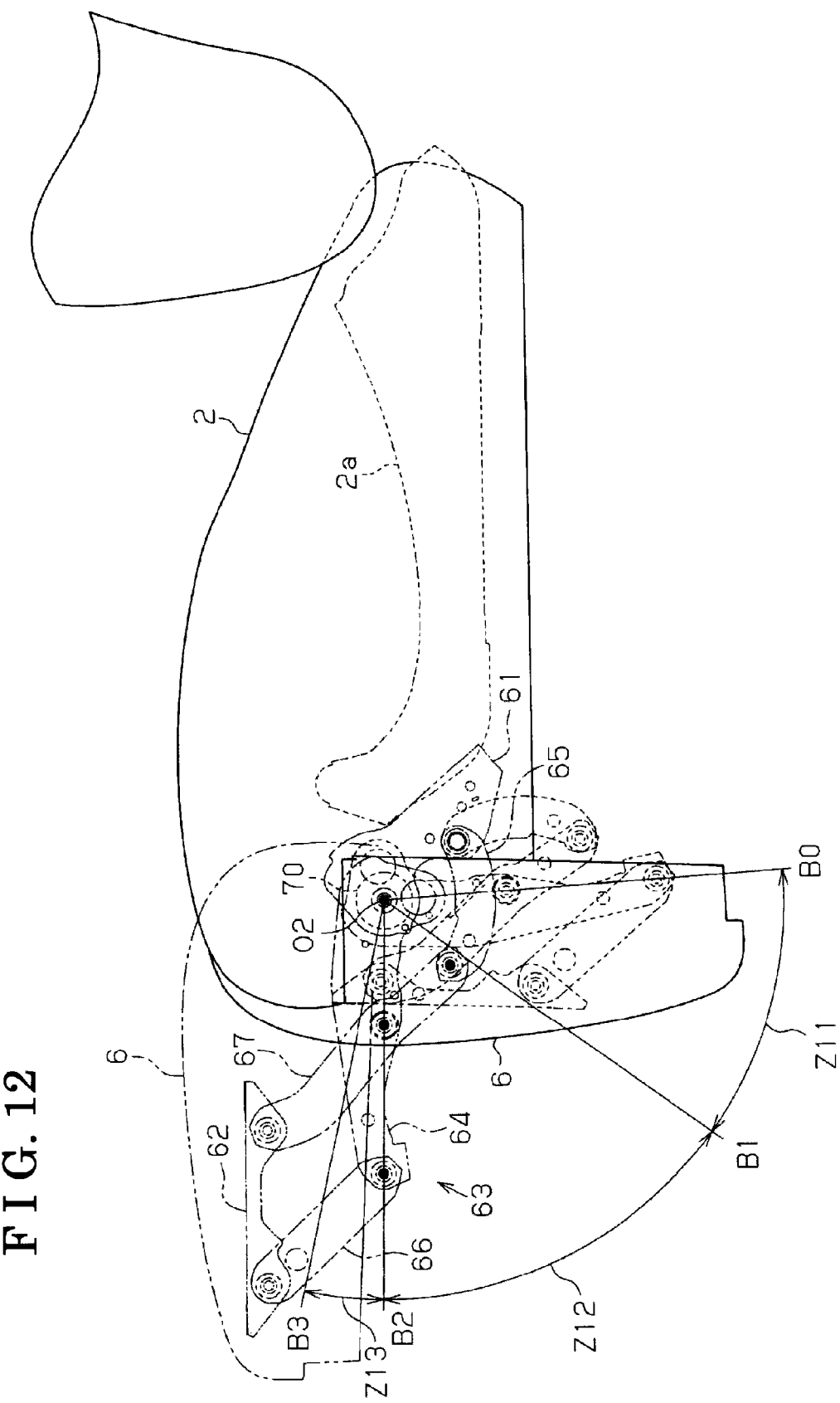
FIG. 12 is a lateral view explaining an operation of an adjusting mechanism according to a third embodiment disclosed here.

As illustrated in FIG. 12, a bracket 61 made from, for example, a metal plate is secured to a front end portion of a seat cushion side frame 2a which serves as a frame for a lateral portion of the seat cushion 2. The seat cushion side frame 2a is made from, for example, a metal plate. A support bracket 62 made from, for example, a metal plate is connected to the bracket 61 via a link mechanism 63. Each support shaft of the link mechanism 63 is arranged so that an axis of the support shaft extends in a seat width direction. The bracket 61, the support bracket 62, and the link mechanism 63 fixed to the seat cushion side frame 2a, for example, are provided at each of opposite ends of the seat 1 in the seat width direction to serve as a pair.

The link mechanism 63 structures a pantograph linkage and includes a main pivot link 64, an auxiliary pivot link 65, a first swing link 66, and a second swing link 67. A first end portion of the main pivot link 64 is rotatably connected to an upper end portion (a first end portion) of the bracket 61 via an adjusting mechanism 70 formed in a disc shape. A second end portion of the main pivot link 64 is rotatably connected to a first end portion of the first swing link 66. A second end portion of the first swing link 66 is rotatably connected to an end portion of the support bracket 62.

A first end portion of the auxiliary pivot link 65 is rotatably connected to a lower end portion (a second end portion) of the bracket 61. A second end portion of the auxiliary pivot link 65 is rotatably connected to a first end portion of the second swing link 67. A second end portion of the second swing link 67 is rotatably connected to a base and portion of the support bracket 62, An intermediate portion of the second swing link 67 in a longitudinal direction thereof is rotatably connected to an intermediate portion of the main pivot link 64 in a longitudinal direction thereof.

Upon a pivotal motion, or rotation of the main pivot link 64, for example, in a clockwise direction in FIG. 12 from a state where the main pivot link 64 extends downwards, as illustrated with two-dotted lines, the first and second swing links 66, 67 extend in a forward direction relative to the seat so that the ottoman 6 supported by the support bracket 62 is deployed (deployed position, deployed state). On the other hand, in a case where the main pivot link 64 rotates in a counterclockwise direction from the deployed state of the ottoman 6 (i.e., a state where the main pivot link 64 extends in a substantially forward direction), the first and second swing links 66, 67 are folded back, or rotated in a rearward of the seat, so that the ottoman 6 supported by the support bracket 62 is retracted (retracted position, retracted state).

A tilt angle or an inclination angle of the ottoman 6 relative to the seat cushion 2 will be explained as follows. As illustrated in FIG. 12, a pivoting position of the main pivot link 64 related to a tilt angle O1 of the ottoman 6 relative to the seat cushion 2 includes an approaching range Z11 ranged from a predetermined retracted position BO at which the main pivot link 64 extends downward together with the support bracket 62 (the ottoman 6) to a predetermined first boundary position B1 at which the main pivot link 64 extends obliquely downward in a forward direction, an adjusting range Z12 ranged from the first boundary position B1 to a predetermined second boundary position B2 at which the main pivot link 64 extends in a substantially forward direction, and an idle range Z13 ranged from the second boundary position B2 to a predetermined reversing position B3 at which the main pivot link 64 extends obliquely upward in the forward direction.

In the adjusting range Z12, the adjusting mechanism 70 allows a clockwise pivotal motion of the main pivot link 64 from the first boundary position B1 to the second boundary position B2, that is, the adjusting mechanism 70 allows an upward movement of the ottoman 6, and prohibits, or restricts a reversal pivotal motion of the main pivot link 64, that is, a downward movement of the ottoman 6. In the adjusting range Z12, the pivoting position of the main pivot link 64, that is, the tilt angle O1 of the ottoman 6, is adjustable in multiple steps, or maintainable at the multiple steps (e.g., seven steps according to the present embodiment) by every predetermined angle.

On the other hand, in the approaching range Z11, the adjusting mechanism 70 allows the pivotal motion of the main pivot link 64 in both of the clockwise and counterclockwise directions, that is, the adjusting mechanism 70 allows the upward and downward motions (upward and downward operations) of the ottoman 6. Similarly, in the idle range Z13, the adjusting mechanism 70 allows the pivotal motion of the main pivot link 64 in both of the clockwise and counterclockwise directions, that is, the adjusting mechanism 70 allows the upward and downward motions of the ottoman 6. Particularly, after the main pivot link 64 reaches the reversing position B3, the adjusting mechanism 70 switches the operation to allow the downward motion of the ottoman 6 in the adjusting range Z12.

The retracted position B0 of the main pivot link 64 corresponds to a retracted state of the ottoman 6. The second boundary position B2 corresponds to a deployed state of the ottoman 6. Next, the configuration of the adjusting mechanism 70 will be explained as follows. The adjusting mechanism 70 according to the third embodiment is modified from the adjusting mechanism 20 of the first or second embodiment so that the approaching range Z11 is specified for the pivoting position of the main pivot link 64 (i.e., the tilt angle O1 of the ottoman 6). Thus, a difference of the adjusting mechanism 70 from the adjusting mechanism 20 according to the first or second embodiment will be mainly explained below.

Figure 13:
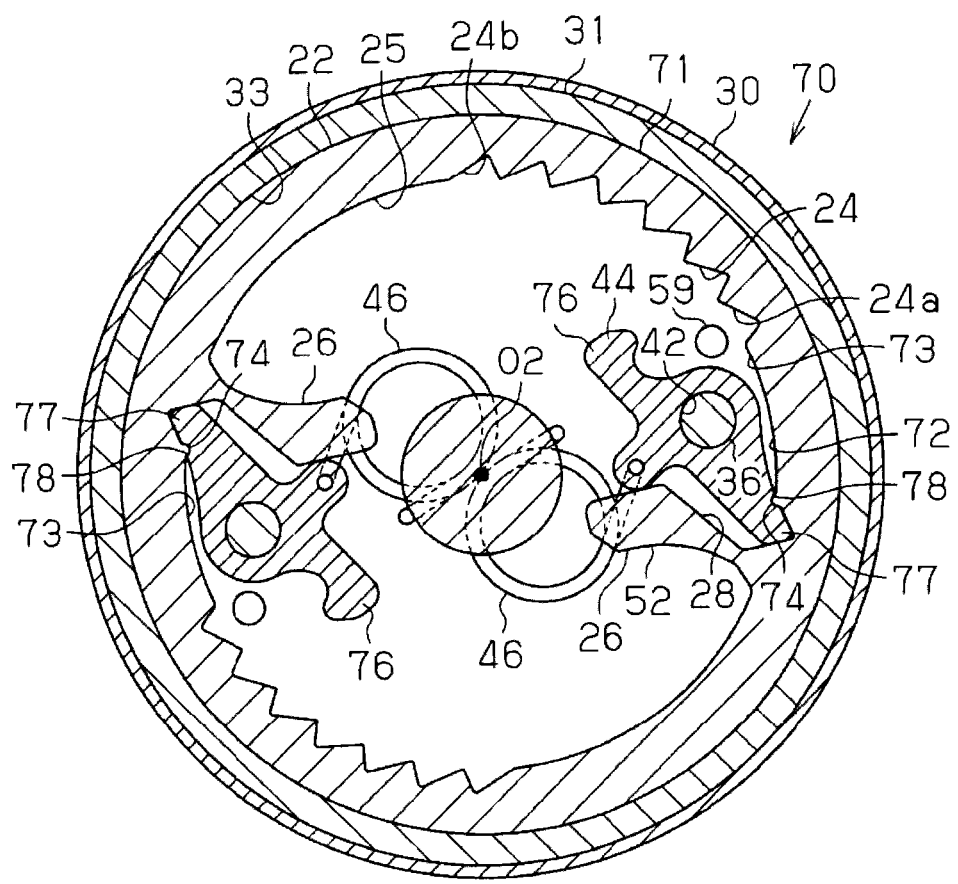
FIG. 13 is a cross-sectional view explaining an initial state (a return state) of the adjusting mechanism according to the third embodiment disclosed here.

As illustrated in FIG. 13, the adjusting mechanism 70 includes a first bracket 71 and the second bracket 31 each formed in a disc shape and each of which a center line (an axis) O2 extends in the seat width direction. The first bracket 71 is fixed to the bracket 61 (the seat cushion 2), for example, and the second bracket 31 is fixed to the main pivot link 64 (the ottoman 6), for example.

A recess portion 72 substantially formed in a circle is provided at the first bracket 71. The recess portion 72 is point symmetrical or rotationally symmetrical about the axis O2. The recess portion 72 integrally includes a pair of arc shaped wall portions for approaching, i.e., hereinafter referred to as approach wall portions 73, facing each other with respect to the axis O2, the pair of ratchet inner teeth portions 24 facing each other with respect to the axis O2 and connected to the pair of approach wall portions 73, the pair of idle wall portions 25 facing each other with respect to the axis O2, and the pair of switch wall portions 26 facing each other with respect to the axis O2. That is, the approach wall portion 73, the ratchet inner teeth portion 24, the idle wall portion 25, and the switch wall portion 26 are provided at each of opposite sides on the inner wall surface of the recess portion 72 symmetrically with respect to the axis O2 to serve as a pair. An engagement projection for returning, i.e., hereinafter referred to as a return engagement projection 74, is formed at each of the approach wall portions 73 so as to project towards the axis O2. Each of the return engagement projections 74 is positioned in the vicinity of each of the bracket side return wall portions 28.

An engagement recess portion for returning, i.e., hereinafter referred to as a return engagement recess portion 78, is formed to be dented at an end of a ratchet portion 77 of each pawl 76 facing an inner wall surface of the recess portion 72. The return engagement projection 74 is fitted to the return engagement recess portion 78 in a case where the pawl 76 is returned or restored.

According to the aforementioned configuration, in a case where the main pivot link 64 is in the retracted position B0, the relative rotational position between the first bracket 71 and the second bracket 31 is obtained as illustrated in FIG. 13. At this time, the pawl 76 is biased by the pawl reverse spring 46 to rotate in the counterclockwise direction in FIG. 13 serving as the normal direction relative to the pawl shaft portion 36 (the bearing hole 42). The return engagement projection 74 is fitted to the return engagement recess portion 78. A posture, or attitude of the ottoman 6 which is in the retracted position B0 of the main pivot link 64 is maintained by the engagement force between the return engagement recess portion 78 and the return engagement projection 74 in addition to the friction force between the first bracket 71 and the second bracket 31.

In a case where the ottoman 6 moves upward so that the main pivot link 64 moves towards the first boundary position B1 in the aforementioned state, the second bracket 31 rotates in the counterclockwise direction in FIG. 13 relative to the first bracket 71 so that the pawl 76 rotates against the biasing force of the pawl reverse spring 46, and the return engagement recess portion 78 disengages from, i.e., overrides, the return engagement projection 74. Accordingly, the start of the rotation of the second bracket 31 in the counterclockwise direction in FIG. 13 is moderately performed.

Once the return engagement recess portion 78 disengages from the return engagement projection 74, the ottoman 6 may promptly or swiftly move upward, for example, so that the main pivot link 64 moves towards the first boundary position B1. At this time, the ratchet portion 77 of the pawl 76 that is biased to rotate in the normal direction by the pawl reverse spring 46 slides on the approach wall portion 73 in association with the rotation of the second bracket 31 in the counterclockwise direction in FIG. 13.

In a case where the second bracket 31 further rotates in the counterclockwise direction in FIG. 13 relative to the first bracket 71, the ratchet portion 77 of the pawl 76 biased to rotate in the normal direction by the pawl reverse spring 46 engages with the initial tooth portion 24a of the ratchet inner teeth portion 24. The relative rotational position between the first bracket 71 and the second bracket 31 in a case where the ratchet portion 77 of the pawl 76 engages with the initial tooth portion 24a of the ratchet inner teeth portion 24 corresponds to the first boundary position B1 of the main pivot link 64.

In a case where the second bracket 31 further rotates in the counterclockwise direction relative to the first bracket 71 in the aforementioned state, the pawl 76 rotates against the biasing force of the pawl reverse spring 46 so as to sequentially or consecutively override or climb over each of teeth of the ratchet inner teeth portion 24 while the ratchet portion 77 is being guided by each of the teeth of the ratchet inner teeth portion 24. Therefore, the second bracket 31 is rotatable relative to the first bracket 71 in the counterclockwise direction in FIG. 13 serving as the first direction and is inhibited from rotating relative to the first bracket 71 in the clockwise direction serving as the second direction in a range from a relative rotational position of the first bracket 71 and the second bracket 31 where the ratchet portion 77 of the pawl 76 engages with the initial tooth portion 24a of the ratchet inner teeth portion 24 to a relative rotational position of the first bracket 71 and the second bracket 31 where the ratchet portion 77 engages with the final tooth portion 24b of the ratchet inner teeth portion 24, The relative rotational position between the first bracket 71 and the second bracket 31 in a case where the ratchet portion 77 of the pawl 76 engages with the final tooth portion 24b of the ratchet inner teeth portion 24 corresponds to the second boundary position B2 of the main pivot link 64.

In a case where the second bracket 31 further rotates in the counterclockwise direction relative to the first bracket 71, the ratchet portion 77 of the pawl 76 that overrides or climbs over the final tooth portion 24b slides on the idle wall portion 25. Then, when the second bracket 31 further rotates in the counterclockwise direction relative to the first bracket 71, the pawl side reverse wall portion 44 of the pawl 76 is started to be pressed against the bracket side reverse wall portion 52 of the switch wall portion 26. Thus, the pawl 76 is started to rotate in the clockwise direction against the biasing force of the pawl reverse spring 46. In a case where the second bracket 31 further rotates in the counterclockwise direction relative to the first bracket 71, the pawl reverse spring 46 is turned over in association with the further rotation of the pawl 76 in the clockwise direction as illustrated in FIG. 14. Accordingly, the pawl 76 is biased by the pawl reverse spring 46 to rotate in the clockwise direction in FIG. 14, i.e., in the reverse direction, relative to the pawl shaft portion 36 (the bearing hole 42).

In a case where the pawl 76 is biased to rotate in the reverse direction, i.e., is reversed, the pawl side reverse wall portion 44 is held by the pawl support portion 59 so that the pawl 76 is inhibited from rotating. In a state where the pawl 76 is reversed, the pawl 76 is away from the recess portion 72, for example, of the first bracket 71 and thus the rotation of the second bracket 31 relative to the first bracket 71 in the clockwise direction, i.e., the return rotation of the second bracket 31, is not restricted by the pawl 76. The relative rotational position between the first bracket 71 and the second bracket 31 in the case where the pawl 76 is reversed corresponds to the reversing position B3 of the main pivot link 64.

Figure 14:
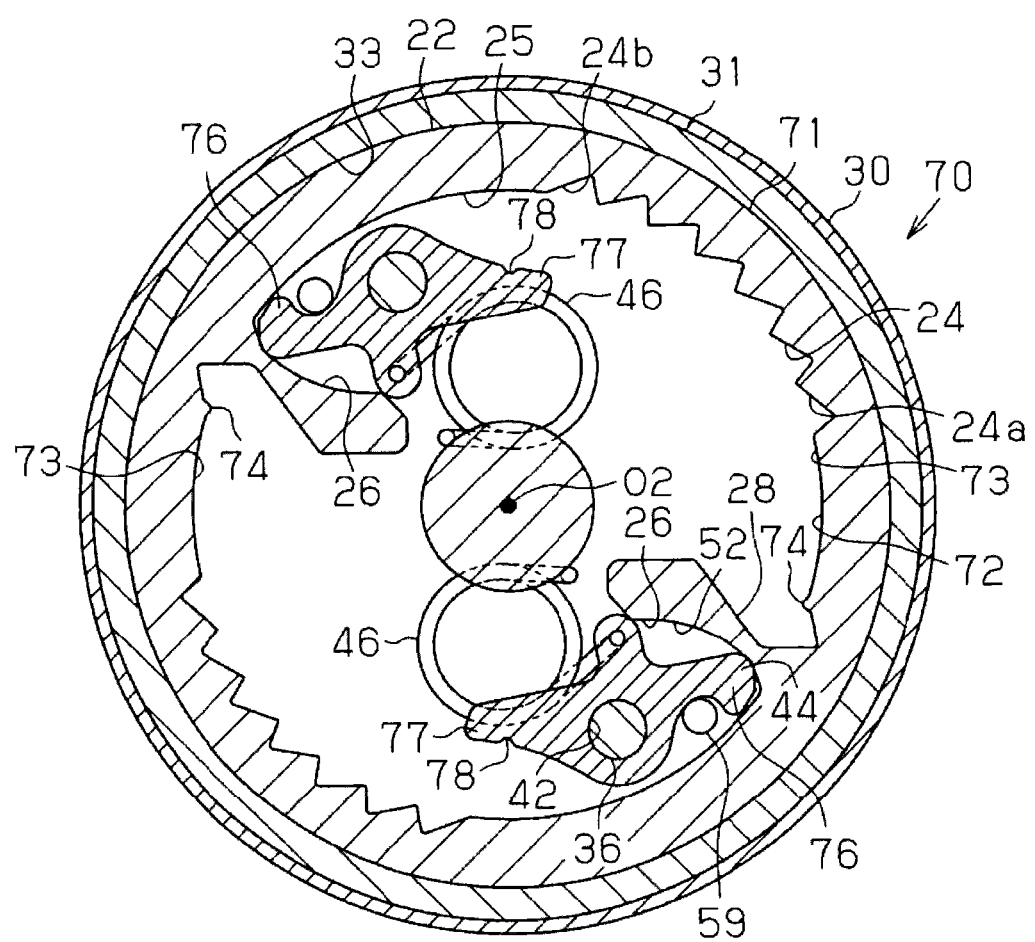
FIG. 14 is a cross-sectional view explaining a case where a pawl is in a reversed state according to the third embodiment disclosed here.

In a case where the second bracket 31 rotates in the clockwise direction relative to the first bracket 71, i.e., in a case where the second bracket 31 performs the return rotation, in a state where the pawl 76 is reversed, the ratchet portion 77 is started to be pressed against the bracket side return wall portion 28 of the switch wall portion 26 so that the pawl 76 is started to rotate in the counterclockwise direction in FIG. 14 against the biasing force of the pawl reverse spring 46. Then, in a case where the second bracket 31 further rotates in the clockwise direction relative to the first bracket 71, the pawl reverse spring 46 is turned over in association with the further rotation of the pawl 76 in the counterclockwise direction as illustrated in FIG. 13 so that the pawl 76 is biased to rotate in the normal direction by the pawl reverse spring 46.

When the pawl 76 is reversed to return, the return engagement projection 74 is fitted to the return engagement recess portion 78. At this time, the relative rotational position between the first bracket 71 and the second bracket 31 corresponds to the retracted position B0 of the main pivot link 64.

An operation of the ottoman 6 in the retracted state where the main pivot link 64 is arranged in the retracted position B0 i.e., in the lowermost position, will be explained below. As mentioned above, in a case where the main pivot link 64 is in the retracted position B0, the return engagement projection 74 is fitted to the return engagement recess portion 78 of the pawl 76 that is biased to rotate in the normal direction by the pawl reverse spring 46. Then, in a case where the ottoman 6 moves upward so that the main pivot link 64 moves towards the first boundary position B1 in the aforementioned state, the second bracket 31 rotates relative to the first bracket 71 in the counterclockwise direction in FIG. 13 so that the pawl 76 rotates against the biasing force of the pawl reverse spring 46, and the return engagement recess portion 78 disengages from, i.e., overrides, the return engagement projection 74. Accordingly, the start of the rotation of the second bracket 31 in the counterclockwise direction in FIG. 13 is moderately performed.

When the ottoman 6 further moves upward so that the main pivot link 64 moves towards the first boundary position B1 within the approaching range Z11, the ratchet portion 77 of the pawl 76 slides on the approach wall portion 73, thereby promptly moving the ottoman 6 upward.

Once the main pivot link 64 reaches the first boundary position B1, the ratchet portion 77 of the pawl 76 engages with the initial tooth portion 24a of the ratchet inner teeth portion 24. Then, when the ottoman 6 moves upwards in a state where the main pivot link 64 falls within the adjusting range Z12, the ratchet portion 77 of the pawl 76 consecutively or sequentially engages with each of the teeth of the ratchet inner teeth portion 24. Consequently, the pivoting position of the main pivot link 64, i.e., the tilt angle O1 of the ottoman 6, may be adjusted and held or maintained in the stepwise manner.

In addition, in a case where the ottoman 6 moves upward until the main pivot link 64 moves beyond the adjusting range Z12 into the idle range Z13, the ratchet portion 77 of the pawl 76 slides on the idle wall portion 25. Thus, the ottoman 6 promptly moves upward so that the main pivot link 64 moves towards the reversing position B3.

Once the main pivot link 64 reaches the reversing position B3, the pawl 76 is reversed so as to be biased to rotate in the reverse direction by the pawl reverse spring 46. Then, the pawl 76 is separated from the first bracket 71. Accordingly, the ottoman 6 promptly moves downward, for example, so that the main pivot link 64 moves towards the retracted position B0.

When the main pivot link 64 reaches the retracted position B0, the pawl 76 is again reversed to return so as to be biased to rotate in the normal direction by the pawl reverse spring 46. Then, the return engagement projection 74 is fitted to the return engagement recess portion 78 of the pawl 76 to thereby return the ottoman 6 to the retracted state.

According to the aforementioned third embodiment, following effects are obtained in addition to the effects (1) to (5) of the first embodiment. (1) According to the third embodiment, the return engagement projection 74 is fitted to the return engagement recess portion 78 at a time when the pawl 76 is returned or restored. Thus, the return engagement recess portion 78 disengages from the return engagement projection 74 when the second bracket 31 starts rotating in the counterclockwise direction relative to the first bracket 71 (i.e., performs the return rotation), which leads to the moderate start of the return operation of the ottoman 6.

(2) According to the aforementioned third embodiment, in a case where the ottoman 6 moves upward from the retracted state so that the main pivot link 64 moves from the retracted position B0 towards the adjusting range Z12, momentum (gains momentum) is added to the movement of the main pivot link 64. Thus, the deployment of the ottoman 6 is smoothly performed.

(3) According to the aforementioned third embodiment, the return engagement projection 74 is fitted to the return engagement recess portion 78 at a time when the pawl 76 is returned or restored, i.e., in the retracted state of the ottoman 6. Thus, the retracted state of the ottoman 6 may be further securely retained by the engagement force between the return engagement projection 74 and the return engagement recess portion 78.

Figure 15:
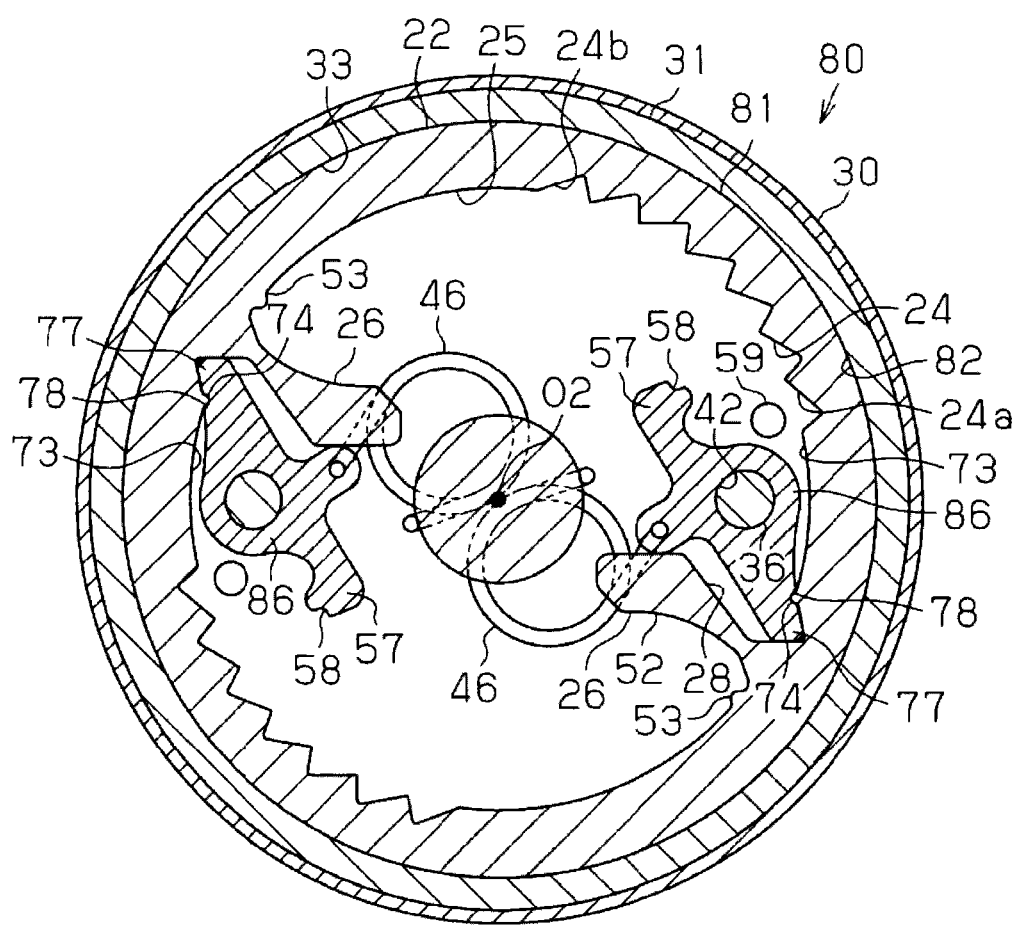
FIG. 15 is a cross-sectional view explaining an initial state (a return state) of an adjusting mechanism according to a modified embodiment disclosed here.
Figure 16:
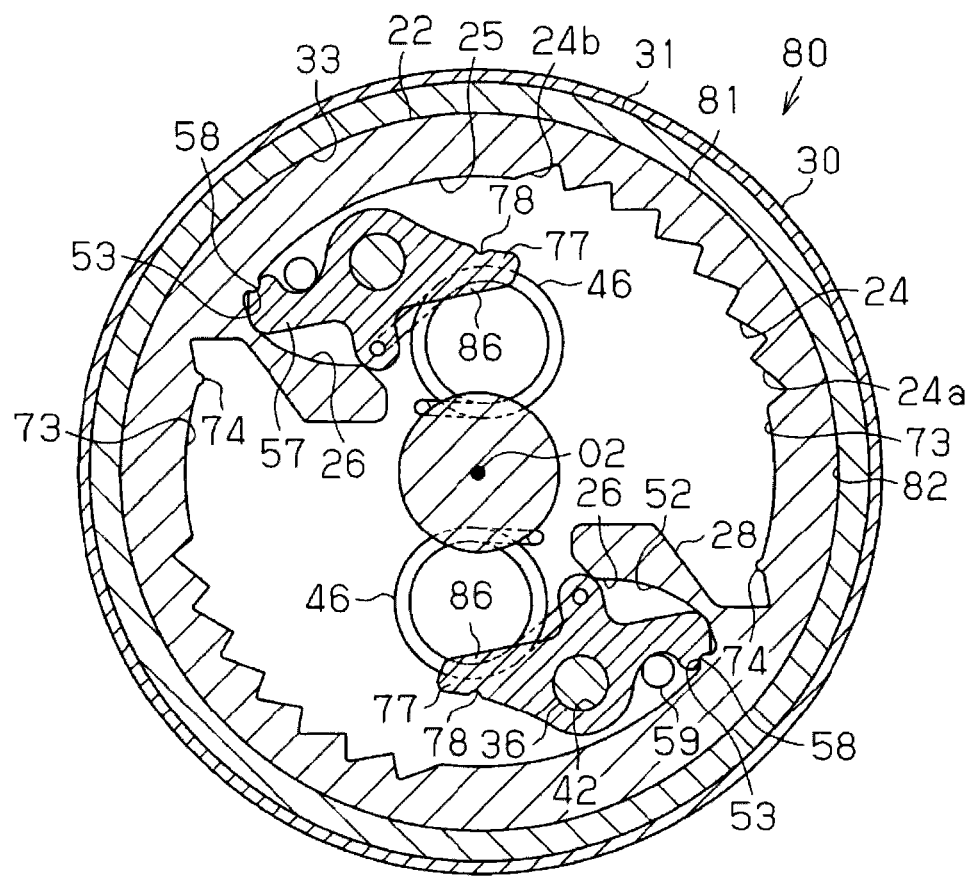
FIG. 16 is a cross-sectional view explaining a case where a pawl is in a reversed state according to the modified embodiment disclosed here.
Figure 17:
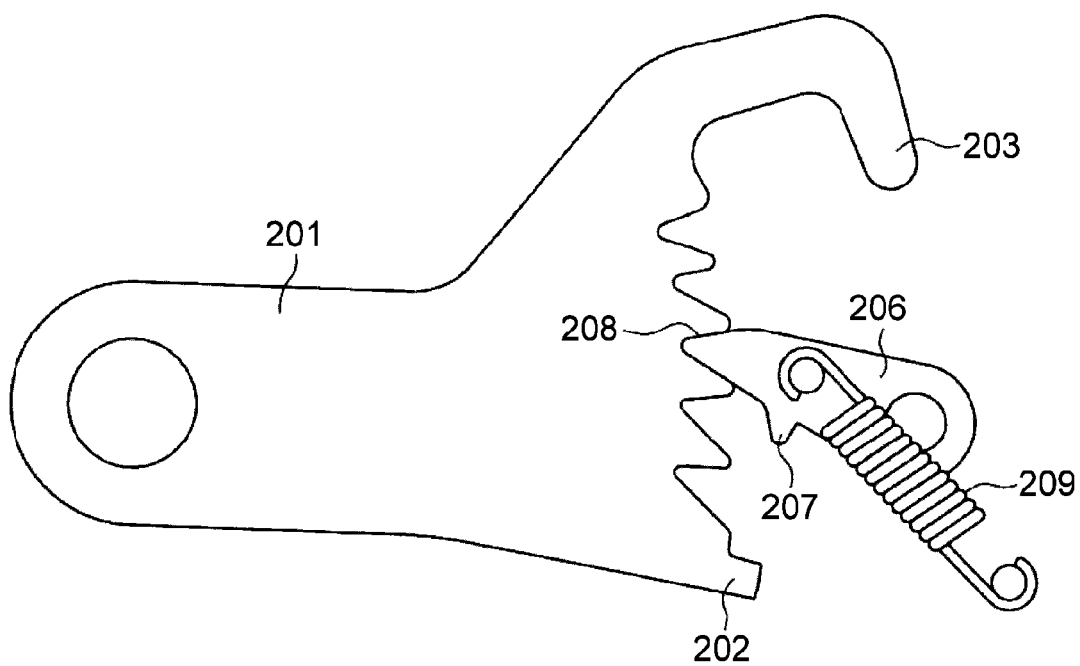
FIG. 17 is a schematic view illustrating a known seat adjustment apparatus for a vehicle.
Figure 18:
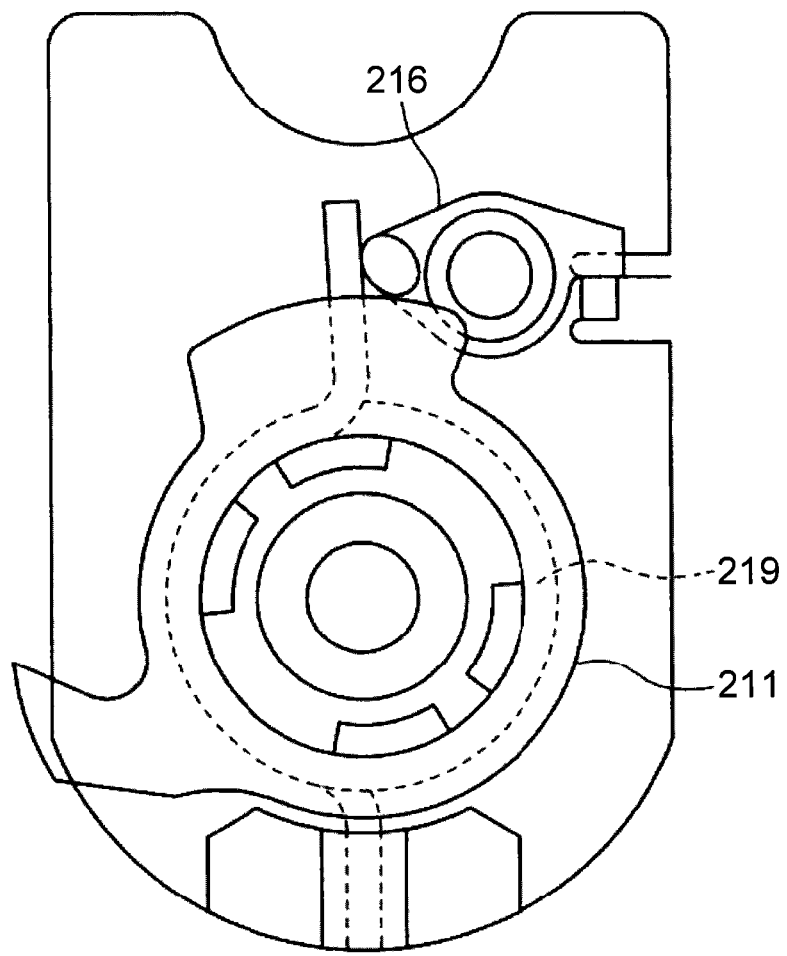
FIG. 18 is a schematic view illustrating another known seat adjustment apparatus for a vehicle.

The aforementioned first to third embodiments may be modified as follows. As illustrated in FIGS. 15 and 16, an adjusting mechanism 80 may be applied so that the start of the return operation and the start of the rotation towards the adjusting range are both moderately performed. A circular recess portion 82 formed at a first bracket 81 of the adjusting mechanism 80 integrally includes the approach wall portion 73, the ratchet inner teeth portion 24, the idle wall portion 25, and the switch wall portion 26. The reverse engagement projection 53 is formed to project at the idle wall portion 25. The return engagement projection 74 is formed at the approach wall portion 73. Each pawl 86 includes the reverse engagement recess portion 58 and the return engagement recess portion 78. As a result, the same effects as the effect (1) of the second embodiment and the effect (1) of the third embodiment may be obtained at the same time.

According to the first or second embodiment, the adjusting mechanism 70 may be used instead of the adjusting mechanism 20 or 50. In addition, according to the third embodiment, the adjusting mechanism 20 or 50 may be used instead of the adjusting mechanism 70.

According to the third embodiment, the adjusting mechanism 70 may be arranged at any portion of each support shaft of the link mechanism 63 (the main pivot link 64, the auxiliary pivot link 65, the first swing link 66, and the second swing link 67) that specifies the position of the ottoman 6. At this time, the adjusting mechanism 70 may be desirably arranged at a connecting portion of the link mechanism 63 relative to the seat cushion 2 (the bracket 61).

The support structure of the ottoman 6 relative to the seat cushion 2 described in the third embodiment is one example. For example, the ottoman 6 may move upward and downward by a cantilever arm rotatably connected to the seat cushion 2 (the bracket 61) via the adjusting mechanism.

According to the first to third embodiments, one pair of the pawl and the pawl reverse spring or three or more pairs of the pawl and the pawl reverse spring may be arranged to be rotationally symmetric within the accommodating void S. In addition, the idle wall portion 25 may not be provided as long as the pawl is reversed, i.e., biased to rotate in the reverse direction.

According to the first to third embodiments, the ratchet portion 43, 77 also functions as the pawl side return wall portion. Alternatively, the pawl side return wail portion may be provided separately from the ratchet portion 43, 77. In addition, according to the first to third embodiments, the first bracket 21, 51, 71, 81 may be fixed to a movable side, i.e., the armrest 5 or the ottoman 6, while the second bracket 31 may be fixed to the seat 1, i.e., the seatback 3 or the seat cushion 2.

According to the first to third embodiments, the pawl reverse spring 46 may be a plate spring, for example, so that the pawl is configured to be reversed. In addition, at least one of the ratchet inner teeth portion 24 and the ratchet portion 43, 77 engaging with the ratchet inner teeth portion 24 may be coated with resin for sound deadening.

[Fourth Embodiment]

A fourth embodiment will be explained with reference to FIGS. 19-31B as follows. As illustrated in FIG. 1, the seat 1 for forming a seat portion for an occupant is provided at a vehicle floor. The seat 1 includes the seat cushion 2 forming a seat surface, the seatback 3 supported at a rear end portion of the seat cushion 2 so as to be rotatable (i.e., reclining), the headrest 4 supported at a top end portion of the seatback 3, the pair of armrests 5, 5 each provided at opposite ends of the seatback 3 in a vehicle width direction at an intermediate portion in a height direction, and the ottoman 6 supported at a front end portion of the seat cushion 2 so as to be rotatable (Le., tilting). According to the seat 1, a reclining angle of the seatback 3 relative to the seat cushion 2 is adjustable, and a reclining angle, or tilt angle of the armrests 5, 5 relative to the seatback 3 is adjustable. Further, according to the seat 1, a reclining angle, or tilt angle of the ottoman 6 relative to the seat cushion 2 is adjustable. Thus, an occupant seated in the seat 1 enables to adjust seating attitude, or seating posture in accordance with, for example, a desired comfortableness.

Figure 19:
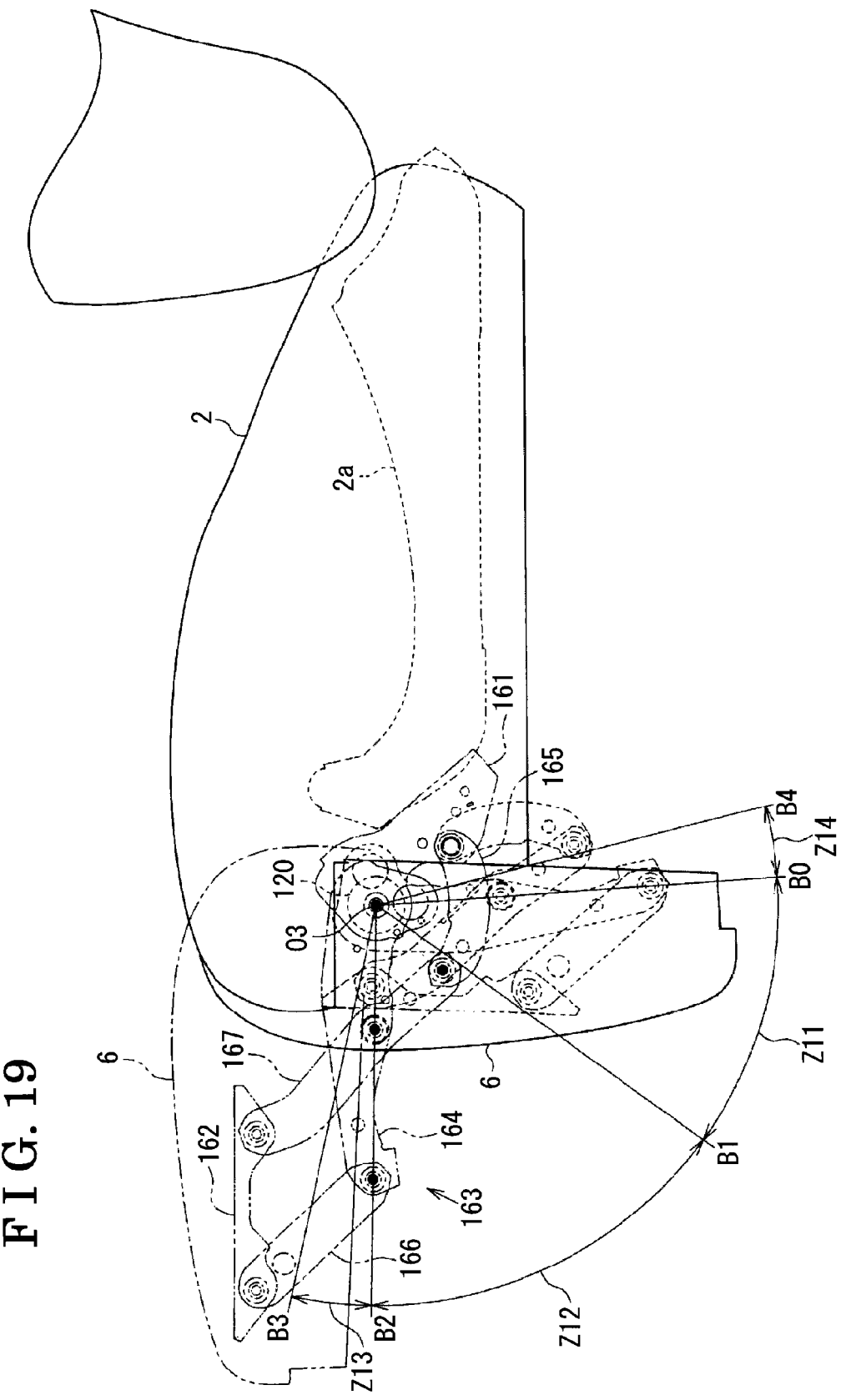
FIG. 19 is a lateral view explaining an operation of an ottoman apparatus for vehicle according to a fourth embodiment disclosed here.

Configurations of the ottoman 6 and structures in connection with the ottoman 6 will be explained hereinafter. As illustrated in FIG. 19, a bracket 161 serving as a first member and an attachment member made from, for example, a metal plate is secured to a front end portion of the seat cushion side frame 2a which serves as a frame for a lateral portion of the seat cushion 2. The seat cushion side frame 2a is, for example, made from a metal plate. A support bracket 162 made from, for example, a metal plate is connected to the bracket 161 via a link mechanism 163. Each support shaft of the link mechanism 163 is arranged so that an axis of the support shaft extends in the seat width direction.

The link mechanism 163 structures a pantograph linkage and includes a main pivot link 164 serving as a second member and an arm member, an auxiliary pivot link 165, a first swing link 166, and a second swing link 167. A first end portion of the main pivot link 164 is rotatably connected to an upper end portion (first end portion) of the bracket 161. A second end portion of the main pivot link 164 is rotatably connected to a first end portion of the first swing link 166. A second end portion of the first swing link 166 is rotatably connected to an end portion of the support bracket 162.

A first end portion of the auxiliary pivot link 165 is rotatably connected to a lower end portion (second end portion) of the bracket 161. A second end portion of the auxiliary pivot link 165 is rotatably connected to a first and portion of the second swing link 167. A second end portion of the second swing link 167 is rotatably connected to a base end portion of the support bracket 162. An intermediate portion of the second swing link 167 in a longitudinal direction thereof is rotatably connected to an intermediate portion of the main pivot link 164 in a longitudinal direction thereof.

Upon a pivotal motion, or rotation of the main pivot link 164, for example, in a clockwise direction in FIG. 19 from a state where the main pivot link 164 extends downwards, as illustrated with two-dotted lines, the first and second swing links 166, 167 extend in a firward direction relative to the seat so that the ottoman 6 supported by the support bracket 162 is deployed (deployed position, deployed state). On the other hand, in a case where the main pivot link 164 rotates in a counterclockwise direction from the deployed state of the ottoman 6 (Le., a state where the main pivot link 164 extends in a substantially forward direction), the first and second swing links 166, 167 are folded back, or rotated in a rearward of the seat, so that the ottoman 6 supported by the support bracket 162 is retracted (retracted position, retracted state).

Figure 20:
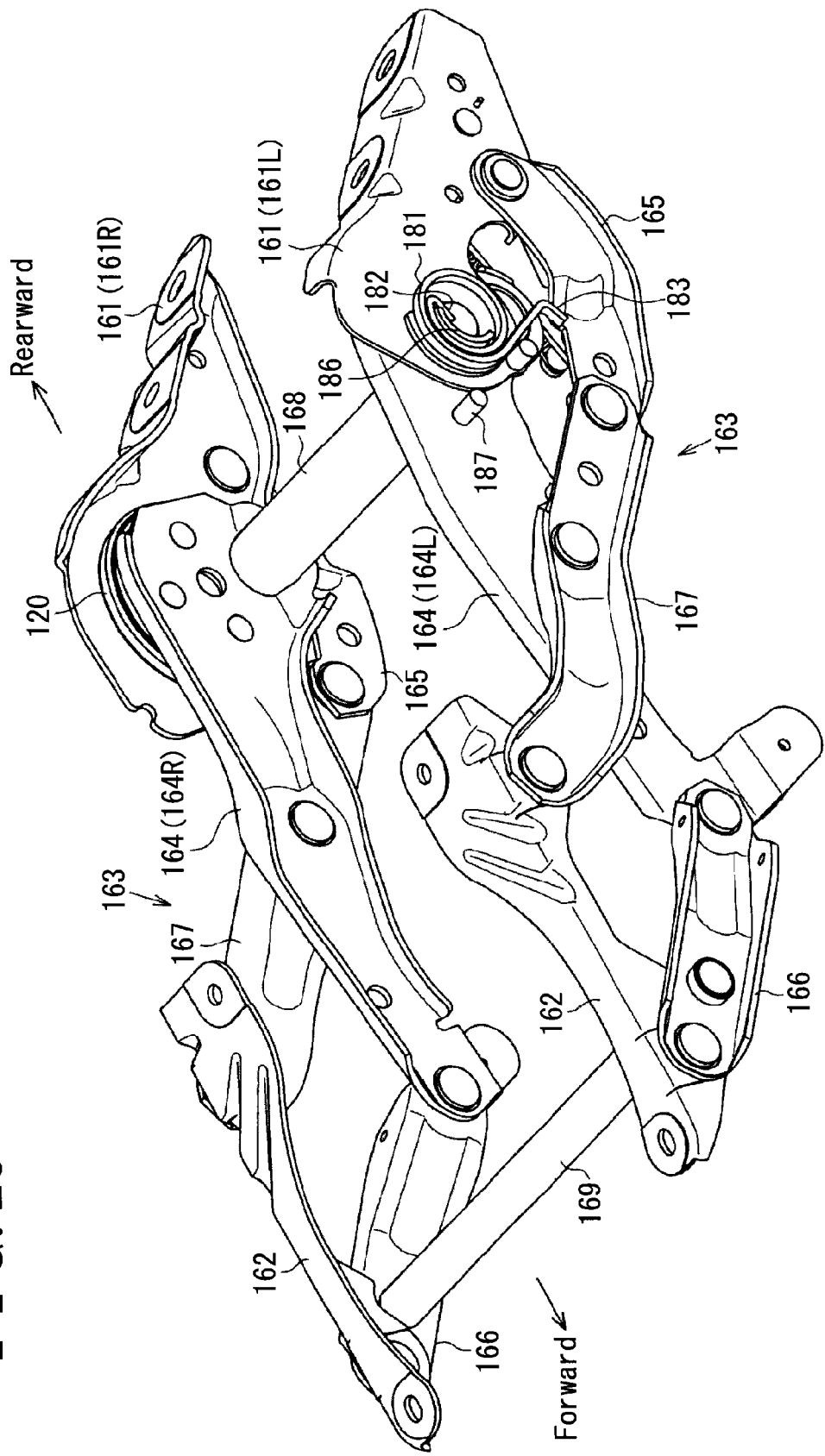
FIG. 20 is a perspective view of the ottoman apparatus for vehicle according to the fourth embodiment disclosed here.
Figure 21:
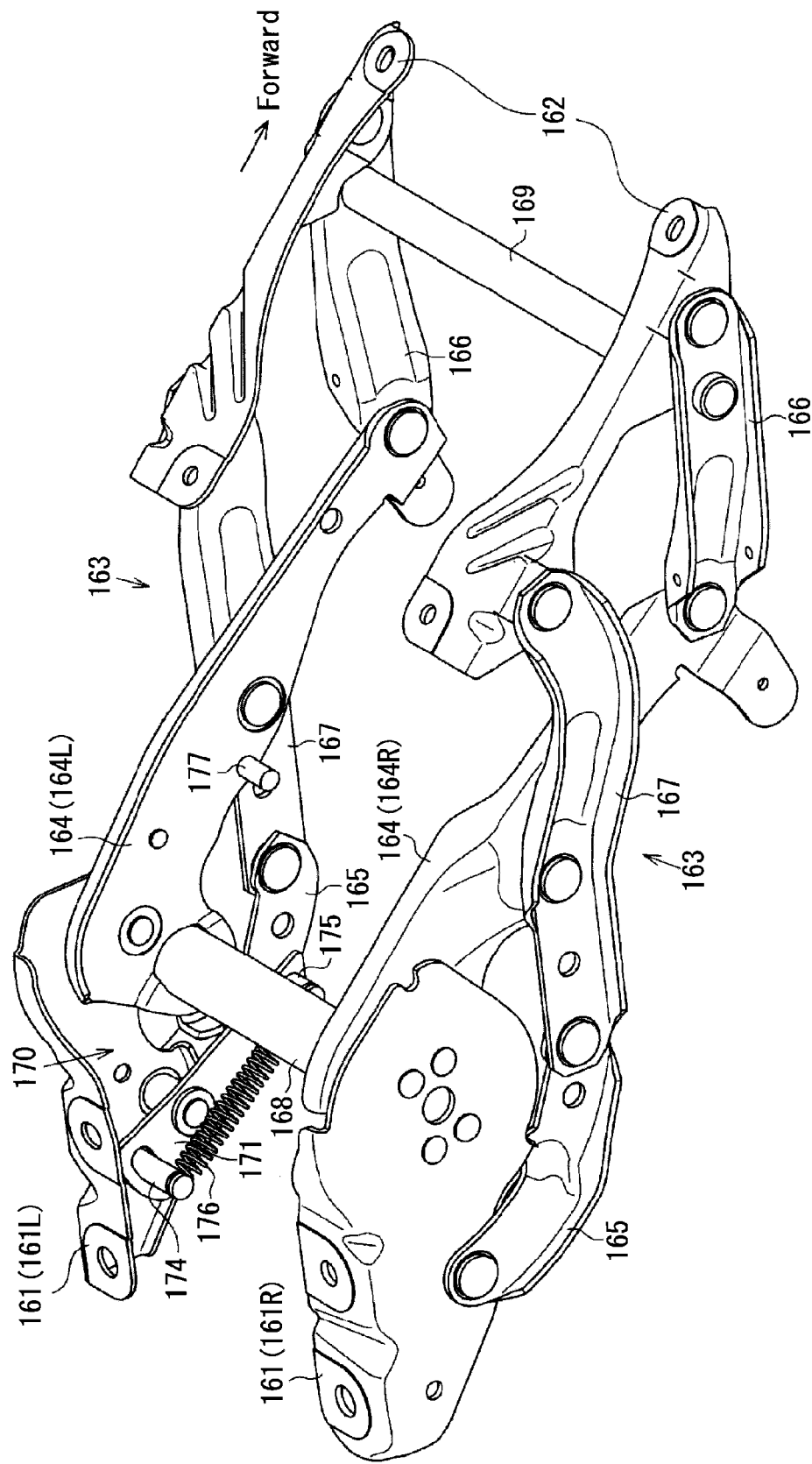
FIG. 21 is a perspective view of the ottoman apparatus for vehicle according to the fourth embodiment disclosed here.

As illustrated in FIGS. 20 and 21, the bracket 161 fixed to the seat cushion side frame 2a, the support bracket 162, and the link mechanism 163 including the main pivot link 164, the auxiliary pivot link 165, the first and second swing links 166, 167 are arranged at each of opposite ends of the seat in the seat width direction to serve as a pair. The main pivot links 164 provided at the opposite ends of the seat in the seat width direction are connected by a connecting rod 168 so as to integrally operate. The connecting rod 168 is formed in a substantially cylindrical form for bridging, or spanning the main pivot links 164, 164 in the seat width direction. The first swing links 166, 166 arranged at the opposite ends of the seat, respectively, are connected by a connecting rod 169 so as to integrally operate. The connecting rod 169 is formed in a substantially cylindrical form for bridging, or spanning the first swing links 166, 166 in the seat width direction.

As illustrated in FIG. 20, a disc shaped adjusting mechanism 120 is provided between an end portion of one of the main pivot links 164 (e.g., at a right-hand side as one faces front of the seat) (hereinafter referred to as the main pivot link 164R) and an upper end portion of the bracket 161 provided at the same side to the main pivot link 164R (hereafter referred to as the bracket 161R). That is, one of The ends of the main pivot link 164R is rotatably connected to the upper end portion of the bracket 161R via the adjusting mechanism 120.

As illustrated in FIG. 21, a lock mechanism 170 is provided between the other of the main pivot links 164 (e.g., the main pivot link 164 provided at a left-hand side as one faces front of the seat) (hereinafter referred to as the main pivot link 164L) and the bracket 161 provided at the same side to the main pivot link 164L, (hereinafter referred to as the bracket 161L).

A tilt angle or an inclination angle of the ottoman 6 relative to the seat cushion 2 will be explained as follows. As illustrated in FIG. 19, a pivoting position of the main pivot link 164 related to a tilt angle O1 of the ottoman 6 relative to the seat cushion 2 includes an approaching range Z11 ranged from a predetermined retracted position BO at which the main pivot link 164 extends downward together with the support bracket 162 (ottoman 6) to a predetermined first boundary position 61 at which the main pivot link 164 extends obliquely downward in a forward direction, an adjusting range Z12 ranged from the first boundary position B1 to a predetermined second boundary position B2 at which the main pivot link 164 extends in a substantially forward direction, an idle range Z13 ranged from the second boundary position B2 to a predetermined reversing position B3 at which the main pivot link 164 extends obliquely upward in the forward direction, and an unlocking range Z14 ranged from the retracted position BO to a predetermined unlocked position B4 at which the main pivot link 164 extends obliquely downward in a rearward direction.

In the adjusting range Z12, the adjusting mechanism 120 allows a clockwise pivotal motion of the main pivot link 164 from the first boundary position B1 to the second boundary position B2, that is, the adjusting mechanism 120 allows an upward movement of the ottoman 6, and prohibits or restricts a reversal pivotal motion of the main pivot link 164, that is, a downward movement of the ottoman 6. In the adjusting range Z12, the pivoting position of the main pivot link 164, that is, the tilt angle O1 of the ottoman 6, is adjustable in multiple steps or maintainable at the multiple steps (e.g., seven steps) by every predetermined angle. Namely, the adjusting range Z12 of the main pivot link 164 corresponds to an adjusting region in which the tilt angle O1 of the ottoman 6 is adjustable.

On the other hand, in the approaching range Z11, the adjusting mechanism 120 allows the pivotal motion of the main pivot link 164 in both of the clockwise and counterclockwise directions, that is, the adjusting mechanism 120 allows the upward and downward motions (upward and downward operations) of the ottoman 6. Similarly, in the idle range Z13, the adjusting mechanism 120 allows the pivotal motion of the main pivot link 164 in both of the clockwise and counterclockwise directions, that is, the adjusting mechanism 120 allows the upward and downward motions of the ottoman 6. Particularly, after the main pivot link 164 reaches the reversing position B3, the adjusting mechanism 120 switches the operation to allow the downward motion of the ottoman 6 in the adjusting range Z12. Further, in the unlocking range Z14, the adjusting mechanism 120 allows the pivotal motion of the main pivot link 164 in both of the clockwise and counterclockwise direction in FIG. 19.

The retracted position BO of the main pivot link 164 corresponds to a retracted state of the ottoman 6. The second boundary position B2 corresponds to a maximally deployed state of the ottoman 6. In the retracted state of the ottoman 6, the lock mechanism 170 prohibits, or restricts the operation of the ottoman 6 in a deploying direction (i.e., a pivotal motion of the main pivot link 164 towards the first boundary position B1). The lock mechanism 170 is configured to be unlocked by rotating the main pivot link 164 towards the unlocked position B4 to further operate the ottoman 6 in a retracting direction (pushing direction, or thrusting direction).

Figure 22B:
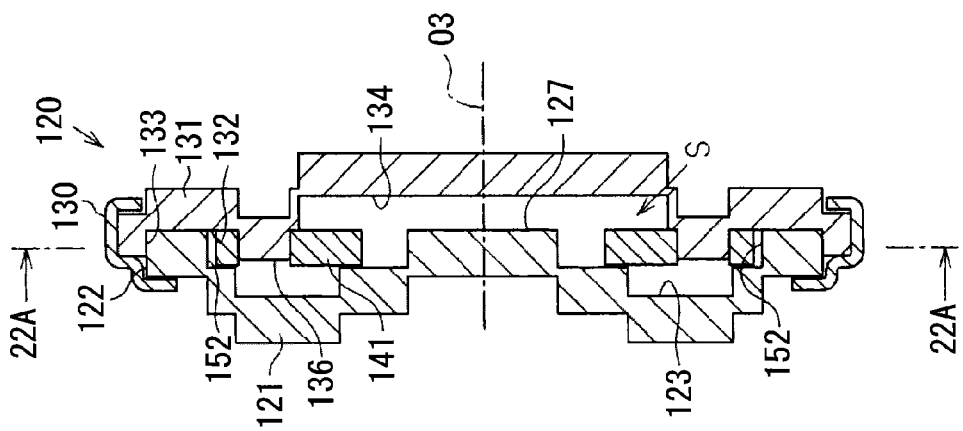
FIG. 22B is a cross-sectional view of the adjusting mechanism taken along line 22B-22B in FIG. 22A.
Figure 22A:
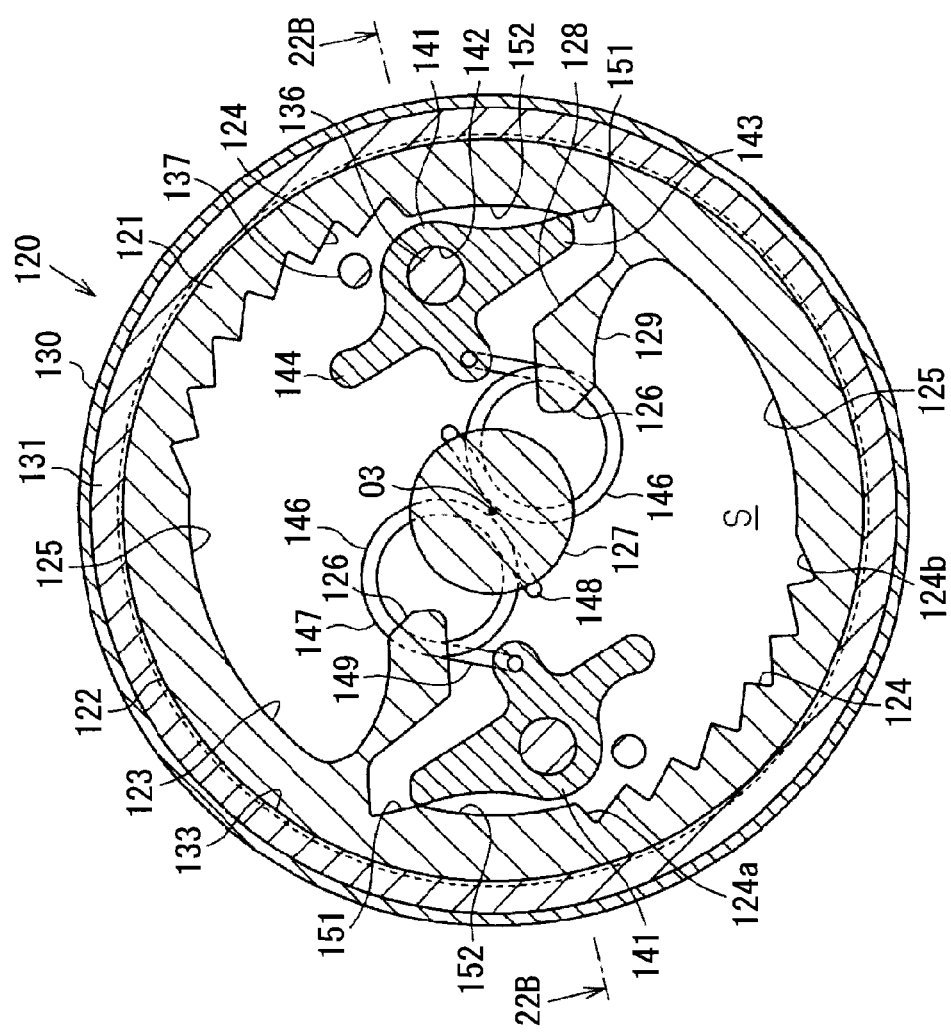
FIG. 22A is a cross-sectional view of an adjusting mechanism taken along line 22A-22A in FIG. 22B.

The configuration of the adjusting mechanism 120 will be explained as follows. As illustrated in FIGS. 22A, 22B, the adjusting mechanism 120 includes a disc shaped first bracket 121 and a second bracket 131 whose center line (axis) O3 extends in the seat width direction. The first bracket 121 is fixed to, for example, the main pivot link 164R (i.e., the ottoman 6 side) and the second bracket 131 is fixed to the bracket 161R (Le., the seat cushion 2 side).

The first bracket 121 is formed by half-blanking a metal plate, for example, The first bracket 121 includes a circular outer peripheral surface 122 having the axis O3 as the center, and a circular recess portion 123 which opens towards the second bracket 131. The recess portion 123 is point symmetrical or rotationally symmetrical about the axis O3. The recess portion 123 integrally includes a pair of wall portions for unlocking, i.e., hereinafter referred to as unlock wall portions 151 facing each other with respect to the axis O3, a pair of arc shaped wall portions for approaching, i.e., hereinafter referred to as approach wall portions 152 each of which is continuously formed from each of the unlock wall portions 151, a pair of ratchet inner teeth portions 124 each of which is continuously formed from each of the approach wall portions 152, a pair of arc shaped wall portions for idle running, i.e., hereinafter referred to as idle wall portions 125 each of which is continuously formed from each of the ratchet inner teeth portions 124, and a pair of wall portions for switching, i.e., hereinafter referred to as switch wall portions 126 each of which protrudes towards the axis O3 between the unlock wall portion 151 and the idle wall portion 125 adjacent to each other. That is, the unlock wall portion 151, the approach wall portion 152, the ratchet inner teeth portion 124, the idle wall portion 125, and the switch wall portion 126 are provided at each of opposite sides on an inner wall surface of the recess portion 123 symmetrically with respect to the axis O3 to serve as a pair. Further, the first bracket 121 includes a wall portion for holding spring, i.e., hereinafter referred to as a spring holding wall portion 127 provided at a portion including the axis O3 extends towards the second bracket 131.

The unlock wall portion 151 inclines outwardly in a radial direction as being away from the approach wall portion 152 (i.e., in the clockwise direction in FIG. 22A). A wall surface of the switch wall portion 126 adjacent to the unlock wall portion 151 includes a base end portion which extends linearly to be closer to the adjacent unlock wall portion 151 relative to a direction towards the axis O3 so as to form a bracket side wall portion for returning, i.e., hereinafter referred to as a bracket side return wall portion 128. On the other hand, a wall surface of the switch wall portion 126 adjacent to the idle wall portion 125 includes a base end portion which extends and curve to be closer to the adjacent idle wall portion 125 relative to a direction towards the axis O3 so as to form a bracket side wall portion for reversing, i.e., hereinafter referred to as a bracket side reverse wall portion 129.

Figure 23:
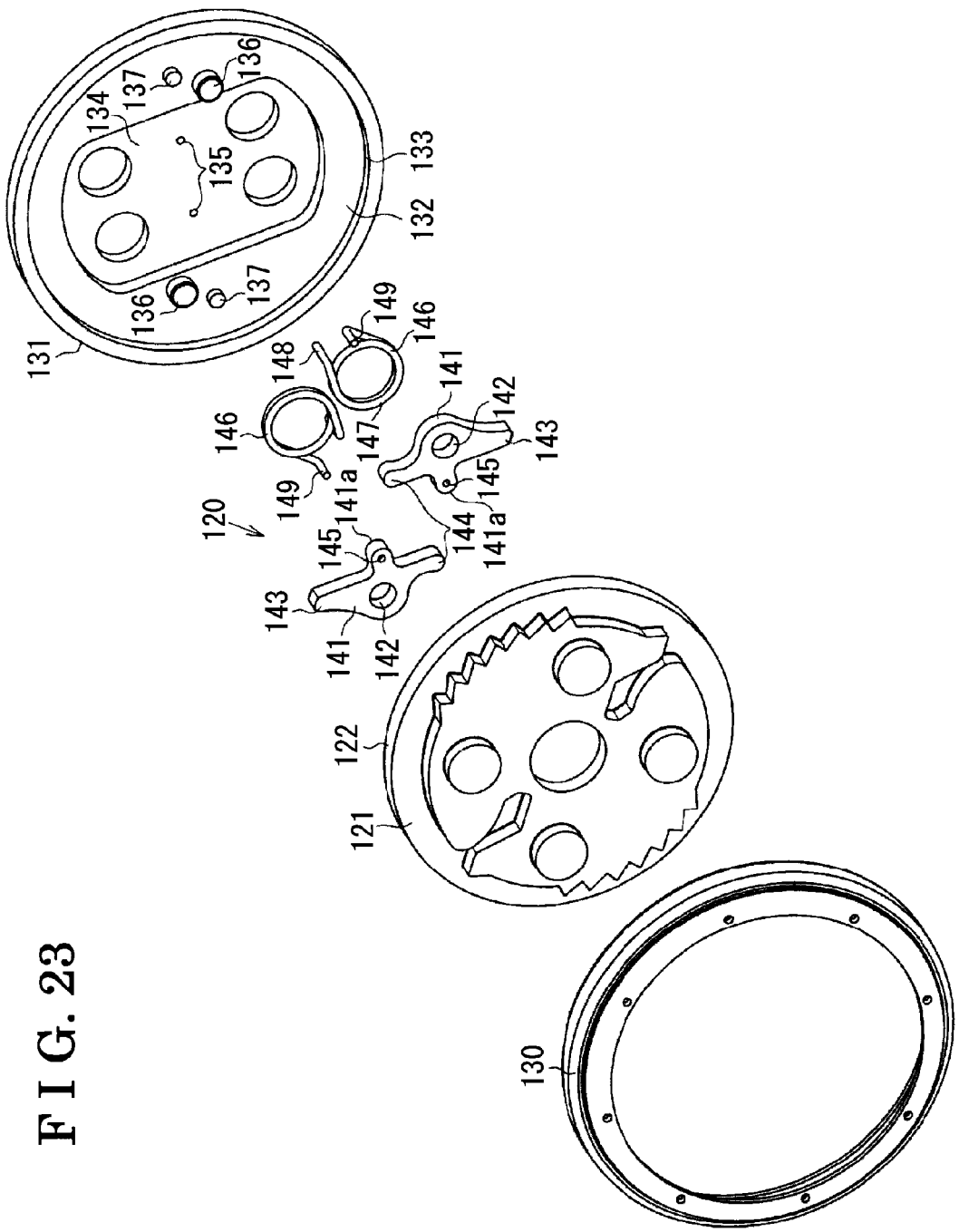
FIG. 23 is an exploded perspective view of the adjusting mechanism according to the fourth embodiment disclosed here.

The second bracket 131 is formed by half-blanking a metal plate, for example. As illustrated in FIG. 23, the second bracket 131 includes a recess portion 132 opening towards the first bracket 121 and substantially formed in a circle. The recess portion 132 includes an inner peripheral surface 133 including an inner diameter substantially equal to an outer diameter of the outer peripheral surface 122 of the first bracket 121. The recess portion 132 is point symmetrical or rotationally symmetrical about the axis O3. The second bracket 131 includes a spring accommodating portion 134 formed at a center of the recess portion 132 so as to be dented in a direction opposite from the first bracket 121 and to be formed in a substantially ellipse form, or a track like form including linear sides facing each other and arced portions. A pair of bracket side spring retaining holes 135 is formed at the spring accommodating portion 134. Each of the bracket side spring retaining holes 135 extends substantially in parallel with the axis O3. A pair of pawl shaft portions 136 substantially having a column shape is formed to protrude at a radially outer side of the spring accommodating portion 134. Further, a pair of pawl support portions 137 substantially having a column shape is formed to protrude at respective portions adjacent to the pawl shaft portions 136. The protruding direction of each of the pawl shaft portions 136 and the pawl support portions 137 is arranged substantially in parallel with the axis O3.

As illustrated in FIG. 22B, the first bracket 121 is fitted to the second bracket 131 in a state where the outer peripheral surface 122 of the first bracket 121 is slidably in contact with the inner peripheral surface 133 of the second bracket 131. A holding member 130 made of a metal plate and formed in a ring shape is attached to outer peripheral portions of the first bracket 121 and the second bracket 131 in a state where the first bracket 121 is fitted to the second bracket 131 via the outer peripheral surface 122 and the inner peripheral surface 133. The first bracket 121 and the second bracket 131 are inhibited from disengaging in a direction of the axis O3, i.e., in an axial direction, by the holding member 130 in a state where a relative rotation between the first bracket 121 and the second bracket 131 is allowed. An accommodating void S is formed between the first bracket 121 and the second bracket 131. Namely, the accommodating void S is defined by an inner wall surface of the recess portion 123 of the first bracket 121, an outer wall surface of the spring holding wall portion 127, an inner wall surface of the recess portion 132 of the second bracket 131, and an inner wall surface of the spring accommodating portion 134. The pair of pawl shaft portions 136 and the pair of pawl support portions 137 of the second bracket 131 are configured to be arranged within the recess portion 123 of the first bracket 121 within a relative rotation range of the first bracket 121 and the second bracket 131, i.e., corresponding to a range that a pivotal position of the main pivot link 164 related to the tilt angle O1 of the ottoman 6 falls within the range from the unlocked position B4 to the reversing position B3.

A pair of pawls 141 made of steel, for example, is accommodated in the accommodating void S. That is, the pawls 141 are housed in the accommodating void S using a range that the recess portion 132 is provided in the axial direction. As illustrated in FIG. 23, each of the pawls 141 includes a bearing hole 142, a ratchet portion 143, and a pawl side wall portion for reversing, i.e., hereinafter referred to as a pawl side reverse wall portion 144. The bearing hole 142 is formed in a circular shape and pivotally supported by the pawl shaft portion 136.

A pawl side spring retaining hole 145 which extends in parallel with the axis O3 is formed at an extended portion 141a extending in a radial direction from an intermediate angular position between the ratchet portion 143 of the pawl 141 and the pawl side reverse wall portion 144.

A pair of springs for reversing pawl, i.e., hereinafter referred to as a pawl reverse spring 146 each formed by a torsion spring, for example, is accommodated within the accommodating void S. Each of the pawl reverse springs 146 includes a coil portion 147 of which an axis extends substantially in parallel with the axis O3. In addition, the pawl reverse spring 146 includes a first end portion 148 and a second end portion 149. The first end portion 148 is bent from a first end of the coil portion 147 positioned away from the second bracket 131 so as to extend substantially in parallel with the axis O3. The first end portion 148 is fitted to the bracket side spring retaining hole 135. The second end portion 149 is bent from a second end of the coil portion 147 positioned away from the pawl 141 so as to extend substantially in parallel with the axis 03. The second end portion 149 is fitted to the pawl side spring retaining hole 145. The first end portion 148 and the second end portion 149 are arranged at an outer peripheral portion of the coil portion 147 so as to overlap the outer peripheral portion. The first end portion 48 and the second end portion 49 are fixed to the bracket side spring retaining hole 135 and the pawl side spring retaining hole 145 respectively.

Accordingly, as illustrated in FIG. 22A, plural pairs, specifically, two pairs according to the present embodiment, in which one set is constituted by the pawl 141 and the pawl reverse spring 146, are arranged within the accommodating void S so as to be rotationally symmetric to each other. Motion of each of the coil portions 147 arranged within the spring accommodating portion 134 is restricted in the axial direction by the spring holding wall portion 127 of the first bracket 121 that makes contact with the coil portion 47 or that is positioned close to the coil portion 147.

Figure 24A:
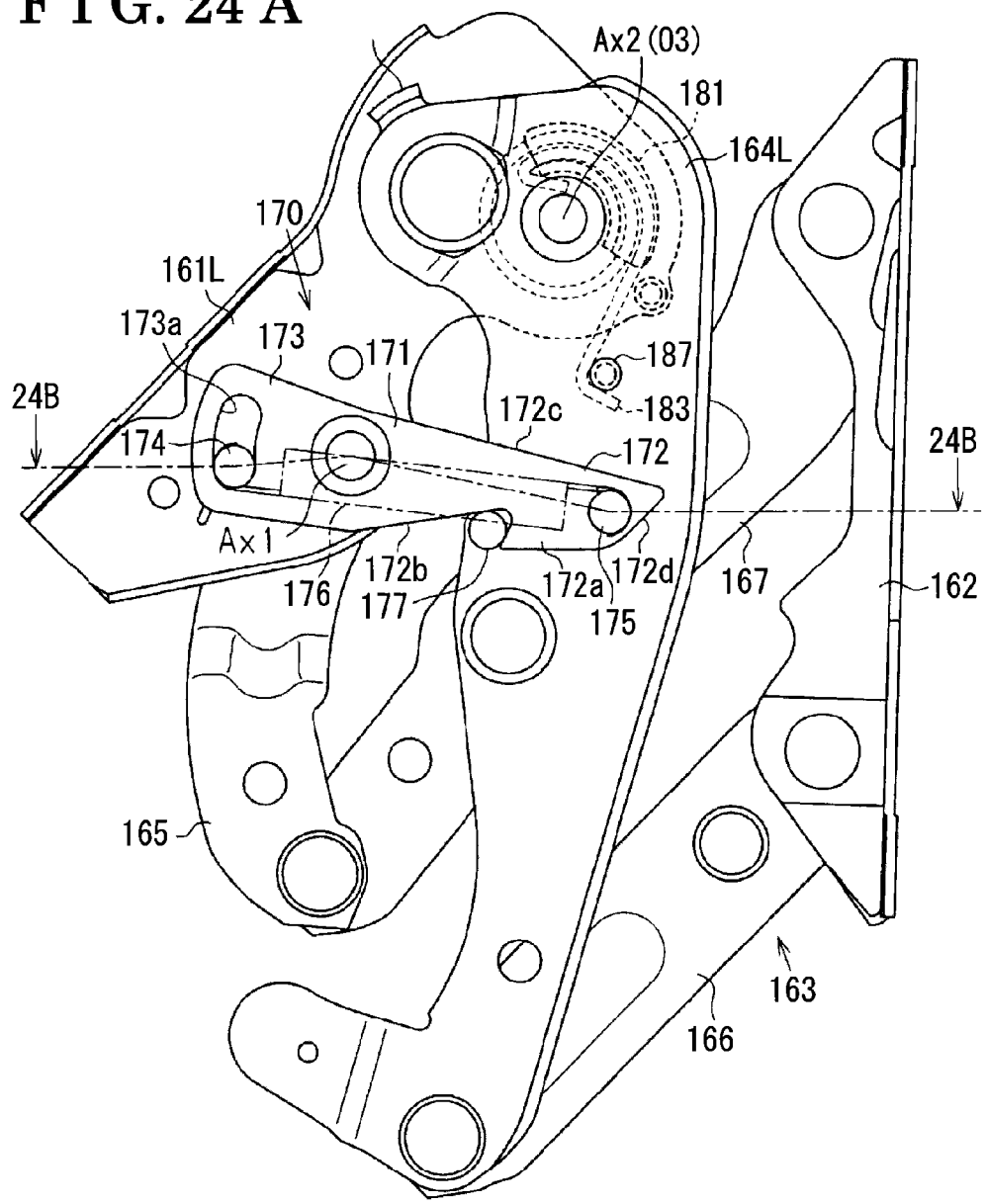
FIG. 24A is a lateral view of a lock mechanism viewed from an inward in a seat width direction according to the fourth embodiment disclosed here.
Figure 24B:
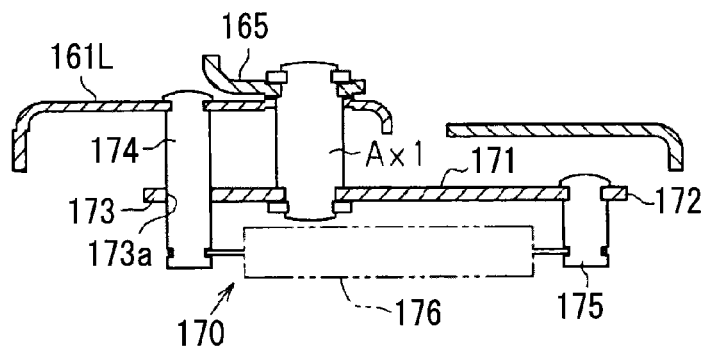
FIG. 24B is a cross-sectional view of the lock mechanism taken along line 24B-24B in FIG. 24A.

A configuration of the lock mechanism 170 will be explained hereinafter. As illustrated in FIGS. 24A and 24B, the lock mechanism 170 includes a hook 171 connected to the bracket 161L to be rotatable about a support shaft Ax1 provided at an end portion of the auxiliary pivot link 165. The hook 171 is made from, for example, a metal plate. The hook 171 includes a first extended portion 172 and a second extended portion 173 which extend in a forward direction and a rearward direction of the seat, respectively, relative to the support shaft Ax1. A hook portion 172a is formed at a bottom end of the first extended portion 172 in FIG. 24A. The first extended portion 172 forms a first reversing cam surface 172b, which is formed by linearly inclining a bottom surface at a rearward of the hook portion 172a. The first extended portion 172 forms a second reversing cam surface 172c, which is formed by linearly extending an upper surface of the hook portion 172a. Further, the first extended portion 172 forms a cam surface for locking, i.e., hereinafter referred to as a lock cam surface 172d, which is formed by linearly inclining an end surface continuously formed from the hook portion 172a. In addition, a slot 173a, which includes an elongated bore extended in a peripheral direction about the support shaft Ax1, is formed at an end portion of the second extended portion 173.

A retaining pin 174 which is formed in a substantially columnar form and which is formed at the bracket 161L to protrude in parallel with the support shaft Ax1 is provided through the slot 173a of the second extended portion 173. Thus, a pivotal range of the hook 171 about the support shaft Ax1 relative to the bracket 161L is limited within a range from a pivotal position at which the retaining pin 174 contacts a bottom surface of the slot 173a (hereinafter also referred to as a locked position of the hook 171) to a pivotal position at which the retaining pin 174 contacts an upper surface of the slot 173a (hereinafter also referred to as an unlocked position of the hook 171).

A retaining pin 175 which is formed in a substantially columnar form is provided at an end portion of the first extended portion 172 to protrude and to be in parallel with the support shaft Ax1. A first end portion and a second end portion of a spring for reversing, i.e., hereinafter referred to as a reverse spring 176 made from an extension spring, for example, are retained at an end portion of the retaining pin 174 which penetrates over the slot 173a and the retaining pin 175, respectively. The reverse spring 176 is configured to extend below the support shaft Ax1 when the hook 171 is positioned at the locked position to bias the pivotal motion of the hook 171 so that the hook 171 is maintained at the locked position. On the other hand, the reverse spring 176 is turned over when the hook 171 is at the unlocked position to extend above the support shaft Ax1 and biases the pivotal motion of the hook 171 so that the hook 171 is maintained at the unlocked position.

A striker pin 177 which is formed in a substantially columnar form is provided at the main pivot link 164L to protrude and to be in parallel with the support shaft Ax1. The striker pin 177 fits into the hook portion 172a of the hook 171 which is in the locked position when the ottoman 6 is in the retracted state as illustrated in FIG. 24A. That is, in the retracted state of the ottoman 6, an operation of the ottoman 6 in the deploying direction is prohibited, or restricted by the hook 171 that hooks, or retains the striker pin 177. A reverse cam portion 178 serving as a contact member, which is formed in a pawl shape and configured to contact with the second reversing cam surface 172c when the main pivot link 164L pivots in the counterclockwise direction towards the second boundary position B2, is formed in the vicinity of a support shaft Ax2 of the main pivot link 164L.

Figure 25B:
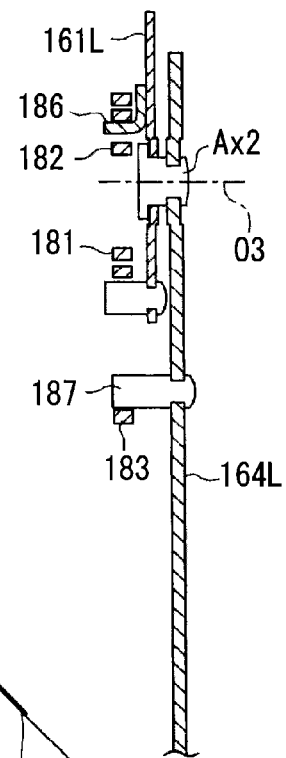
FIG. 25B is a cross-sectional view of the repulsive spring taken along line 25B-26B in FIG. 25A.
Figure 25A:
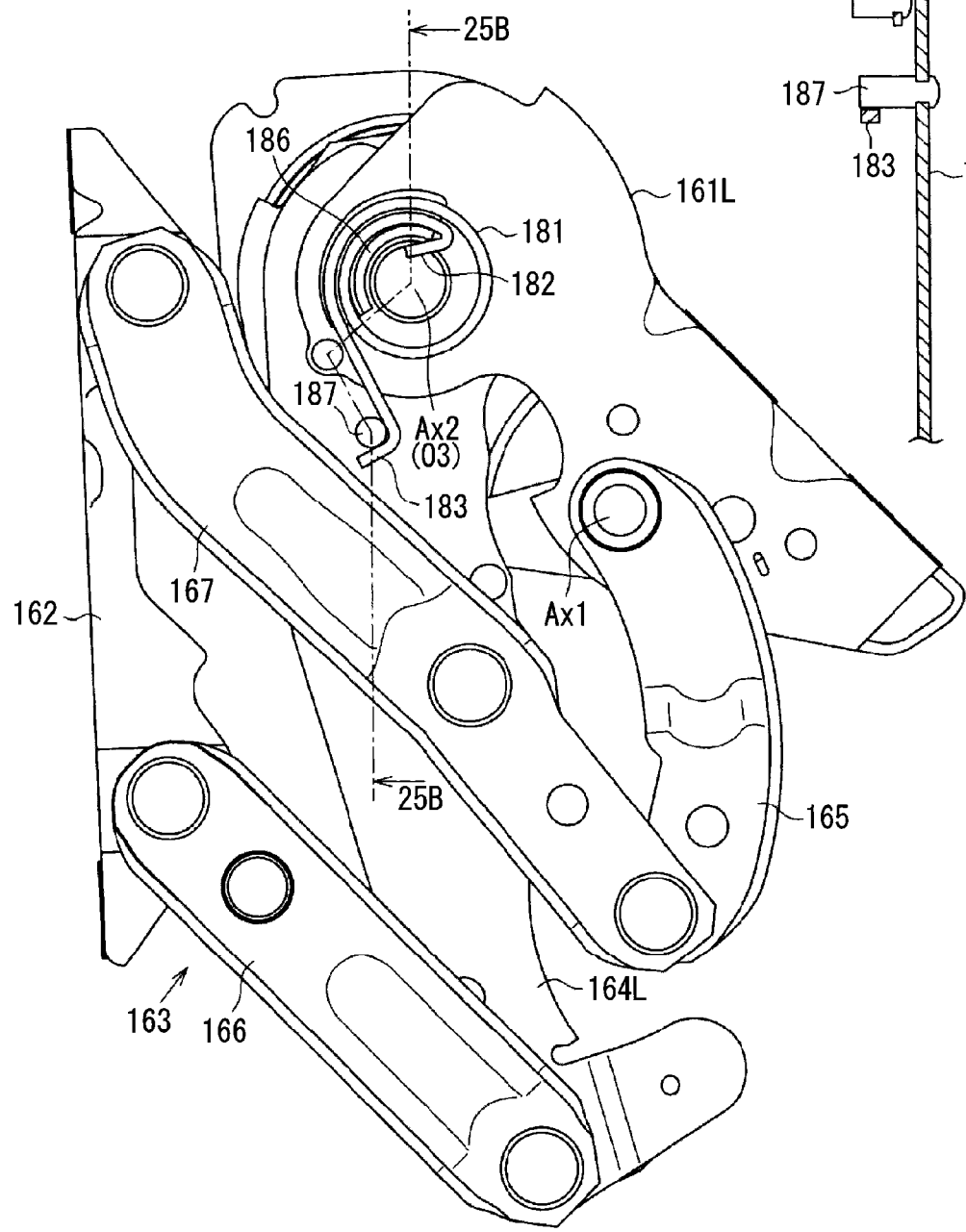
FIG. 25A is a lateral view of a repulsive spring viewed from an outward in the seat width direction according to the fourth embodiment disclosed here.

As illustrated in FIGS. 25A and 25B, a repulsive spring 181 serving as a biasing member, for example, a spiral spring is wound around the support shaft Ax2 at one of end portions of the main pivot link 164L. An end portion 182 serving as a first leg portion at an inner peripheral side of the repulsive spring 181 is retained at a retaining portion 186 which is provided at the bracket 161 L to protrude and to be in parallel with the support shaft Ax2. The retaining portion 186 is formed in an arced wall configuration. In addition, a retaining pin 187 serving as an engagement member formed in a substantially columnar shape is provided at the main pivot link 164L to protrude in parallel with the support shaft Ax2. An end portion 183 serving as a second leg portion at an external peripheral side of the repulsive spring 181 is in contact with or comes close to the retaining pin 187 when the ottoman 6 is in the retracted state as illustrated in FIG. 25A, and is arranged to block a locus of the pivotal motion of the main pivot link 164L towards the unlocked position B4 in the counterclockwise direction. Thus, when the ottoman 6 which is in the retracted state is further operated in the retracting direction, the repulsive spring 181, which includes the end portion 183 at the external peripheral side pushed by the retaining pin 187 in response to the pivotal motion of the main pivot link 164L in the counterclockwise direction in FIG. 25A, is tighten, and a biasing force for pivoting the main pivot ink 164L in the clockwise direction is generated at the repulsive spring 181, that is, a biasing force for operating the ottoman 6 in the deploying direction is generated. In other words, the repulsive spring 181 restrains the further operation of the ottoman 6 in the retracting direction within a range of the biasing force when the ottoman 6 is in the retracted state.

According to the configurations explained above, a relative rotational position of the first bracket 121 and the second bracket 131 when the ottoman 6 is in the retracted state and the main pivot link 164 is at the retracted position B0 is as illustrated in FIG. 22A. In those circumstances, the pawl 141 is biased for pivoting, or rotating in the counterclockwise direction (i.e., hereinafter referred to as a normal direction) about the pawl shaft portion 136 (the bearing hole 142) by the pawl reverse spring 146, and a ratchet portion 143 of the pawl 141 comes to contact a boundary position between the unlock wall portion 151 and the approach wall portion 152. In those circumstances, as illustrated in FIG. 24A, at the lock mechanism 170, the hook 171, which is maintained at the locked position by being biased by the reverse spring 176, hooks, or latches the striker pin 177 (the striker pin 177 is latched by the hook 171). Further, in those circumstances, at the repulsive spring 181, as illustrated in FIG. 25A, the end portion 183 at the external periphery is in contact with or close to the retaining pin 187.

Thus, a posture, or attitude of the ottoman 6 which is in the retracted state is maintained (i.e., the main pivot link 164 is maintained at the retracted position B0) by a cooperation of a frictional force between the first bracket 121 and the second bracket 131, and a latching force, or retaining force of the lock mechanism 170 with respect to the deploying direction. On the other hand, with respect to the retracting direction, the posture, or attitude of the ottoman 6 which is in the retracted state is maintained (i.e., the main pivot link 164 is maintained at the retracted position B0) by a cooperation of a frictional force between the first and second brackets 121, 131 and a biasing force of the repulsive spring 181.

In those circumstances, in a case where the ottoman 6 is operated in the retracting direction (pushing, or thrusting) to pivot the main pivot link 164 towards the unlocked position B4 against a biasing force of the repulsive spring 181, as illustrated in FIG. 26A, the hook 171 guided by the striker pin 177 at the first reversing cam surface 172b pivots in the counterclockwise direction about the support shaft Ax1, and the reverse spring 176 is turned over. Thus, the pivotal motion of the hook 171 is biased by the reverse spring 176 for maintaining the unlocked position. In those circumstances, the hook portion 172a of the hook 171 is set to be out of a pivotal locus of the striker pin 177 about the support shaft Ax2 in the counterclockwise direction in FIG. 26A. Accordingly, a pivotal motion of the main pivot link 164 in the counterclockwise direction in FIG. 26A is allowed to allow the ottoman 6 to operate in the deploying direction. The operation of the ottoman 6 in the deploying direction is assisted by a biasing force of the repulsive spring 181 when the operation is started.

On the other hand, a relative rotational position of the first and second brackets 121, 131 when the main pivot link 164 is positioned at the unlocked position B4 is illustrated in FIG. 26B. That is, in response to the rotation of the first bracket 121 relative to the second bracket 131 in the counterclockwise direction in FIG. 26B, the ratchet portion 143 of the pawl 141 biased by the pawl reverse spring 146 to pivot comes to contact with a portion of the unlock wall portion 151 in the vicinity of a dead end thereof. Namely, further operation in the retracting direction of the ottoman 6 which is in the retracted state is not inhibited by the adjusting mechanism 120.

Figure 27A:
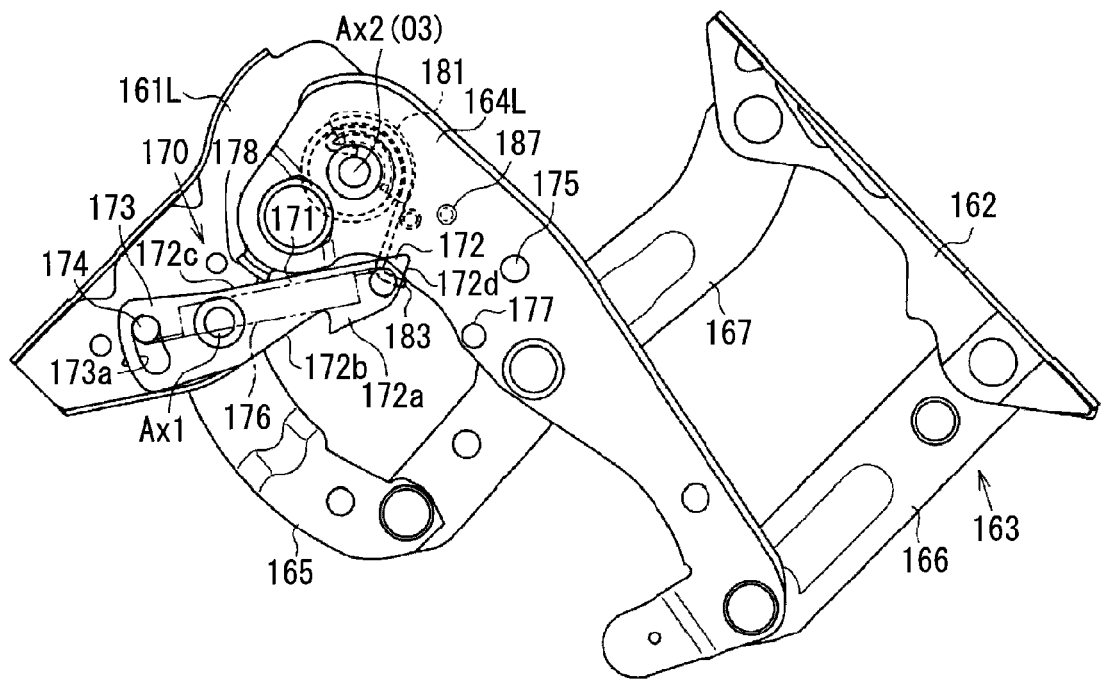
FIG. 27A is an explanatory lateral view of an operation of the lock mechanism when the ottoman is in an adjusting region.

When the ottoman 6 is assumed to be allowed to be operated in the deploying direction, in response to the deploying operation, the pivotal position of the main pivot link 164 reaches the adjusting range Z12 via the approaching range Z11 while disengaging (unlatching) the striker pin 177 from the hook 171. In those circumstances, the repulsive spring 181 whose end portion 183 is disengaged from the retaining pin 187 is recovered with elasticity to be in a free state. Particularly, when the main pivot link 164 is assumed to be in a state as illustrated in FIG. 27A, the reverse cam portion 178 starts pushing the second reversing cam surface 172c of the hook 171 so that the hook 171 guided by the reverse cam portion 178 at the second reversing cam surface 172c pivots about the support shaft Ax1 in the clockwise direction to turn over the reverse spring 176. Accordingly, the pivotal motion of the hook 171 is biased by the reverse spring 176 for maintaining the locked position.

Figure 27B:
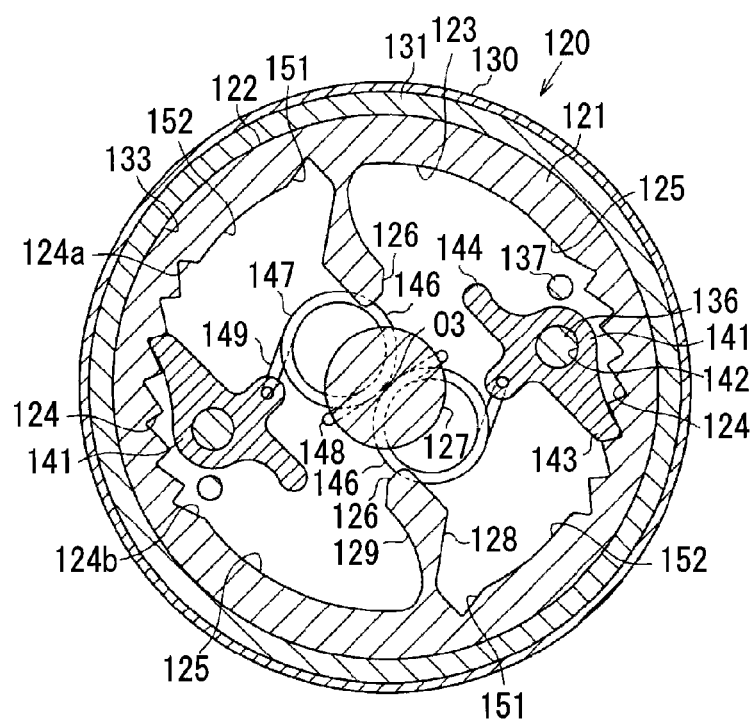
FIG. 27B is an explanatory lateral view of an operation of the adjusting mechanism when the ottoman is in the adjusting region.

On the other hand, when the pivotal position of the main pivot link 164 is at the adjusting range Z12, the relative rotational position of the first and second brackets 121, 131 is assumed as illustrated in FIG. 27B in which the ratchet portion 143 of the pawl 141 is engageable with the ratchet inner teeth portion 124. Thus, the first bracket 121 is pivotable in the clockwise direction in FIG. 27B relative to the second bracket 131 and is not pivotable in the counterclockwise direction in FIG. 27B relative to the second bracket 131 in a range from a relative rotational position of the first bracket 121 and the second bracket 131 at which the ratchet portion 143 of the pawl 141 whose pivotal motion is biased in the normal direction by the pawl reverse spring 146 is engaged with an initial tooth portion 124a of the ratchet inner teeth portion 124 to a relative rotation position of the first bracket 121 and the second bracket 131 at which the ratchet portion 143 of the pawl 141 engages with a final tooth portion 124b.

In other words, the relative rotational position of the first and second brackets 121, 131 is adjustable stepwise and maintainable within a range from the relative rotational position where the ratchet portion 143 engages with the initial tooth portion 124a of the ratchet inner teeth portion 124 to the relative rotational position at which the ratchet portion 143 engages with the final tooth portion 124b of the ratchet inner teeth portion 124. Further, a pivotal position of the main pivot link 164 is adjustable stepwise and maintainable in accordance with the relative position of the first and second brackets 121, 131. The relative rotational position of the first and second brackets 121, 131 when the ratchet portion 143 of the pawl 141 engages with the initial tooth portion 124a of the ratchet inner teeth portion 124 corresponds to the first boundary position B1 of the main pivot link 164. Further, the relative rotational position of the first and second brackets 121, 131 when the ratchet portion 143 of the pawl 141 engages with the final tooth portion 124b of the ratchet inner teeth portion 124 corresponds to the second boundary position B2 of the main pivot link 164.

Figure 28:
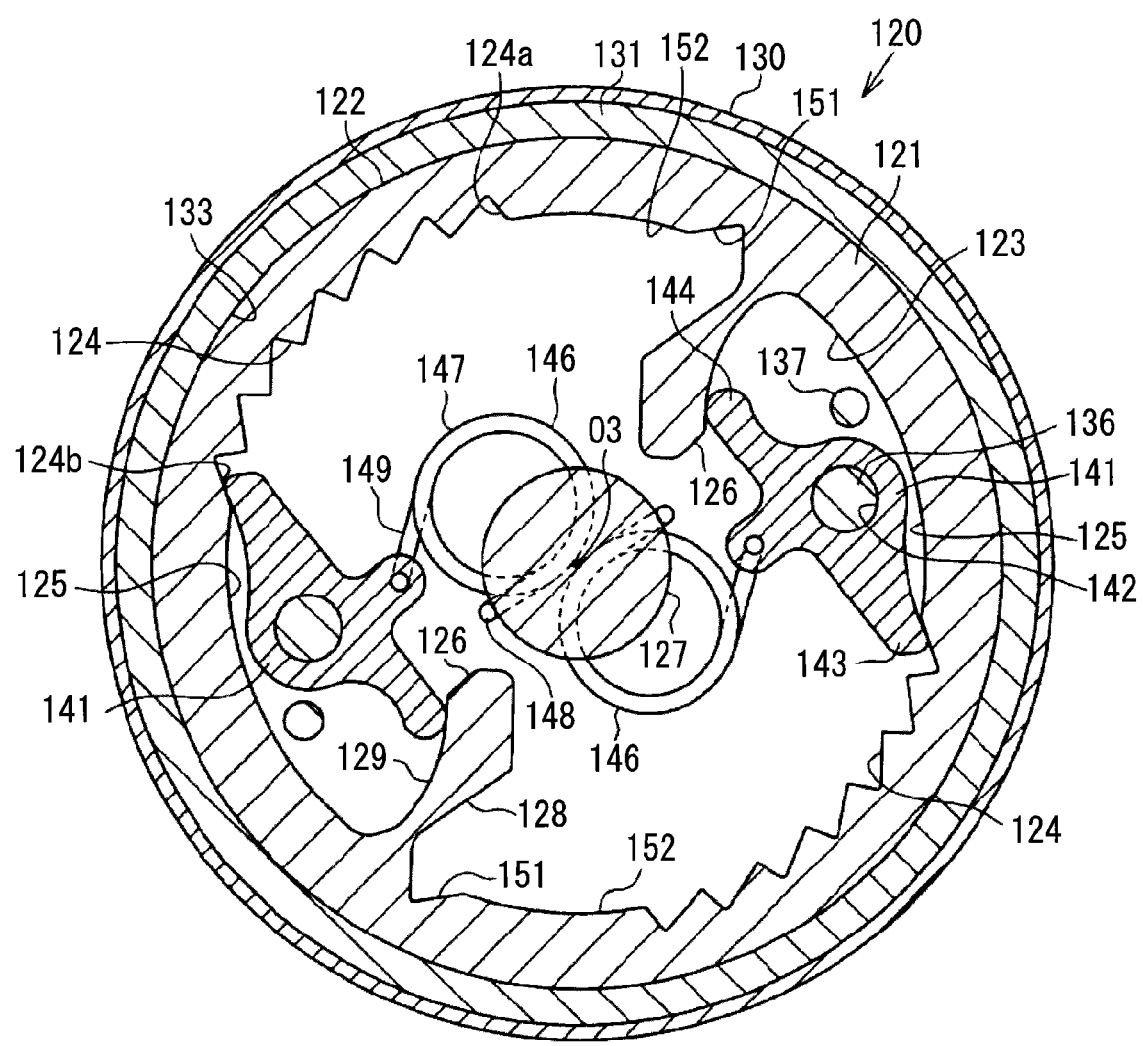
FIG. 28 is an explanatory view illustrating an operation of the adjusting mechanism in a case where a pawl starts rotating in a reverse direction.

When the main pivot link 164 further pivots from the second boundary position B2 towards the reversing position B3 and when the first bracket 121 further rotates relative to the second bracket 131 in the clockwise direction, as illustrated in FIG. 28, the ratchet portion 143 of the pawl 141 climbs over or overrides the final tooth portion 124b of the ratchet inner teeth portion 124 to slide on the idle wall portion 125. Simultaneously, the pawl 141 starts pivoting in the clockwise direction in FIG. 28 against the biasing force of the pawl reverse spring 146 when the pawl side reverse wall portion 144 starts being pushed by the bracket side reverse wall portion 129.

Figure 29:
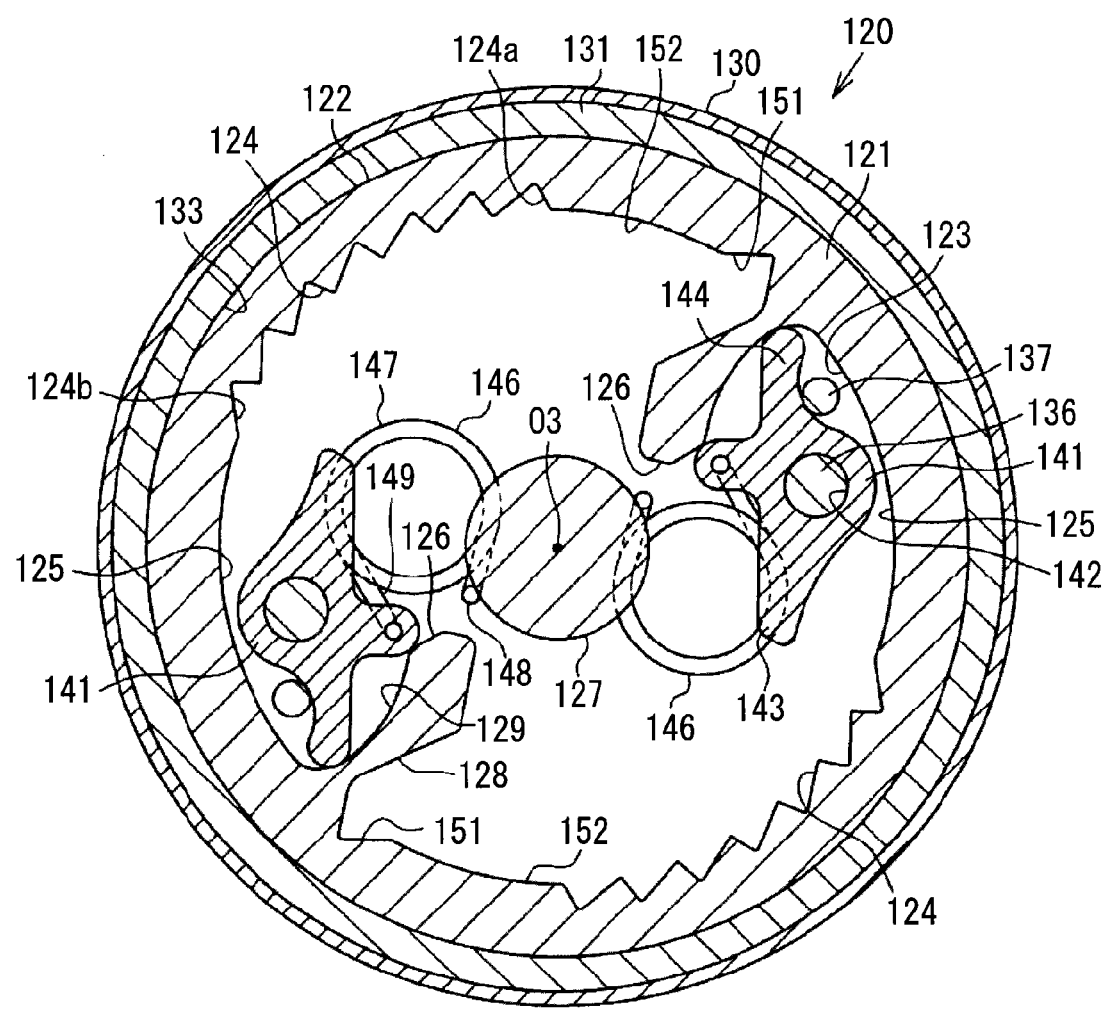
FIG. 29 is an explanatory view illustrating an operation of the adjusting mechanism in a case where the rotation of the pawl in the reverse direction is completed.

When the main pivot link 164 further pivots from the second boundary position B2 towards the reversing position B3 and when the first bracket 121 further rotates in the clockwise direction relative to the second bracket 131, as illustrated in FIG. 29, the pawl reverse spring 146 is turned over in response to the further pivotal motion of the pawl 141 in the clockwise direction in FIG. 29. Thus, the pivotal motion of the pawl 141 is biased in the clockwise direction (i.e., hereinafter referred to as a reverse direction) in FIG. 29 about the pawl shaft portion 136 (the bearing hole 142) by the pawl reverse spring 146. That is, the pawl 141 rotates to be biased in the reverse direction by the pawl reverse spring 146.

Upon the reverse rotating operation of the pawl 141, the pawl side reverse wall portion 144 is retained by a pawl support portion 137 to stop rotating. Thus, in a state where the pawl 141 is rotated to be biased in the reverse direction, the pawl 141 is disengaged from the first bracket 121 (specifically, the recess portion 123), and the rotation (return rotation) of the second bracket 131 in the clockwise direction in FIG. 29 relative to the first bracket 121 is not inhibited by the pawl 141. The relative rotational position of the first and second brackets 121, 131 when the pawl 141 is rotated to be biased in the reverse direction corresponds to the reversing position B3 of the main pivot link 164.

When the main pivot link 164 pivots between the second boundary position B2 and the reversing position B3 (the idle range Z13), the hook 171 biased by the reverse spring 176 is maintained at the locked position and the repulsive spring 181 maintains a free state.

Figure 30A:
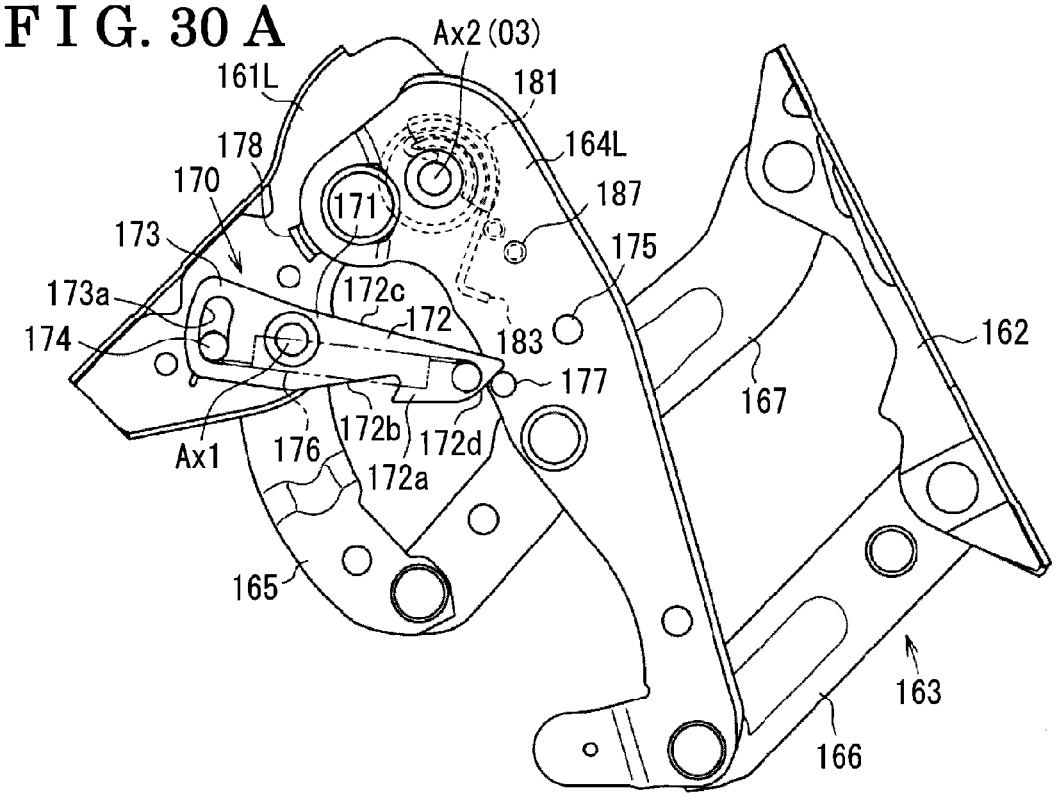
FIG. 30A is an explanatory lateral view of the lock mechanism while the ottoman is in a retracting operation.
Figure 30B:
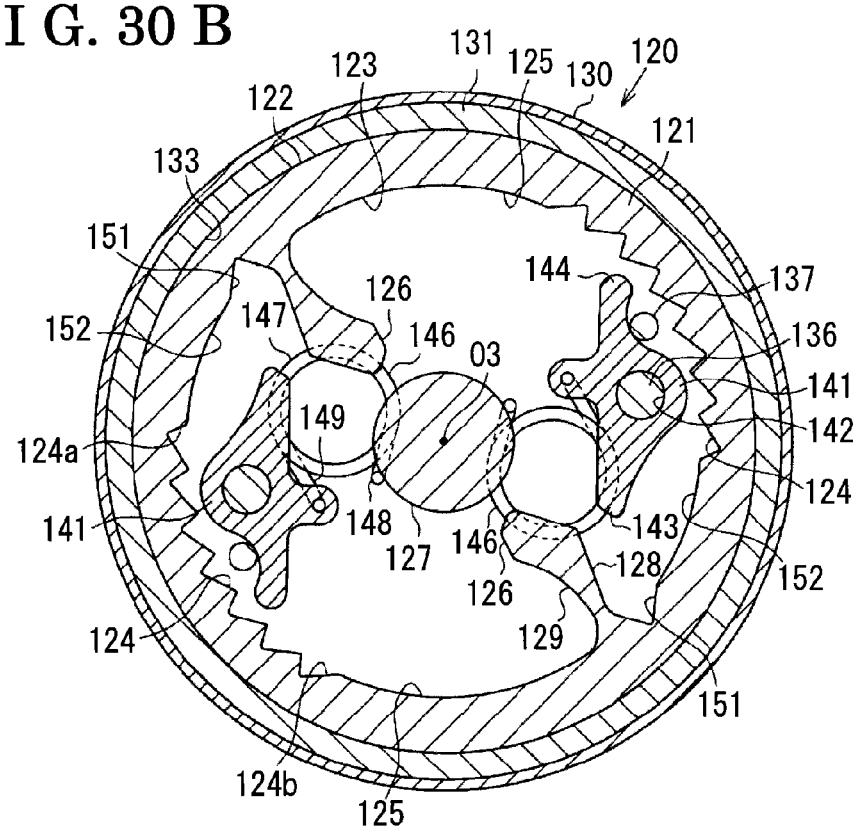
FIG. 30B is an explanatory cross-sectional view of the adjusting mechanism while the ottoman is in the retracting operation.

When the main pivot link 164 pivots (i.e., performs a returning pivotal motion) towards the retracted position B0 in a state where the pawl 141 is reversed, as illustrated in FIG. 30A, the reverse cam portion 178 of the main pivot link 164 passes by the second reversing cam surface 172c of the hook 171 which is at the locked position. Then, the striker pin 177 of the main pivot link 164 comes to contact with the lock cam surface 172d of the hook 171 which is in the locked position. In those circumstances, as illustrated in FIG. 30B, the pawl 141 maintains a reversed state in which the pawl 141 is disengaged from the first bracket 121 (the recess portion 123).

Figure 31A:
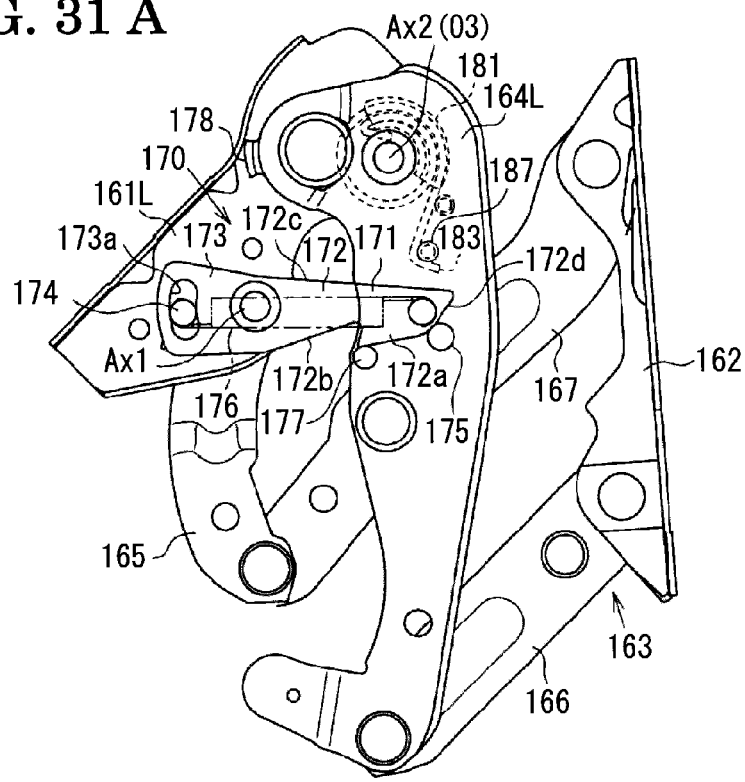
FIG. 31A is an explanatory lateral view of the lock mechanism immediately before the ottoman returns to the retracted state.

When the main pivot link 164 further pivots (i.e., performs the pivotal motion) towards the retracted position B0, as illustrated in FIG. 31A, the hook 171 guided by the striker pin 177 at the lock cam surface 172d rotates or pivots about the support shaft Ax1 in the counterclockwise direction within a range that the reverse spring 176 is not turned over. Then, when the striker pin 177 passes by the lock cam surface 172d, the hook 171 whose pivotal motion is biased by the reverse spring 176 returns to the locked position while the striker pin 177 is fitted into the hook portion 172a (see FIG. 24A).

Figure 31B:
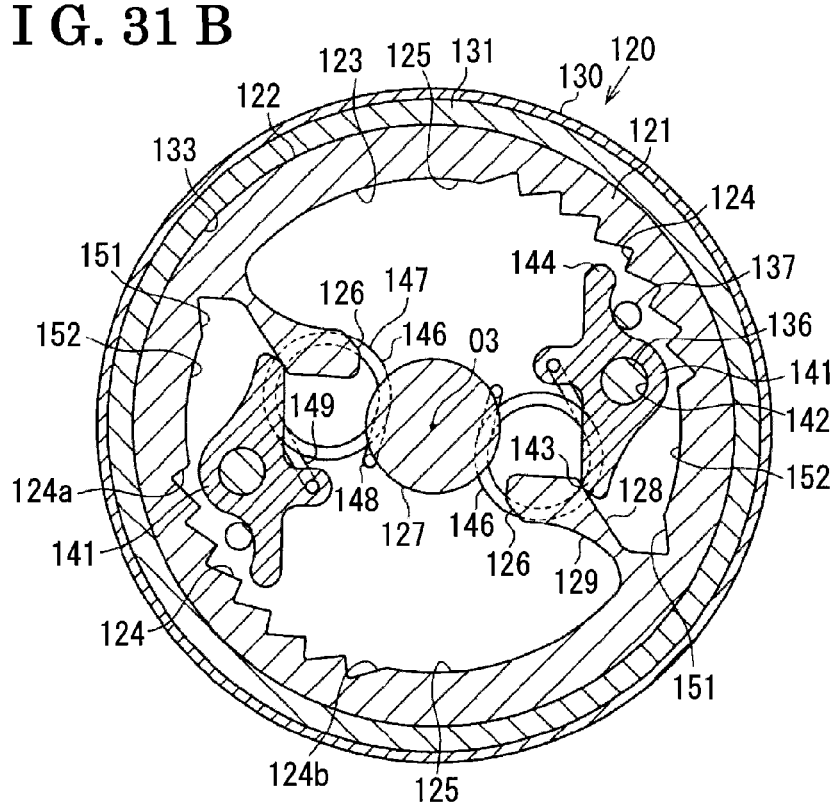
FIG. 31B is an explanatory cross-sectional view of the adjusting mechanism immediately before the ottoman returns to the retracted state.

On the other hand, when the hook 171 rotates within the range that the reverse spring 176 is not turned over, as illustrated in FIG. 31B, in response to the rotation of the first bracket 121 relative to the second bracket 131 in the counterclockwise direction, the ratchet portion 143 of the pawl 141 starts being pressed by the bracket side return wall portion 128 of the switch wall portion 126. Then, the pawl 141 starts rotating in the counterclockwise direction against the biasing force of the pawl reverse spring 146. Upon the further rotation (returning) of the first bracket 121 relative to the second bracket 131 in the counterclockwise direction, the pawl reverse spring 146 is turned over in response to the further rotation of the pawl 141 in the counterclockwise direction, and the pawl 141 is biased to rotate in the normal direction by the pawl reverse spring 146 (see FIG. 22A). The relative rotational position of the first and second brackets 121, 131 in the aforementioned state corresponds to the retracted position B0 of the main pivot link 164.

An operation of the main pivot link 164 which is in the retracted position B0 at the lowermost position when the ottoman 6 is in the retracted state will be explained as follows. As described above, when the main pivot link 164 is at the retracted position B0, the striker pin 177 is hooked by the hook 171 which is maintained at the locked position by the biasing force of the reverse spring 176 to rotate. In those circumstances, the ratchet portion 143 of the pawl 141 whose pivotal motion is biased in the normal direction by the pawl reverse spring 146 comes to contact with the vicinity of the boundary position between the unlock wall portion 151 and the approach wall portion 152.

When the main pivot link 164 is rotated towards the unlocked position B4 against the biasing force of the repulsive spring 181 by operating the ottoman 6 in the retracting direction, in those circumstances, the reverse spring 176 is turned over in response to the rotation of the hook 171 guided by the striker pin 177. Then, the hook 171 whose pivotal motion is biased by the reverse spring 176 so as to maintain the unlocked position is disengaged from the striker pin 177. Accordingly, the rotation of the main pivot link 164 towards the adjusting range Z12 is allowed to allow the operation of the ottoman 6 in the deploying direction. In those circumstances, the ratchet portion 143 of the pawl 141 whose rotation is biased by the pawl reverse spring 146 in the normal direction slides on the unlock wall portion 151. The operation of the ottoman 6 in the deploying direction is assisted by the biasing force of the repulsive spring 181 when the operation is started.

By rotating the main pivot link 164 towards the first boundary position B1 by operating the ottoman 6 in the deploying direction (upward), in those circumstances, the ratchet portion 143 of the pawl 141 whose pivotal motion is biased in the normal direction by the pawl reverse spring 146 slides on the approach wall portion 152. Accordingly, by the cooperation with the repulsive spring 181, the ottoman 6 can be swiftly moved upward (flipped up, or lifted up).

When rotating the main pivot link 164 towards the adjusting range Z12 by operating the ottoman 6 in the deploying direction, the ratchet portion 143 of the pawl 141 whose pivotal motion is biased in the normal direction by the pawl reverse spring 146 enters and engages with the ratchet inner teeth portion 124 from the approach wall portion 152. Then, when the main pivot link 164 moves the ottoman 6 in the upward direction within the adjusting range Z12, the ratchet portion 143 consecutively or sequentially engages with each of teeth of the ratchet inner teeth portion 124. Accordingly, stepwise adjustment and retainment of the tilt angle θ1 of the ottoman 6 can be achieved within a range where the main pivot link 164 is positioned in the adjusting range Z12. When the main pivot link 164 pivots within the adjusting range Z12, the reverse spring 176 is turned over in response to the rotation of the hook 171 guided by the reverse cam portion 178. The rotation of the hook 171 is biased by the reverse spring 176 so as to maintain the locked position.

In a deployment state where the tilt angle θ1 of the ottoman 6 is adjusted or maintained, when the ottoman 6 is operated in the deploying direction, the main pivot link 164 rotates towards the reversing position B3, and the pawl 141 rotates so that the rotation of the pawl 141 is biased in the reverse direction by means of the pawl reverse spring 146. Then, the pawl 141 is disengaged from the first bracket 121. Thus, for example, the ottoman 6 can be swiftly operated in the retracting direction (downward).

When the main pivot link 164 reaches the retracted position B0 in response to the operation of the ottoman 6 in the retracting direction, the hook 171 hooks, or latches the striker pin 177 in response to the rotation of the hook 171 guided by the striker pin 177 within a range that the reverse spring 176 is not turned over. Thus, the operation of the ottoman 6 in the deploying direction is prohibited, or restricted. Simultaneously, the pawl 141 rotates (returns) so that the rotation of the pawl 141 is biased by the pawl reverse spring 146 in the normal direction.

Figure 32:
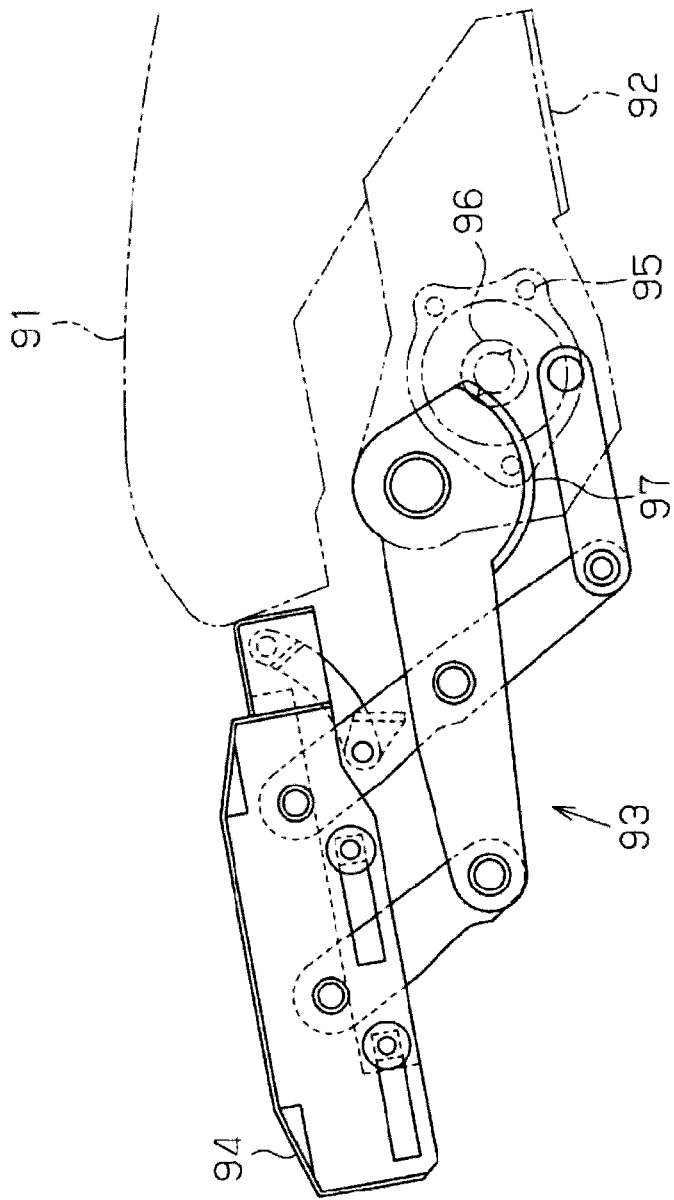
FIG. 32 shows a schematic view of a prior art.

A known ottoman apparatus for vehicle is, for example, disclosed in JP2009-240350A. As illustrated in FIG. 32, according to the known ottoman apparatus, a bracket 92 is secured to a front end portion of a lateral portion of a seat cushion 91, and an ottoman 94 is connected to the bracket 92 via a link mechanism 93. The link mechanism 93 structures a pantograph linkage and is configured to be protruded in a forward direction of the seat so that the ottoman 94 is deployed. Further, the link mechanism 93 is configured to be folded in a rearward direction of the seat so that the ottoman 94 is retracted, or stored.

The link mechanism 93 operates the ottoman 94 to be deployed or retracted by being transmitted with an operational force of an operation knob via a brake apparatus 95 including a two way rotary clutch mechanism and a transmission mechanism including a pinion 96 and a sector gear 97. Thus, an attitude of the ottoman 94 is adjustable by the rotational operation of the operation knob.

According to the configuration disclosed in JP2009-240350A, because the operation knob has to be positioned at a connecting portion lateral surface of the link mechanism 93 provided at the seat cushion 91 side (bracket 92 side), positioning space in the seat width direction is limited, As described above, according to the fourth embodiment, the following effects and advantages can be attained. First, in the adjusting region of the ottoman 6 (the adjusting range Z12 of the main pivot link 164), the adjusting mechanism 120 allows the operation of the ottoman 6 in the deploying direction to the maximally deployed state and prohibits, or restricts the operation of the ottoman 6 in the retracting direction. Thus, the operational position of the ottoman 6 can be adjusted by operating the ottoman 6 in the deploying direction. Accordingly, for example, an operation knob for adjusting the ottoman 6 is not necessary and a limitation for positioning space can be reduced.

The retracted state of the ottoman 6 is maintained by the hook 171 which is in the locked position by retaining the striker pin 177 in addition to the frictional force at the adjusting mechanism 120. Thus, the retracted state of the ottoman 6 can be firmly maintained by the cooperation of the frictional force and the retainment of the striker pin 177 by the hook 171, and for example, possibilities that the ottoman 6 is deployed due to the influence by the oscillation of the vehicle can be reduced.

When the ottoman 6 is further operated in the retracting direction in a state where the ottoman 6 is in the retracted state, the hook 171 guided by the striker pin 177 rotates to the unlocked position where the striker pin 177 is released to allow the operation of the ottoman 6 in the deploying direction. Accordingly, the adjustment of the ottoman 6 in the adjusting region by the adjusting mechanism 120 can be achieved.

When the ottoman 6 operates in the deploying direction, the hook 171 guided by the reverse cam portion 178 rotates to the locked position where the hook 171 is allowed to hook, or retain the striker pin 177 in the retracted state of the ottoman 6. Thus, thereafter, when the ottoman 6 is operated in the retracting direction which the adjusting mechanism 120 allows, the hook 171 which is in the locked position hooks the striker pin 177 in the retracted state of the ottoman 6 to prohibit, or restrict the operation of the ottoman 6 in the deploying direction. Accordingly, the retracted state of the ottoman 6 can be re-maintained by the hook 171 and the striker pin 177.

Second, according to the configuration of the fourth embodiment, in the retracted state of the ottoman 6, the reverse spring 176 biases the rotation of the hook 171 retaining the striker pin 177 to be at the locked position to maintain the retracted state of the ottoman 6 in more stable state. Then, when the ottoman 6 is further operated in the retracting direction in the retracted state, the reverse spring 176 is turned over to bias the rotation of the hook 171 to be in the unlocked position. Accordingly, the operation of the ottoman 6 in the deploying direction can be started more stably. Thereafter, when operating the ottoman 6 in the deploying direction, the reverse spring 176 is turned over to bias the rotation of the hook 171 to the locked position. Thus, when the ottoman 6 is operated in the retracting direction which the adjusting mechanism 120 allows thereafter, the hook 171 can be more smoothly hooked to the striker pin 177 in the retracted state of the ottoman 6.

Third, according to the fourth embodiment, by providing the hook 171 and the striker pin 177 at the bracket 161 and the main pivot link 164, respectively, which are positioned close to the seat cushion 2, an assembling error relative to the seat cushion 2 is restrained, thus, the hook 171 and the striker pin 177 operate with high precision.

Fourth, according to the fourth embodiment, when deploying the ottoman 6 when the ottoman 6 is in the retracted state, in response to the operation of the ottoman 6 for rotating the hook 171 towards the unlocked position to allow the deployment operation (further operation in the retracting direction), the biasing force for operating the ottoman 6 in the deploying direction can be generated at the repulsive spring 181. Thus, in accordance with a release of the prohibition of the operation of the ottoman 6 in the deploying direction, for example, by the hook 171, the operation of the ottoman 6 in the deploying direction can be assisted by the repulsive spring 181 to smoothly operate the ottoman 6 in the deploying direction.

Further, because the end portion 183 of the repulsive spring 181 contacts or assumed to be close to the retaining pin 187 when the ottoman 6 is in the retracted state, in a case where the ottoman 6 which is in the retracted state is urged to operate in the retracting direction due to the influence of, for example, the oscillation of the vehicle, the repulsive spring 181 generates a biasing force against the aforementioned operation of the ottoman 6. Thus, a possibility that the hook 171 and the striker pin 177 are disengaged can be reduced. Further, an unintentional generation of the biasing force for operating the ottoman 6 in the deploying direction at the repulsive spring 181 when the ottoman 6 is in the retracted state can be avoided.

According to the configuration of the fourth embodiment, the pawl 141 of which the ratchet portion 143 engages with the ratchet inner teeth portion 124 of the first bracket 121 is positioned in the accommodating void S formed between the first bracket 121 and the second bracket 131. The first bracket 121 and the second bracket 131 are restricted to move, for example, in an axial direction by means of a holding member 130. According to the foregoing configuration, misalignment of the ratchet inner teeth portion 124 and the ratchet portion 143 in the axial direction can be restricted, and the tilt angle O1 of the ottoman 6 (rotational position of the main pivot link 164) can be retained, or maintained more stably. Further, a structure for adjusting and maintaining the tilt angle O1 of the ottoman 6 can be formed in a simple structure, for example, by the pawl 141 and the pawl reverse spring 146.

According to the configuration of the fourth embodiment, the coil portion 147 of the pawl reverse spring 146 is arranged so that an axial direction of the coil portion 147 is in parallel with an axial direction (the axis O3) of the first and second brackets 121, 131. Thus, for example, space necessary for disposing the coil portion 147 (the pawl reverse spring 146) can be reduced compared to a case where a radial direction of the coil portion 147 is arranged in parallel with the axial direction of the first and second brackets 121, 131.

According to the configuration of the fourth embodiment, plural pairs (e.g., two pairs) of the pawl 141 and the pawl reverse spring 146 are arranged symmetrically about a point within the accommodating void S. Thus, for example, the tilt angle θ1 of the ottoman 6 can be adjusted and maintained firmly by plural pairs of, for example, the pawls 14. Further, because the plural pairs of, for example, pawls 141 are positioned to be symmetrical about the point within the accommodating void S using a range of primarily the recess portion 132 in the axial direction, a load is uniformly distributed, or dispersed in the rotational direction when adjusting and maintaining the tilt angle O1 of the ottoman 6.

According to the configuration of the fourth embodiment, the spring holding wall portion 127 of the first bracket 121 holds, or presses the coil portion 147 of the pawl reverse spring 146 against a spring accommodating portion 134 of the second bracket 131 in the axial direction, thus, the coil portion 147 is restrained from being risen, or lifted.

According to the configuration of the fourth embodiment, the first end portion 148 and the second end portion 149 of the pawl reverse spring 146 are bent to overlap an outer peripheral portion of the coil portion 147 to restrain the coil portion 147 from falling, According to the configuration of the fourth embodiment, when moving the ottoman 6 upwardly from the retracted state so that the main pivot link 164 rotates from the retracted position BO towards the adjusting range Z12, the motion of the ottoman 6 acquires momentum (gains momentum) in the approaching range Z11 to smoothly deploy the ottoman 6.

The configuration of the fourth embodiment may be modified as described below. According to the fourth embodiment, the support shaft Ax1 of the auxiliary pivot link 165 serves as a rotational axis for the hook 171. Alternatively, the support shaft of the auxiliary pivot link 165 and the rotational axis of the hook 171 may be provided separately. In those circumstances, the rotational axis of the hook 171 is not necessarily arranged to be coaxial with the support shaft Ax1 of the auxiliary pivot link 165.

The hook 171 and the striker pin 177 of the lock mechanism 170 may be provided at two members, respectively, of the bracket 161, the support bracket 162, the main pivot link 164, the auxiliary pivot link 165, the first swing link 166, and the second swing link 167, The repulsive spring 181 and the retaining pin 187 may be provided at two members, respectively, of the bracket 161, the support bracket 162, the main pivot link 164, the auxiliary pivot link 165, the first swing link 166, and the second swing link 167.

According to the fourth embodiment, the reverse cam portion 178 is integrally formed with the main pivot link 164, Alternatively, the reverse cam portion 178 may be provided as the contact member which is separately provided from the main pivot link 164. Further, for example, a plate spring may be applied as the reverse spring 176. As long as being capable of turning over so that the hook 171 rotates between the locked position and the unlocked position, any spring can be applied. Further, in a case where the hook 171 can be maintained, or retained at the locked position and the unlocked position only by, for example, a frictional force, the reverse spring 176 may be omitted.

The first bracket 121 may be fixed to the seat cushion 2 side, and the second bracket 131 may be fixed to the ottoman 6 side. The adjusting mechanism 120 may be provided at a connecting portion of one of between the bracket 161 and the main pivot link 164, between the bracket 161 and the auxiliary pivot link 165, between the main pivot link 164 and the first swing link 166, between the main pivot link 164 and the second swing link 167, between the auxiliary pivot link 165 and the second swing link 167, between the first swing link 166 and the support bracket 162, and between the second swing link 167 and the support bracket 162. In those circumstances, it is preferable to provide the adjusting mechanism 120 at the connecting portion either between the bracket 161 serving as the seat cushion 2 side and the main pivot link 164 or between the bracket 161 and the auxiliary pivot link 165, According to the fourth embodiment, the ratchet portion 143 also functions as the pawl side return wall portion. Alternatively, the pawl side return wall portion may be provided separately from the ratchet portion 143. According to the fourth embodiment, for example, a plate spring may be applied as the pawl reverse spring 146. As long as being capable of turning over so that the pawl 141 rotates to be biased in the reverse direction, any spring is applicable.

The adjusting mechanism 120 is an example of the fourth embodiment. For example, a spring coupler may be applied as an adjusting mechanism. As long as enabling to adjust and maintain the ottoman 6 in accordance with the operation of the ottoman 6, any structure is applicable.

An example of the support structure of the ottoman 6 at the seat cushion 2 side is disclosed in the embodiment. For example, alternatively, the ottoman 6 may be moved in upward and downward directions by a cantilever structure which is rotatably connected to the seat cushion 2 side (bracket 161) via the adjusting mechanism.

According to the configuration of the disclosure, when the pawl 141 is biased to rotate in the normal direction by means of the pawl reverse spring 146, the ratchet portion 143 slides on the unlock wall portion 151 to allow a relative rotation of the first and second brackets 121 and 131) in the first and second directions so as to allow the ottoman 6 to be further operated in the retracting direction in a state where the ottoman 6 is in the retracted state. Further, the engagement of the ratchet portion 143 with the ratchet inner teeth portion 124 allows a relative rotation of the first and second brackets 121 and 131 in the first direction when the pawl 141 is biased to rotate in the normal direction by the pawl reverse spring 146. Accordingly, in accordance with the relative rotation of the first and second brackets 121 and 131 in the first direction, the ottoman 6 can be adjusted stepwise and maintained.

On the other hand, when the first and second brackets 121 and 131 relatively rotates in the first direction, the pawl side reverse wall portion 144 of the pawl 141 contacts the bracket side reverse wall portion 129 and the pawl 141 is biased to rotate in the reverse direction by means of the pawl reverse spring 146 to allow the relative rotation of the first and second brackets 121 and 131 in the second direction. Thus, in accordance with the relative rotation of the first and second brackets 121 and 131 in the second direction, an attitude or a posture of the ottoman 6 can be swiftly adjusted. Then, when the first and second brackets 121 and 131 relatively rotate in the second direction, the pawl side return wall portion 143 of the pawl 141 contacts the bracket side return wall portion 128 and the pawl 141 is returned to be biased to rotate in the normal direction by the pawl reverse spring 146 so that the ottoman 6 is assumed to be retainable in the retracted state again.

Particularly, because the pawl 141 of which the ratchet portion 143 is configured to be engaged with the ratchet inner teeth portion 124 of the first bracket 121 is positioned in the accommodating void S formed between the first bracket 121 and the second bracket 131 which are restricted to move in the axial direction by the holding member 130 the misalignment of the ratchet inner teeth portion 124 and the ratchet portion 143 in the axial direction can be restricted so that the ottoman 6 can be maintained in more stable state. Further, a structure for adjusting and retaining the ottoman 6 can be formed in a simple structure including the pawl 141 and the pawl reverse spring (146) which are positioned in the accommodating void S.

According to the aforementioned embodiments, the first bracket 21, 51, 71, 81, 121 and the second bracket 31, 131 are allowed to relatively rotate in the first direction (the counterclockwise direction) in a case where the pawl 41, 56, 76, 86, 141 is biased to rotate in the normal direction by the pawl reverse spring 46, 146 because the ratchet portion 43, 77, 143 engages with the ratchet inner teeth portion 24, 124, Thus, in association with the relative rotation of the first bracket 21, 51, 71, 81, 121 and the second bracket 31, 131 in the first direction, the posture of the seat 1 may be adjusted and maintained in the stepwise manner.

In addition, the first bracket 21, 51, 71, 81, 121 and the second bracket 31, 131 are allowed to relatively rotate in the second direction in a state where the pawl 41, 56, 76, 86, 141 is biased to rotate in the reverse direction by the pawl reverse spring 46, 146 because of the pawl side reverse wall portion 44, 57, 144 of the pawl 41, 56, 76, 86, 141 making contact with the bracket side reverse wall portion 29, 52, 129 in a case where the first bracket 21, 51, 71, 81, 121 and the second bracket 31, 131 relatively rotate in the first direction. Accordingly, in association with the relative rotation of the first bracket 21, 51, 71, 81, 121 and the second bracket 31, 131 in the second direction, the posture of the seat 1 may be promptly or swiftly adjusted. Then, at the time of the relative rotation of the first bracket 21, 51, 71, 81, 121 and the second bracket 31, 131 in the second direction, the pawl side return wall portion 43, 47, 143 of the pawl 41, 56, 76, 86, 141 makes contact with the bracket side return wall portion 28, 128 so that the pawl 41, 56, 76, 86, 141 is returned by being biased to rotate in the normal direction by the pawl reverse spring 46, 146. As a result, the posture of the seat 1 may be adjusted and maintained in the stepwise manner.

Specifically, because the pawl 41, 56, 76, 86, 141 of which the ratchet portion 43, 77, 143 engages with the ratchet inner teeth portion 24, 124 is arranged within the accommodating void S formed between the first bracket 21, 51, 71, 81, 121 and the second bracket 31, 131, the ratchet inner teeth portion 24, 124 and the ratchet portion 43, 77, 143 are inhibited from being misaligned in the axial direction. The posture of the seat 1 may be further stably maintained. Further, a structure for adjusting and holding the posture of the seat 1 may be obtained by a simple structure including the pawl 41, 56, 76, 86, 141 and the pawl reverse spring 46, 146 for example, arranged within the accommodating void S.

According to the aforementioned embodiments, the pawl reverse spring 46, 146 includes the coil portion 47 of which an axial direction extends in parallel with the rotational axial direction of the second bracket 31, 131.

Accordingly, compared to a case where the radial direction of the coil portion 47 is parallel with the axial direction of the first bracket 21, 51, 71, 81, 121 and the second bracket 31, 131, space for arranging the pawl reverse spring 46, 146 may be reduced in the axial direction of the first bracket 21, 51, 71, 81, 121 and the second bracket 31, 131.

According to the aforementioned embodiments, plural pairs in which one pair includes the pawl 41, 56, 76, 86, 141 and the pawl reverse spring 46, 146 are arranged within the accommodating void S so as to be rotationally symmetric.

Accordingly, the posture of the seat 1 may be further securely adjusted and maintained by the plural pairs of the pawl 41, 56, 76, 86, 141 and the pawl reverse spring 46, 146. In addition, because the plural pairs of the pawl 41, 56, 76, 86, 141 and the pawl reverse spring 46, 146 are arranged rotationally symmetric within the accommodating void S, a load is uniformly distributed or dispersed in the rotation direction of the first bracket 21, 51, 71, 81, 121 and the second bracket 31, 131 when the posture of the seat 1 is adjusted or maintained.

According to the aforementioned embodiments, the first bracket 51 includes an idle wall portion 25 allowing the relative rotation of the first bracket 51 and the second bracket 31 by the ratchet portion 43 sliding on the idle wall portion 25 before the pawl 56 is reversed in a case where the pawl 56 is biased to rotate in the normal direction by the pawl reverse spring 46, a reverse engagement projection 53 formed to project at the idle wall portion 25 and a reverse engagement recess portion 58 formed to be dented at the pawl 56 and to which the reverse engagement projection 53 is fitted in a case where the pawl 56 is reversed.

Accordingly, when the relative rotation of the first bracket 51 and the second bracket 31 in the second direction is started, the reverse engagement recess portion 58 disengages from or overrides the reverse engagement projection 53, which leads to the moderate start of the relative rotation.

According to the aforementioned embodiments, the first bracket 71 includes an approach wall portion 73 on which the ratchet portion 77 slides before the ratchet portion 77 engages with the ratchet inner teeth portion 24 at the time of the relative rotation of the first bracket 71 and the second bracket 31 in the first direction in a case where the pawl 76 is biased to rotate in the normal direction by the pawl reverse spring 46, a return engagement projection 74 formed to project at the approach wall portion 73, and a return engagement recess portion 78 formed to be dented at the ratchet portion 77 and to which the return engagement projection 74 is fitted in a case where the pawl 76 is returned.

Accordingly, when the relative rotation of the first bracket 71 and the second bracket 31 in the first direction is started, the return engagement recess portion 78 disengages from or overrides the return engagement projection 74, which leads to the moderate start of the relative rotation.

According to the aforementioned embodiments, the seat adjustment apparatus is disposed between a seat cushion 2 and an ottoman 6 to hold the ottoman 6 by restricting the relative rotation of the first bracket 71 and the second bracket 31 in the first direction in a case where the ottoman 6 is in a retracted state, to allow the ottoman 6 to operate in a deploying direction by allowing the relative rotation of the first bracket 71 and the second bracket 31 in the first direction and inhibit the ottoman 6 to operate in a retracting direction by restricting the relative rotation of the first bracket 71 and the second bracket 31 in the second direction in an adjusting region to a maximally deployed state of the ottoman 6, and to allow the ottoman 6 to operate in the retracting direction by allowing the relative rotation of the first bracket 71 and the second bracket 31 in the second direction in a case where the ottoman 6 is further operated in the deploying direction from the maximally deployed state so that the ottoman 6 is returned to the retracted state.

Accordingly, in the adjusting region of the ottoman 6, an operation of the ottoman 6 in the deploying direction to the maximally deployed state is allowed by the adjusting mechanism 120 and an operation of the ottoman 6 in the retracting direction is prohibited. Thus, by operating the ottoman 6 in the deploying direction, the ottoman 6 can be adjusted. Accordingly, for example, an operation knob for adjusting the ottoman 6 can be omitted, which reduces the limitation of the positioning space for parts.

According to the forth embodiment, the seat adjustment apparatus further includes a hook 171 rotatably connected to one of a first member (bracket) 161 that is provided at the seat cushion 2 and a second member (support bracket) 162 that is provided at the ottoman 6, the first member and the second member being arranged between the seat cushion 2 and the ottoman 6, a striker pin 177 fixed to the other of the first member and the second member and configured to hook the hook 171 in a case where the ottoman 6 is in a retracted state to restrict an operation of the ottoman 6 in a deploying direction, a contact member 178 provided at the other of the first member and the second member to which the striker pin 177 is fixed, and the hook 171 guided by the striker pin 177 in a case where the ottoman in the retracted state is further operated in a retracting direction to rotate to an unlocked position at which the striker pin is releasable from the hook to allow the operation of the ottoman in the deploying direction, and guided by the contact member 178 in association with the operation of the ottoman in the deploying direction to rotate to a locked position at which the hook hooks the striker pin in the retracted state of the ottoman, the hook 171 hooking the striker pin in the retracted state of the ottoman in association with the operation of the ottoman in the retracting direction.

Accordingly, the retracted state of the ottoman 6 is maintained by the hook 171 which is in the locked position by hooking the striker pin 177 in addition to the adjusting mechanism 120. Accordingly, the retracted state of the ottoman 6 can be firmly maintained, or retained by the cooperation of the adjusting mechanism 120, and the hook 171 and the striker pin 177.

When the ottoman 6 is further operated in the retracting direction in the retracted state of the ottoman 6, the hook 171 guided by the striker pin 177 rotates towards the unlocked position where the striker pin 177 is releasable to allow the operation of the ottoman 6 in the deploying direction. Thus, the adjustment of the ottoman 6 in the adjusting region by the adjusting mechanism 120 can be achieved.

When the ottoman 6 operates in the deploying direction, the hook 171 guided by the contact member (reverse cam portion 178) rotates to the locked position where the hook 171 is able to retain, or hook the striker pin 177 in the retracted state of the ottoman 6. Accordingly, thereafter, when the ottoman 6 is operated in the retracting direction which the adjusting mechanism 120 allows, the hook 171 which is in the locked position hooks the striker pin 177 in the retracted state of the ottoman 6 to prohibit the operation of the ottoman 6 in the deploying direction. Accordingly, the retracted state of the ottoman 6 can be retained, or maintained by the hook 171 and the striker pin 177 again.

According to the forth embodiment, the seat adjusting apparatus further includes a reverse spring 176 biasing the hook 171 to rotate to the locked position in the retracted state of the ottoman, biasing the hook to rotate to the unlocked position by being turned over in association with a rotation of the hook that is guided by the striker pin in a case where the ottoman in the retracted state is further operated in the retracting state, and biasing the hook 171 to rotate to the locked position by being turned over in association with the rotation of the hook that is guided by the contact member along with the operation of the ottoman in the deploying direction.

Accordingly, in the retracted state of the ottoman 6, the reverse spring 176 biases the rotation of the hook 171 which hooks the striker pin 177 at the locked position, to maintain the ottoman 6 in the retracted state more stably. When further operating the ottoman 6 in the retracting direction in the retracted state of the ottoman 6, the reverse spring 176 is turned over to bias the rotation of the hook 171 to the unlocked position. According to the foregoing construction, an operation of the ottoman 6 in the deploying direction can be started in more stable state. Thereafter, when the ottoman 6 is operated in the deploying direction, the reverse spring 176 is turned over to bias the rotation of the hook 171 to the locked position. Accordingly, when the ottoman (6) is operated in the retracting direction which is allowed by the adjusting mechanism 120 thereafter, the hook 171 can be more smoothly hooked to, or engaged with the striker pin 177 in the retracted state of the ottoman 6.

According to the forth embodiment, the ottoman is supported by the seat cushion 2 via an arm member 164 that is rotatably connected to an attachment member 161 fixed to the seat cushion 2, the first member including the attachment member while the second member including the arm member.

Accordingly, because the hook 171 and the striker pin 177 are provided at the attachment member (the bracket 161) positioned close to the seat cushion 2 or the arm member (main pivot link 164), an assembling error relative to the seat cushion 2 is restrained, which allows the hook 171 and the striker pin 177 to operate with more high precision.

According to the forth embodiment, the seat adjusting apparatus further includes an engagement member (retaining pin) 187 provided at one of the first member and the second member, and a repulsive spring (biasing member) 181 provided at the other of the first member and the second member, the biasing member including a first leg portion (end portion) 182 engaging with one of the first member and the second member and a second leg portion (end portion) 183 contacting or being close to the engagement member 187 in the retracted state of the ottoman, the biasing member 181 generating a biasing force to operate the ottoman in the deploying direction in a case where the second leg portion 183 is pressed by the engagement member 187 when the ottoman is further operated in the retracting direction.

Accordingly, when deploying the ottoman 6 in the retracted state, a biasing force for operating the ottoman 6 in the deploying direction can be generated by means of the biasing member (repulsive spring 181) in accordance with the operation of the ottoman for rotating the hook 171 towards the unlocked position to allow the operation (further operation in the retracting direction). Accordingly, in accordance with a canceling of the prohibition of the operation of the ottoman 6 in the deploying direction by means of, for example, the hook 171, the operation of the ottoman 6 in the deploying direction can be assisted by the biasing member (repulsive spring 181), and the ottoman 6 can be smoothly operated in the deploying direction.

Further, because the second leg portion (end portion 183) of the biasing member (repulsive spring 181) contacts or is assumed to be close to the engagement member (retaining pin 187) in the retracted state of the ottoman 6, for example, when the ottoman 6 which is in the retracted state is urged to operate in the retracting direction due to the influence of, for example, the vehicle oscillation, a biasing force against the retracting operation of the ottoman 6 is generated at the biasing member (repulsive spring 181). Thus, a possibility that the hook 171 and the striker pin 177 are disengaged can be reduced. Alternatively, when the ottoman is in the retracted state, the generation of an unnecessary, or unintended biasing force for operating the ottoman 6 in the deploying direction by the biasing member (repulsive spring 181) can be avoided.

According to the configuration of the disclosure, the ottoman apparatus for vehicle which reduces the limitation for positioning space of the parts can be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat adjustment apparatus for a vehicle, comprising:
a first bracket integrally including a ratchet inner teeth portion, a bracket side reverse wall portion, and a bracket side return wall portion;
a second bracket pivotally supported by the first bracket to define an accommodating void with the first bracket, the second bracket adjusting a posture of a seat for a vehicle by rotating relative to the first bracket;
a holding member inhibiting the first bracket and the second bracket from moving in a rotational axial direction of the second bracket;
a pawl supported by the second bracket within the accommodating void and being pivotable about an axis in parallel with the rotational axial direction of the second bracket; and
a pawl reverse spring including a first end portion engaging with the second bracket and a second end portion engaging with the pawl within the accommodating void,
the pawl integrally including a ratchet portion, a pawl side reverse wall portion, and a pawl side return wall portion, the ratchet portion allowing a relative rotation of the first bracket and the second bracket in a first direction and prohibiting a relative rotation of the first bracket and the second bracket in a second direction opposite from the first direction by engaging with the ratchet inner teeth portion in a case where the pawl is biased to rotate in a normal direction by the pawl reverse spring, the pawl side reverse wall portion allowing the relative rotation of the first bracket and the second bracket in the second direction by making contact with the bracket side reverse wall portion in a case of the relative rotation of the first bracket and the second bracket in the first direction so that the pawl is reversed by being biased to rotate in a reverse direction by the pawl reverse spring, the pawl side return wall portion bringing the pawl to be returned by being biased to rotate in the normal direction by the pawl reverse spring by making contact with the bracket side return wall portion in a case of the relative rotation of the first bracket and the second bracket in the second direction,
wherein plural pairs are arranged within the accommodating void so as to be rotationally symmetric, one pair of the plural pairs including the pawl and the pawl reverse spring, and
wherein the first bracket includes an idle wall portion allowing the relative rotation of the first bracket and the second bracket by the ratchet portion sliding on the idle wall portion before the pawl is reversed in a case where the pawl is biased to rotate in the normal direction by the pawl reverse spring, a reverse engagement projection formed to project at the idle wall portion and a reverse engagement recess portion formed to be dented at the pawl and to which the reverse engagement projection is fitted in a case where the pawl is reversed.

2. The seat adjustment apparatus according to claim 1, wherein the pawl reverse spring includes a coil portion of which an axial direction extends in parallel with the rotational axial direction of the second bracket.

3. The seat adjustment apparatus according to claim 2, wherein the first bracket includes an approach wall portion on which the ratchet portion slides before the ratchet portion engages with the ratchet inner teeth portion at the time of the relative rotation of the first bracket and the second bracket in the first direction in a case where the pawl is biased to rotate in the normal direction by the pawl reverse spring, a return engagement projection formed to project at the approach wall portion, and a return engagement recess portion formed to be dented at the ratchet portion and to which the return engagement projection is fitted in a case where the pawl is returned.

4. The seat adjustment apparatus according to claim 1 wherein the first bracket includes an approach wall portion on which the ratchet portion slides before the ratchet portion engages with the ratchet inner teeth portion at the time of the relative rotation of the first bracket and the second bracket in the first direction in a case where the pawl is biased to rotate in the normal direction by the pawl reverse spring, a return engagement projection formed to project at the approach wall portion, and a return engagement recess portion formed to be dented at the ratchet portion and to which the return engagement projection is fitted in a case where the pawl is returned.

5. The seat adjustment apparatus according to claim 1, wherein the seat adjustment apparatus is disposed between a seat cushion and an ottoman to hold the ottoman by restricting the relative rotation of the first bracket and the second bracket in the first direction in a case where the ottoman is in a retracted state, to allow the ottoman to operate in a deploying direction by allowing the relative rotation of the first bracket and the second bracket in the first direction and inhibit the ottoman to operate in a retracting direction by restricting the relative rotation of the first bracket and the second bracket in the second direction in an adjusting region to a maximally deployed state of the ottoman, and to allow the ottoman to operate in the retracting direction by allowing the relative rotation of the first bracket and the second bracket in the second direction in a case where the ottoman is further operated in the deploying direction from the maximally deployed state so that the ottoman is returned to the retracted state.

6. The seat adjustment apparatus according to claim 5, further comprising:
  a hook rotatably connected to one of a first member that is provided at the seat cushion and a second member that is provided at the ottoman, the first member and the second member being arranged between the seat cushion and the ottoman;
  a striker pin fixed to the other of the first member and the second member and configured to hook the hook in a case where the ottoman is in the retracted state to restrict an operation of the ottoman in the deploying direction; and
  a contact member provided at the other of the first member and the second member to which the striker pin is fixed, wherein the hook is guided by the striker pin in a case where the ottoman in the retracted state is further operated in the retracting direction to rotate to an unlocked position at which the striker pin is releasable from the hook to allow the operation of the ottoman in the deploying direction, and is guided by the contact member in association with the operation of the ottoman in the deploying direction to rotate to a locked position at which the hook hooks the striker pin in the retracted state of the ottoman, the hook hooking the striker pin in the retracted state of the ottoman in association with the operation of the ottoman in the retracting direction.

7. The seat adjustment apparatus according to claim 6, further comprising a reverse spring biasing the hook to rotate to the locked position in the retracted state of the ottoman, biasing the hook to rotate to the unlocked position by being turned over in association with a rotation of the hook that is guided by the striker pin in a case where the ottoman in the retracted state is further operated in the retracting state, and biasing the hook to rotate to the locked position by being turned over in association with the rotation of the hook that is guided by the contact member along with the operation of the ottoman in the deploying direction.

8. The seat adjustment apparatus according to claim 7, wherein the ottoman is supported by the seat cushion via an arm member that is rotatably connected to an attachment member fixed to the seat cushion, the first member including the attachment member while the second member including the arm member.

9. The seat adjustment apparatus according to claim 7, further comprising an engagement member provided at one of the first member and the second member, and a biasing member provided at the other of the first member and the second member, the biasing member including a first leg portion engaging with one of the first member and the second member and a second leg portion contacting or being close to the engagement member in the retracted state of the ottoman, the biasing member generating a biasing force to operate the ottoman in the deploying direction in a case where the second leg portion is pressed by the engagement member when the ottoman is further operated in the retracting direction.

10. The seat adjustment apparatus according to claim 6, wherein the ottoman is supported by the seat cushion via an arm member that is rotatably connected to an attachment member fixed to the seat cushion, the first member including the attachment member while the second member including the arm member.

11. The seat adjustment apparatus according to claim 10, further comprising an engagement member provided at one of the first member and the second member, and a biasing member provided at the other of the first member and the second member, the biasing member including a first leg portion engaging with one of the first member and the second member and a second leg portion contacting or being close to the engagement member in the retracted state of the ottoman, the biasing member generating a biasing force to operate the ottoman in the deploying direction in a case where the second leg portion is pressed by the engagement member when the ottoman is further operated in the retracting direction.

12. The seat adjustment apparatus according to claim 6, further comprising an engagement member provided at one of the first member and the second member, and a biasing member provided at the other of the first member and the second member, the biasing member including a first leg portion engaging with one of the first member and the second member and a second leg portion contacting or being close to the engagement member in the retracted state of the ottoman, the biasing member generating a biasing force to operate the ottoman in the deploying direction in a case where the second leg portion is pressed by the engagement member when the ottoman is further operated in the retracting direction.

13. A seat adjustment apparatus for a vehicle, comprising:
a first bracket integrally including a ratchet inner teeth portion, a bracket side reverse wall portion, and a bracket side return wall portion;
a second bracket pivotally supported by the first bracket to define an accommodating void with the first bracket, the second bracket adjusting a posture of a seat for a vehicle by rotating relative to the first bracket;
a holding member inhibiting the first bracket and the second bracket from moving in a rotational axial direction of the second bracket;
a pawl supported by the second bracket within the accommodating void and being pivotable about an axis in parallel with the rotational axial direction of the second bracket; and
a pawl reverse spring including a first end portion engaging with the second bracket and a second end portion engaging with the pawl within the accommodating void,
the pawl integrally including a ratchet portion, a pawl side reverse wall portion, and a pawl side return wall portion, the ratchet portion allowing a relative rotation of the first bracket and the second bracket in a first direction and prohibiting a relative rotation of the first bracket and the second bracket in a second direction opposite from the first direction by engaging with the ratchet inner teeth portion in a case where the pawl is biased to rotate in a normal direction by the pawl reverse spring, the pawl side reverse wall portion allowing the relative rotation of the first bracket and the second bracket in the second direction by making contact with the bracket side reverse wall portion in a case of the relative rotation of the first bracket and the second bracket in the first direction so that the pawl is reversed by being biased to rotate in a reverse direction by the pawl reverse spring, the pawl side return wall portion bringing the pawl to be returned by being biased to rotate in the normal direction by the pawl reverse spring by making contact with the bracket side return wall portion in a case of the relative rotation of the first bracket and the second bracket in the second direction,
wherein the first bracket includes an approach wall portion on which the ratchet portion slides before the ratchet portion engages with the ratchet inner teeth portion at the time of the relative rotation of the first bracket and the second bracket in the first direction in a case where the pawl is biased to rotate in the normal direction by the pawl reverse spring, a return engagement projection formed to project at the approach wall portion, and a return engagement recess portion formed to be dented at the ratchet portion and to which the return engagement projection is fitted in a case where the pawl is returned.

14. A seat adjustment apparatus for a vehicle, comprising:
a first bracket integrally including a ratchet inner teeth portion, a bracket side reverse wall portion, and a bracket side return wall portion;
a second bracket pivotally supported by the first bracket to define an accommodating void with the first bracket, the second bracket adjusting a posture of a seat for a vehicle by rotating relative to the first bracket;
a holding member inhibiting the first bracket and the second bracket from moving in a rotational axial direction of the second bracket;
a pawl supported by the second bracket within the accommodating void and being pivotable about an axis in parallel with the rotational axial direction of the second bracket; and
a pawl reverse spring including a first end portion engaging with the second bracket and a second end portion engaging with the pawl within the accommodating void,
the pawl integrally including a ratchet portion, a pawl side reverse wall portion, and a pawl side return wall portion, the ratchet portion allowing a relative rotation of the first bracket and the second bracket in a first direction and prohibiting a relative rotation of the first bracket and the second bracket in a second direction opposite from the first direction by engaging with the ratchet inner teeth portion in a case where the pawl is biased to rotate in a normal direction by the pawl reverse spring, the pawl side reverse wall portion allowing the relative rotation of the first bracket and the second bracket in the second direction by making contact with the bracket side reverse wall portion in a case of the relative rotation of the first bracket and the second bracket in the first direction so that the pawl is reversed by being biased to rotate in a reverse direction by the pawl reverse spring, the pawl side return wall portion bringing the pawl to be returned by being biased to rotate in the normal direction by the pawl reverse spring by making contact with the bracket side return wall portion in a case of the relative rotation of the first bracket and the second bracket in the second direction,
wherein the seat adjustment apparatus is disposed between a seat cushion and an ottoman to hold the ottoman by restricting the relative rotation of the first bracket and the second bracket in the first direction in a case where the ottoman is in a retracted state, to allow the ottoman to operate in a deploying direction by allowing the relative rotation of the first bracket and the second bracket in the first direction and inhibit the ottoman to operate in a retracting direction by restricting the relative rotation of the first bracket and the second bracket in the second direction in an adjusting region to a maximally deployed state of the ottoman, and to allow the ottoman to operate in the retracting direction by allowing the relative rotation of the first bracket and the second bracket in the second direction in a case where the ottoman is further operated in the deploying direction from the maximally deployed state so that the ottoman is returned to the retracted state,
wherein the seat adjustment apparatus further comprises:
a hook rotatably connected to one of a first member that is provided at the seat cushion and a second member that is provided at the ottoman, the first member and the second member being arranged between the seat cushion and the ottoman;
a striker pin fixed to the other of the first member and the second member and configured to hook the hook in a case where the ottoman is in the retracted state to restrict an operation of the ottoman in the deploying direction; and
a contact member provided at the other of the first member and the second member to which the striker pin is fixed;
wherein the hook is guided by the striker pin in a case where the ottoman in the retracted state is further operated in the retracting direction to rotate to an unlocked position at which the striker pin is releasable from the hook to allow the operation of the ottoman in the deploying direction, and is guided by the contact member in association with the operation of the ottoman in the deploying direction to rotate to a locked position at which the hook hooks the striker pin in the retracted state of the ottoman, the hook hooking the striker pin in the retracted state of the ottoman in association with the operation of the ottoman in the retracting direction, and wherein the seat adjustment apparatus further comprises a reverse spring biasing the hook to rotate to the locked position in the retracted state of the ottoman, biasing the hook to rotate to the unlocked position by being turned over in association with a rotation of the hook that is guided by the striker pin in a case where the ottoman in the retracted state is further operated in the retracting state, and biasing the hook to rotate to the locked position by being turned over in association with the rotation of the hook that is guided by the contact member along with the operation of the ottoman in the deploying direction.

* * * * *